United States Patent
Oh et al.

(10) Patent No.: US 10,379,891 B2
(45) Date of Patent: Aug. 13, 2019

(54) APPARATUS AND METHOD FOR IN-MEMORY-BASED VIRTUAL DESKTOP SERVICE

(71) Applicant: ELECTRONICS AND TELECOMMUNICATIONS RESEARCH INSTITUTE, Daejeon (KR)

(72) Inventors: Soo-Cheol Oh, Daejeon (KR); Dae-Won Kim, Daejeon (KR); Sun-Wook Kim, Hwaseong-si (KR); Jong-Bae Moon, Daejeon (KR); Myeong-Hoon Oh, Daejeon (KR); Byeong-Thaek Oh, Daejeon (KR); Jung-Hyun Cho, Daejeon (KR); Seong-Woon Kim, Gyeryong-si (KR); Hag-Young Kim, Daejeon (KR); Ji-Hyeok Choi, Gunpo-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 290 days.

(21) Appl. No.: 15/092,769

(22) Filed: Apr. 7, 2016

(65) Prior Publication Data
US 2016/0378535 A1   Dec. 29, 2016

(30) Foreign Application Priority Data
Jun. 24, 2015   (KR) .................. 10-2015-0089625

(51) Int. Cl.
G06F 9/451 (2018.01)
G06F 9/455 (2018.01)
G06F 9/445 (2018.01)

(52) U.S. Cl.
CPC ........ G06F 9/45558 (2013.01); G06F 9/4451 (2013.01); G06F 9/452 (2018.02);
(Continued)

(58) Field of Classification Search
CPC .... G06F 9/45558; G06F 9/452; G06F 9/4451; G06F 2009/45583; G06F 2009/45595
See application file for complete search history.

(56) References Cited

U.S. PATENT DOCUMENTS 9,086,897 B2   7/2015 Oh et al.
9,513,949 B2 * 12/2016 Beveridge ........... G06F 9/45558
(Continued)

FOREIGN PATENT DOCUMENTS

JP       2014-106898    6/2014
KR   10-2009-0111576   10/2009
(Continued)

OTHER PUBLICATIONS

Surksum, Kenneth van. Release: Atlantis ILIO Persistent VDI 4.0. [online] (Feb. 27, 2013). Virtualization.info., p. 1. Retrieved From the Internet <http://virtualization.info/en/news/2013/02/release-atlantis-ilio-persistent-vdi-4-0.html> (Year: 2013).*

*Primary Examiner* — Emerson C Puente
*Assistant Examiner* — Jonathan R Labud
(74) *Attorney, Agent, or Firm* — Kile Park Reed & Houtteman PLLC

(57) ABSTRACT

Disclosed herein are an apparatus and method for in-memory-based virtual desktop service. The apparatus for in-memory-based virtual desktop service includes a connection broker for performing a task for coordinating a delivery protocol that is used between at least one user terminal that uses virtual desktop service and multiple servers that provide the virtual desktop service, a resource pool for providing software resources including an Operating System (OS)
(Continued)

for the virtual desktop service; and virtual machine infrastructure for supporting hardware resources, and dynamically allocating software stored in the software resources to the hardware resources.

8 Claims, 36 Drawing Sheets

(52) U.S. Cl.
CPC .............. *G06F 2009/45583* (2013.01); *G06F 2009/45595* (2013.01)

(56) References Cited

U.S. PATENT DOCUMENTS

| | | |
|---|---|---|
| 2013/0007737 A1* | 1/2013 | Oh ........................ G06F 9/4445 718/1 |
| 2015/0095597 A1 | 4/2015 | Ayanam et al. |
| 2015/0106529 A1 | 4/2015 | Kang et al. |
| 2015/0201004 A1 | 7/2015 | Moon et al. |
| 2015/0269187 A1 | 9/2015 | Cho et al. |

FOREIGN PATENT DOCUMENTS

| | | |
|---|---|---|
| KR | 10-2010-0123847 | 11/2010 |
| KR | 10-2013-0007373 | 1/2013 |
| KR | 10-2014-0077656 | 6/2014 |
| KR | 10-2015-0042643 | 4/2015 |
| KR | 10-2015-0063244 | 6/2015 |
| KR | 10-2015-0105040 | 9/2015 |
| WO | 2009/108579 | 9/2009 |

\* cited by examiner

2000

8310

APPARATUS AND METHOD FOR IN-MEMORY-BASED VIRTUAL DESKTOP SERVICE

CROSS REFERENCE TO RELATED APPLICATION

This application claims the benefit of Korean Patent Application No. 10-2015-0089625, filed Jun. 24, 2015, which is hereby incorporated by reference in its entirety into this application.

BACKGROUND OF THE INVENTION

1. Technical Field

The present invention relates to an apparatus and method for in-memory-based virtual desktop service.

2. Description of the Related Art

Recently, there has been a lot of research into and standardization of virtual desktop service, which is service for providing a hard disk for data storage, applications, or the like to an Internet space.

Korean Patent Application Publication Nos. 2010-0123847 and 2009-0111576 disclose virtual desktop service technology in detail. However, architecture for such virtual desktop service has not yet been standardized, and thus there is a limitation in that virtual desktop service cannot be efficiently provided to a user.

Virtual desktop service, which is service in which a hard disk for storing data, application programs, etc. are provided to an Internet space, enables a virtual machine running on a virtual desktop server to be used by connecting the virtual machine to a client system.

When a conventional virtual desktop is provided, there are various schemes, such as a scheme in which Microsoft (MS) provides terminal service called Remote Desktop Connection (RDC) using a Remote Desktop Protocol (RDP), a scheme in which Linux provides terminal service called Virtual Network Computing (VNC) using a Remote Framebuffer (RFB) protocol, and a scheme in which Teradici provides a terminal service solution using a protocol called PC-over-IP (PCoIP).

To perform virtual desktop service using such a conventional scheme, a virtual desktop function must be provided to each user. In order to provide this function, devices (e.g. a Central Processing Unit (CPU), memory, a Hard Disk Drive (HDD), a Universal Serial Bus (USB) device, etc.) corresponding to each user must be allocated to that user, and an OS image for each user must also be allocated.

As public tools for providing such a function, virt-tool, virt-manager, etc. are present. Virtual machines for users may be made and created using a program, such as Citrix XenDesktop, VMware Fusion or Workstation. However, those conventional schemes are disadvantageous in that the user must personally run exclusive software using the OS of a client system, and thus those schemes are not suitable for the provision of real-time virtual service.

Further, in conventional virtual desktop technology, MS provides terminal service called RDC using an RDP, and Linux provides terminal service called VNC using an RFB protocol. Furthermore, Teradici provides a terminal service solution using a protocol such as PCoIP.

In order to perform virtual desktop service using such a scheme, a virtual desktop function must be provided to each user. In order to provide this function, the devices (e.g. a CPU, memory, a HDD, a USB device, etc.) corresponding to each user must be allocated to that user, and an OS image for each user must also be allocated.

As public tools for providing such a function, virt-tool, virt-manager, etc. are available. A virtual desktop or a virtual machine for a user may be made and created using a program such as Citrix XenDesktop, VMware Fusion, or Workstation. However, since these public tools are provided using a manual scheme, they are not suitable for the provision of real-time virtual service. Further, methods for providing driving environments in different heterogeneous server environments are not appropriate.

Furthermore, an object in which an OS and an application program for a virtual desktop are installed in a virtual disk is referred to as a 'virtual desktop image'. In order for the virtual desktop to be booted and operated, the virtual desktop image is always accessed.

In a single virtual desktop server, several tens of virtual desktops are operated. When all virtual desktops simultaneously access a virtual desktop image as in the case of virtual desktop booting, loads are concentrated on a virtual disk in which the virtual desktop image is stored, and thus a problem arises in that the performance of the entire system is deteriorated. In particular, since the speed of the virtual disk is much lower than that of other resources (CPU or memory) in the virtual desktop server, the deterioration of performance is more serious.

SUMMARY OF THE INVENTION

Accordingly, the present invention has been made keeping in mind the above problems occurring in the prior art, and an object of the present invention is to provide architecture that is capable of efficiently providing virtual desktop service.

Another object of the present invention is to provide a method and system for providing a server virtual machine and an apparatus supporting the method, which can create a virtual machine (VM) in real time at the request of a user and can provide real-time virtual desktop service based on the VM.

A further object of the present invention is to provide profile management technology, which can more effectively provide virtual desktop service, rather than a method by which a user manually modifies a profile or provides a profile via desktop migration performed for a long period of time, when virtual desktop service is provided in different heterogeneous server environments.

Yet another object of the present invention is to provide an in-memory virtual desktop system, which stores virtual desktop images in main memory to eliminate loads concentrated on a disk, and which is operated using the stored virtual desktop images.

In accordance with an aspect of the present invention to accomplish the above objects, there is provided an apparatus for in-memory-based virtual desktop service, including a connection broker for performing a task for coordinating a delivery protocol that is used between at least one user terminal that uses virtual desktop service and multiple servers that provide the virtual desktop service; a resource pool for providing software resources including an Operating System (OS) for the virtual desktop service; and virtual machine infrastructure for supporting hardware resources, and dynamically allocating software stored in the software resources to the hardware resources.

In accordance with an aspect of the present invention to accomplish the above objects, there is provided a method for in-memory-based virtual desktop service, including searching, by a connection broker, for a virtual machine suitable for hardware of a user terminal for virtual desktop service; requesting, by the connection broker, virtual machine infrastructure to create a virtual machine when no suitable virtual machine is found, and applying, by the connection broker, a user profile to a found virtual machine and generating a virtual desktop when a suitable virtual machine is found; and transmitting, by the connection broker, the generated virtual desktop to the user terminal using connection information required to transfer the virtual desktop to the user terminal based on a delivery protocol of the virtual desktop.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
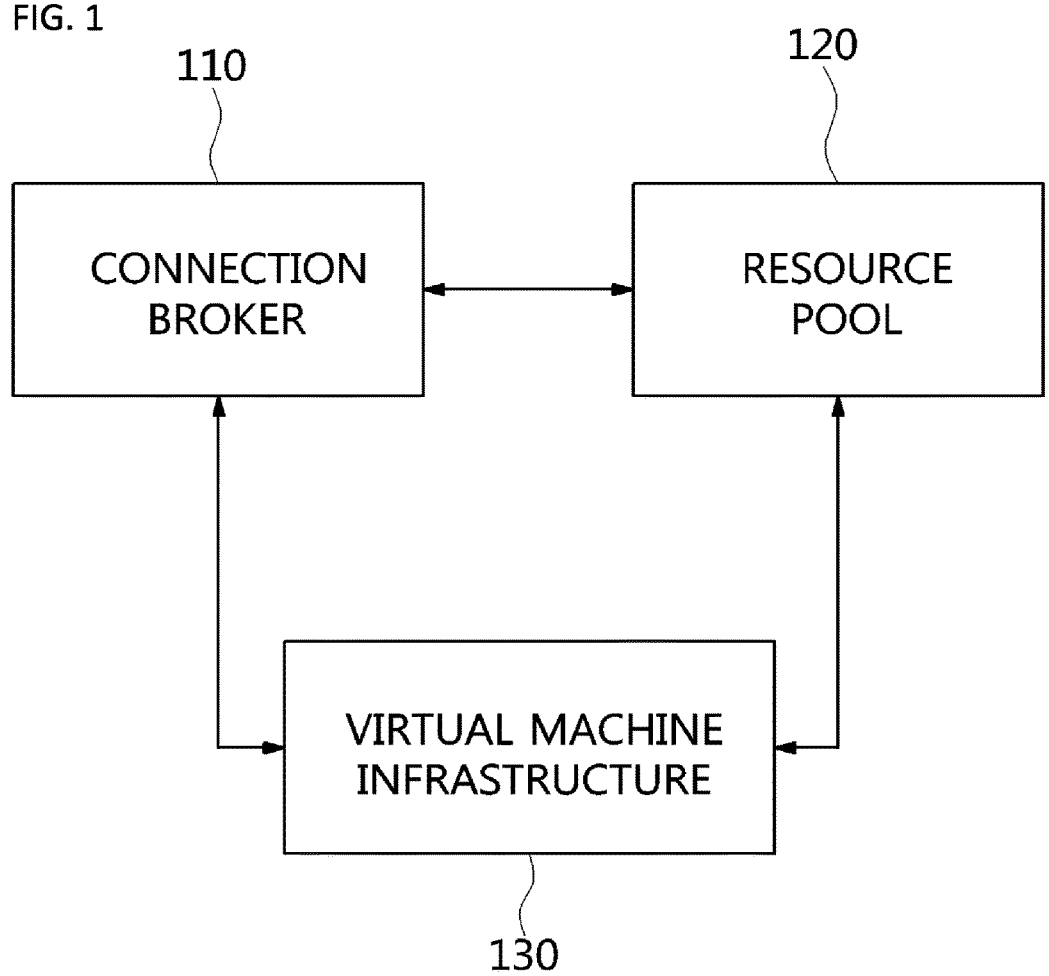
FIG. 1 is a diagram showing service architecture for virtual desktop service according to an embodiment of the present invention.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. It should be understood that a representation indicating that a first component is "linked", "coupled", or "connected" to a second component includes not only the case where the first component is directly coupled or connected to the second component but also cases where a third component is "linked", "coupled" or "connected" between the first and second components.

FIG. 1 is a block diagram showing service architecture for a virtual desktop service according to an embodiment of the present invention.

Several steps are performed in order for a service provider to provide the virtual desktop service to an end-user, and these steps may be performed by three principal actors, namely, a Connection Broker (CB) 110, a Resource Pool (RP) 120, and a Virtual Machine Infrastructure (VMI) 130, as shown in FIG. 1.

Figure 2:
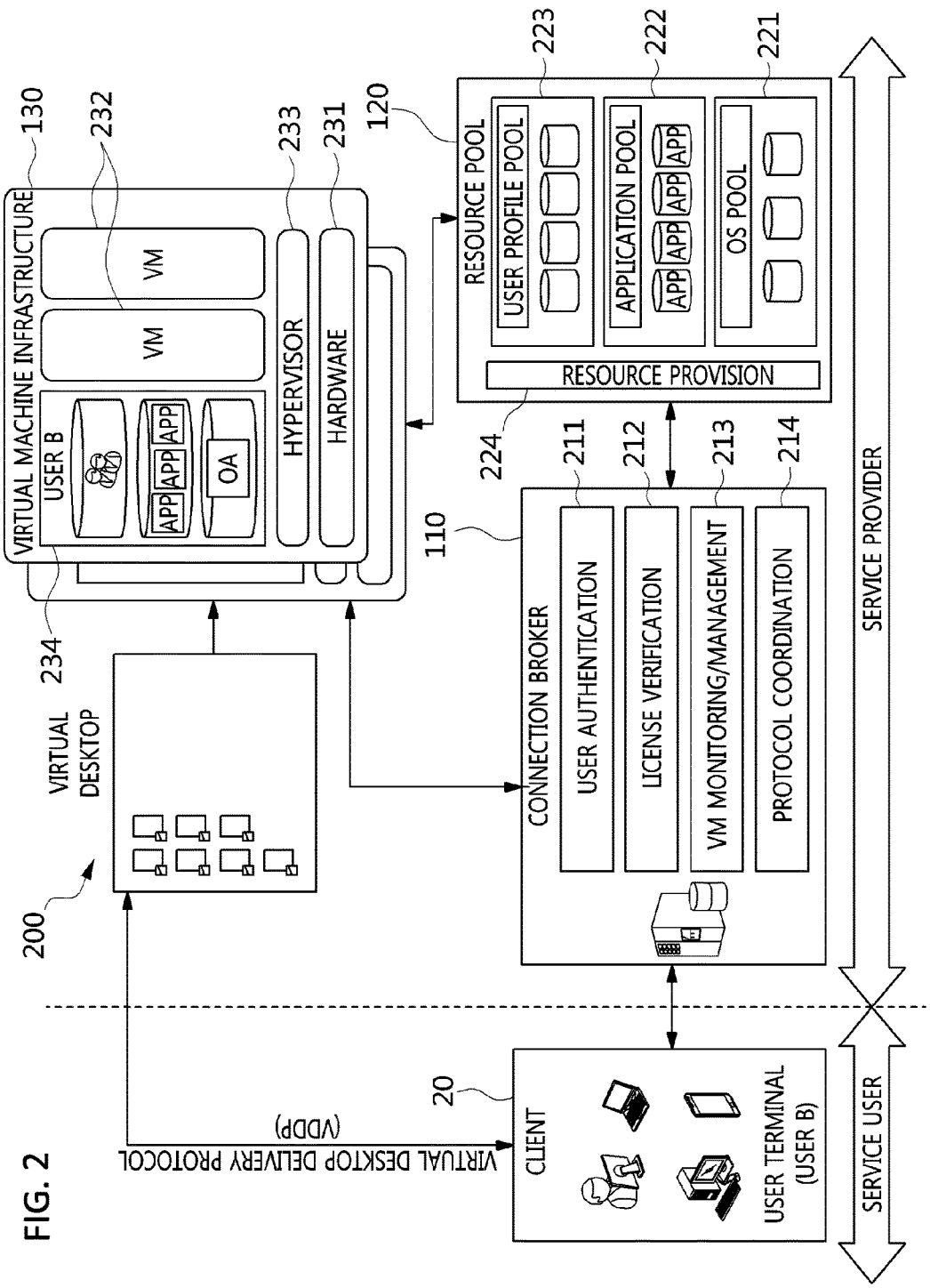
FIG. 2 is a conceptual diagram showing service architecture for virtual desktop service according to an embodiment of the present invention.

Below, the functions of the three principal actors will be described in detail with reference to FIG. 2. FIG. 2 is a conceptual diagram showing service architecture for the virtual desktop service according to an embodiment of the present invention.

Referring to FIG. 2, the connection broker 110 may be a software program enabling a user terminal 20 to be connected to a virtual desktop 200, and may perform a user authentication function 211 and a license verification function 212 for validating the user terminal 20 and the software of the user terminal 20, a management/monitoring function 213 of managing a Virtual Machine (VM) allocated to the user terminal 20 and monitoring a server for measuring the activity level of the virtual machine, and a protocol coordination function 214 for allowing the same protocol to be used between the user terminal 20 and servers. Such a connection broker 110 may provide a connection between backup storage and virtual desktop servers.

Referring to FIG. 2, the resource pool 120 may manage three different types of high-capacity software resources, namely Operating Systems (OSs), applications, and user profiles, in order to provide an on-demand virtual desktop service. That is, as shown in FIG. 2, the resource pool 120 includes an OS pool 221, an application pool 222, and a user profile pool 223. The software resources managed by the resource pool 120 are transferred to a specific virtual machine at a predetermined time in a streaming form and are executed on the specific virtual machine.

Further, the resource pool 120 may provide provision information 224 related to relevant software resources at the request of the connection broker 110. The above-described user profiles may include, for example, individual pieces of information, such as a hardware configuration (for example, a Central Processing Unit (CPU), Random Access Memory (RAM), Input/Output (I/O) devices, etc.), an OS that is used, a selected application, and the user's computing environment information (for example, display resolution, an Internet access scheme, etc.). Such user profiles may be managed for respective users.

Referring to FIG. 2, the virtual machine infrastructure 130 performs the principal functions of supporting hardware resources 231 and creating Virtual Machines (VMs) 232. For virtual desktop servers, a virtualization technology known as a hypervisor 233, for example, is absolutely necessary for the efficient use of the above-described hardware resources 231. The above-described hypervisor 233 abstracts the physical hardware resources 231, and dynamically allocates the physical hardware resources 231 to the higher level of the software 234.

That is, the hardware resources 231 supported by the virtual machine infrastructure 130 may be efficiently used depending on the hypervisor virtualization technology of the virtual desktop servers, which abstracts the physical hardware resources 231 and dynamically allocates them to the higher level of the software 234. Consequently, the virtual machine infrastructure 130 provides the virtual machines 232 in which the software 234 of the user terminal 20 runs. These virtual machines are called virtual desktops 200.

Figure 3:
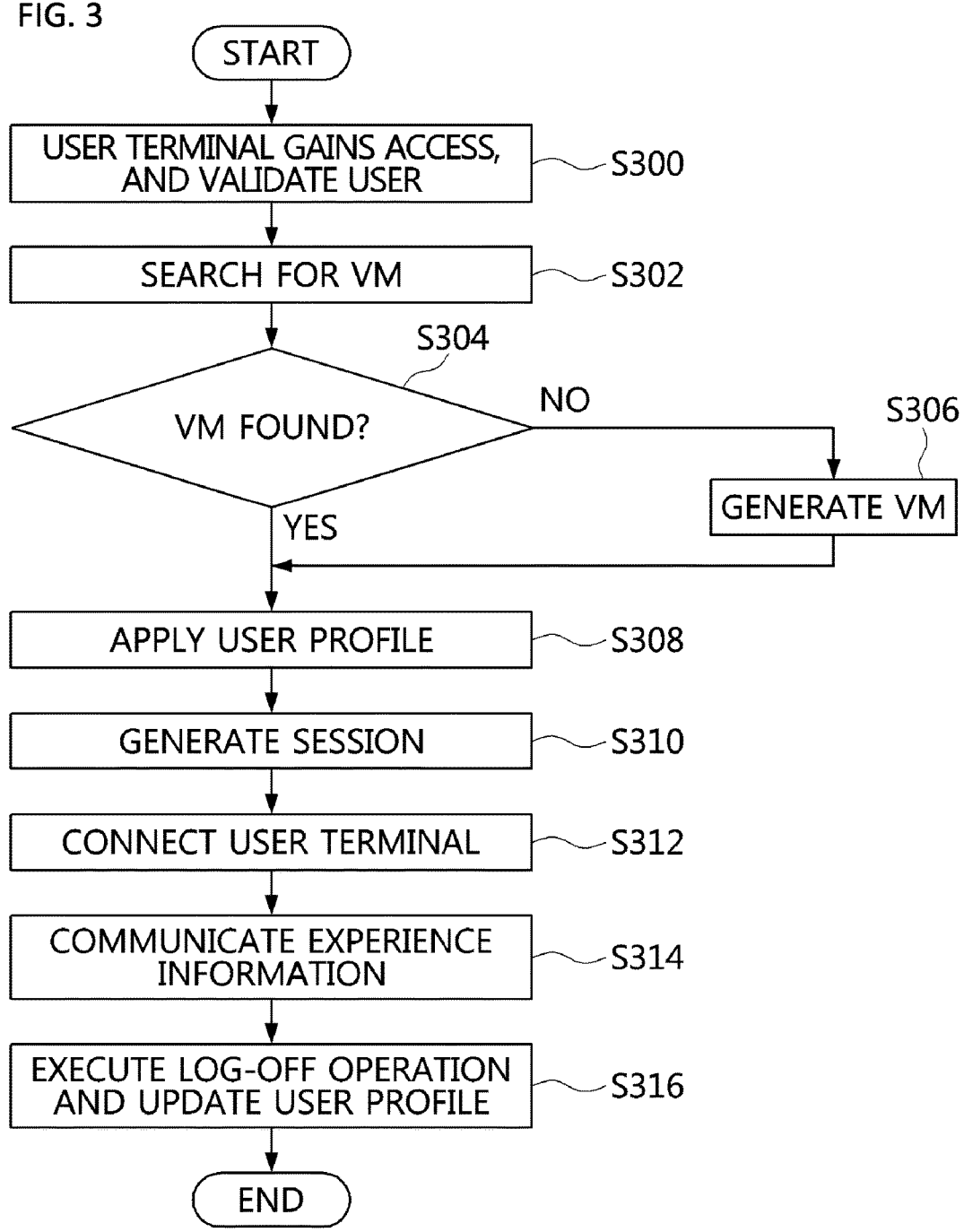
FIG. 3 is a flowchart showing a method for virtual desktop service according to an embodiment of the present invention.

Below, the method for the virtual desktop service will be described in detail with reference to FIG. 3, together with FIG. 2, in which a conceptual diagram of the service architecture for the virtual desktop service is illustrated. FIG. 3 is a flowchart showing the method for the virtual desktop service according to an embodiment of the present invention.

Referring to FIG. 3, the method for the virtual desktop service according to the embodiment of the present invention is performed to include a user terminal connection and user validation step S300, a virtual machine search step S302, a user profile application step S308, a session generation step S310, a user terminal connection step S312, an experience information communication step S314, and a log-off operation and user profile update step S316.

At the user terminal connection and user validation step S300, when the user terminal 20 accesses the virtual desktop service using one or more of the Secure Shell (SSH) and Transport Layer Security (TLS) security protocols, the connection broker 110 validates the relevant user using his or her user Identification (ID) and password. At the virtual machine search step S302, the connection broker 110 identifies the relevant user profile so as to allocate a virtual machine, and searches for a virtual machine that satisfies the hardware configuration of the user terminal 20 and that is optimal for a computing environment, using a provisioning function.

As a result of searching performed at the virtual machine search step S302, whether a suitable virtual machine has been found is determined at step S304. If it is determined that no suitable virtual machine is present, the connection broker 110 requests the virtual machine infrastructure 130 to create a virtual machine by transmitting information about the hardware configuration. Accordingly, the virtual machine infrastructure 130 creates a virtual machine at step S306.

At the user profile application step S308, after the virtual machine has been allocated or created, the connection broker 110 applies the user profile to the allocated or created virtual machine. At the user profile application step S308, the connection broker 110 may install an OS and an application required to construct the virtual desktop 200. At the session generation step S310, the session for which the virtual desktop 200 is to be delivered is initiated in the virtual machine infrastructure 130, and information about the generated session is dispatched to the connection broker 110. At the user terminal connection step S312, the connection broker 110 transmits the session information to the user terminal 20, and the user terminal 20 is connected to the virtual machine infrastructure 130.

At the experience information communication step S314, the user terminal 20 communicates information about the experience of users using the virtual desktop 200 on the basis of a Virtual Desktop Delivery Protocol (VDDP). At the log-off operation and user profile update step S316, the user terminal 20 executes a log-off operation so as to prevent user data from being lost when the virtual desktop service is terminated, and the connection broker 110 updates the changed user profile in the user profile pool 223 during the execution of the log-off operation. Also, at the log-off operation and user profile update step S316, the connection broker 110 may return the relevant virtual machine, thereby making the virtual machine available.

Figure 4:
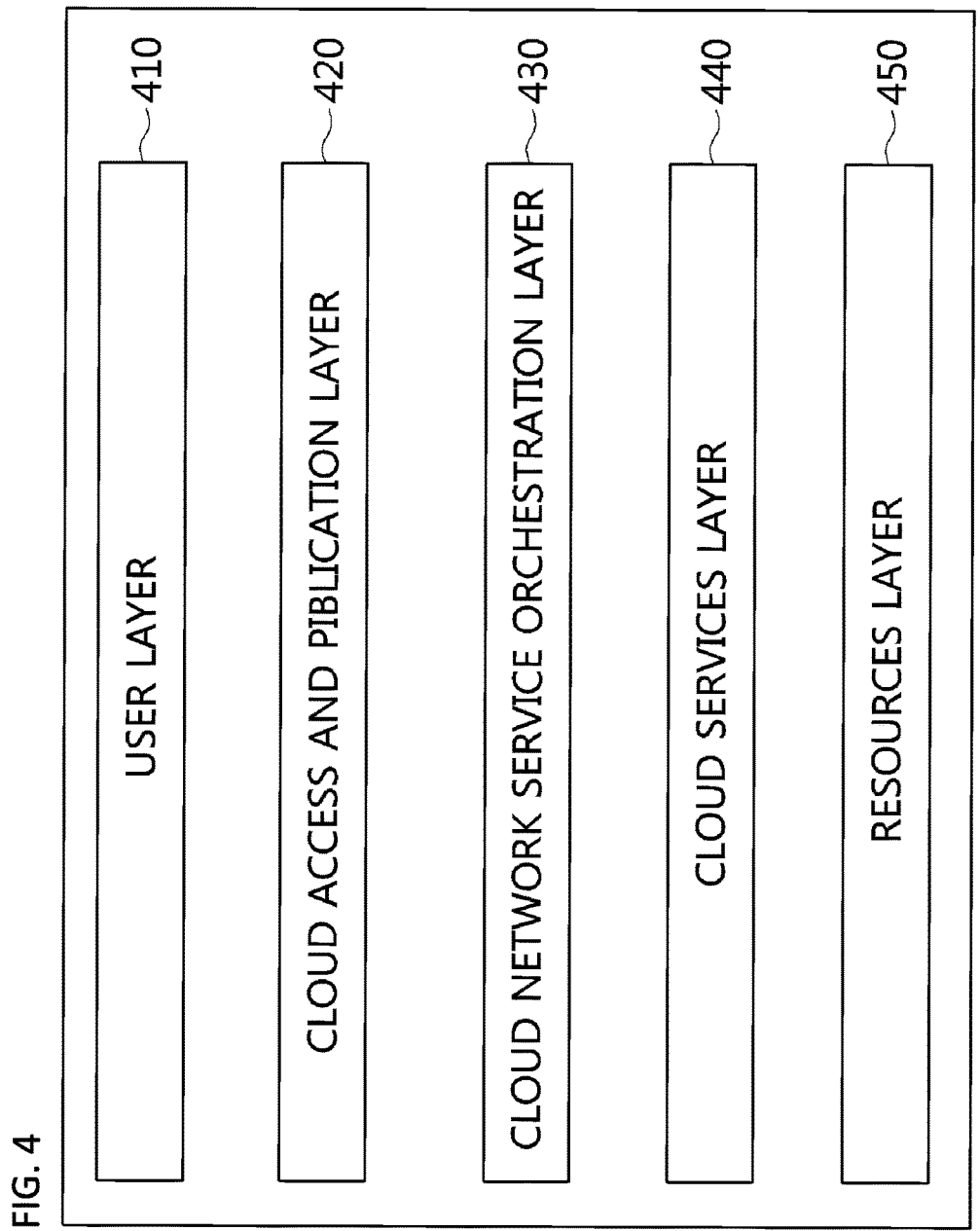
FIG. 4 is a diagram showing functional layered architecture for virtual desktop service according to an embodiment of the present invention.

Below, the functional layers of the virtual desktop service according to an embodiment of the present invention will be described in detail with reference to FIGS. 4 and 5. FIG. 4 is a diagram showing a functional layered architecture for the virtual desktop service according to an embodiment of the present invention.

Referring to FIG. 4, the functional layered architecture for the virtual desktop service according to the embodiment of the present invention includes functional layers such as a user layer 410, a cloud access and publication layer 420, a cloud network service orchestration layer 430, a cloud services layer 440, and a resources layer 450.

The above-described functional layers will be individually described below with reference to FIG. 5. FIG. 5 is a diagram showing the functional layered architecture for the virtual desktop service according to an embodiment of the present invention.

Figure 5:
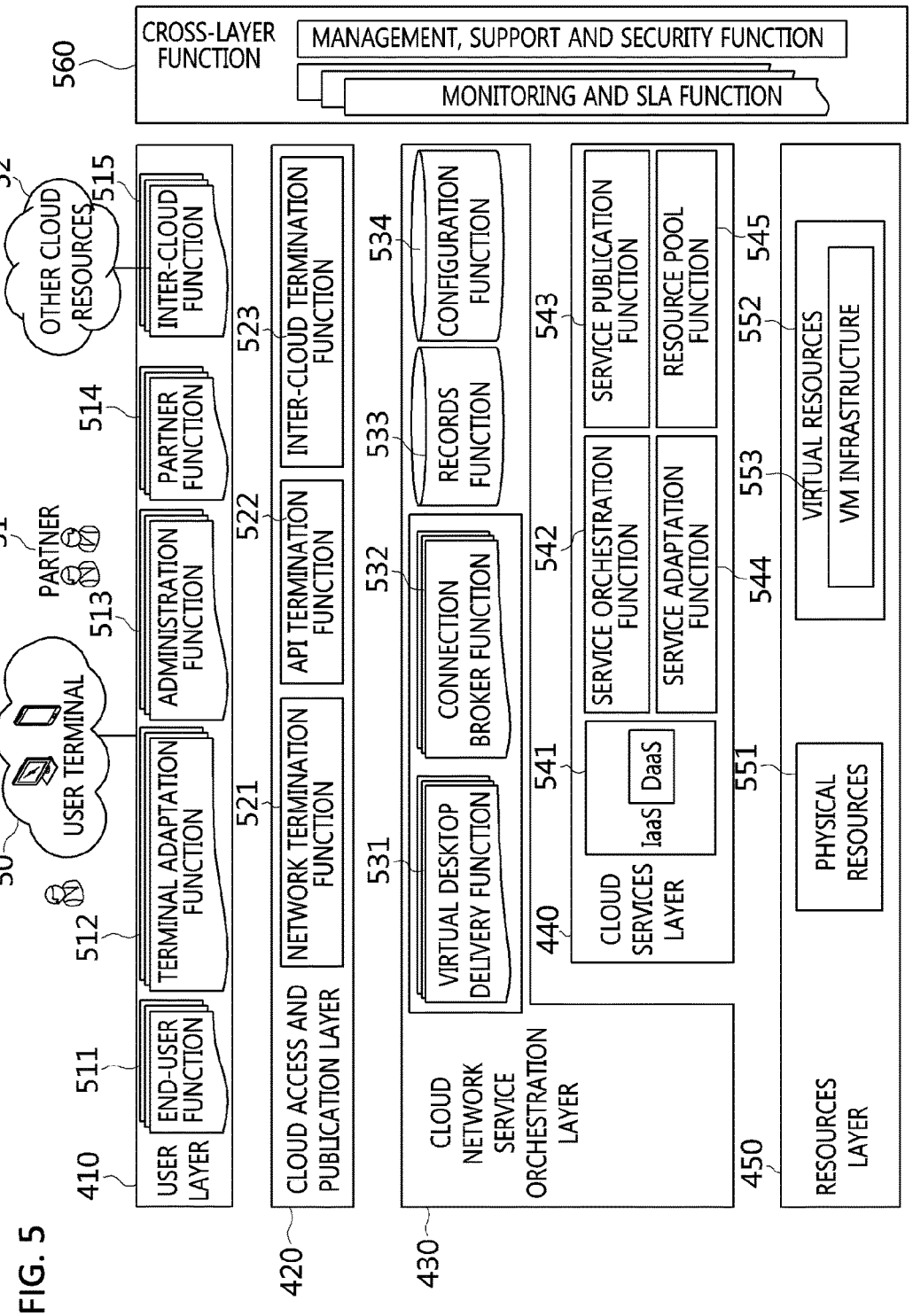
FIG. 5 is a conceptual diagram showing functional layered architecture for a virtual desktop service according to an embodiment of the present invention.

Referring to FIG. 5, the user layer 410 is used to support interactions between the user terminal 50 and the cloud infrastructure, transmit a cloud service request, access the cloud service, and manage or monitor cloud resources, and includes an end-user function 511, a terminal adaptation function 512, an administration function 513, a partner function 514 with partners 51, an inter-cloud function 515, etc.

When receiving the cloud service request, the cloud resource orchestrates its own resources or the resources of other cloud resources using the inter-cloud function 515, and provides the cloud service via the user layer 410. The end-user function 511 supports an end user, that is, the user terminal 50, so that the user terminal 50 accesses and consumes the cloud service. The administration function 513 supports a business administrator in managing cloud resources and services in a business process. The partner function 514 enables a partner relationship to be formed via a Cloud Service Provider (CSP).

The inter-cloud function 515 provides an interconnection interface and broker function so as to interconnect a relevant cloud resource with the cloud resources of a plurality of CSPs. Such an inter-cloud function 515 includes an inter-cloud service broker function, an inter-cloud portal function, etc. The inter-cloud broker function provides an alternative solution to cloud users or applications so as to access the cloud services and resources of other CSPs 52. The user terminal for the virtual desktop service may be any of various types of terminals such as a laptop computer, a desktop PC, a thin client, and a mobile phone. Further, terminal adaptation refers to the function of allowing a terminal device to provide a desktop having a suitable resolution, among various resolutions of different peripherals in different band environments.

Referring to FIG. 5, the cloud access and publication layer 420 provides a common interface to execute manual and automated cloud actions and consumption, grants cloud service consumption requests received from consumers or business processes using cloud Application Programming Interfaces (APIs), which are required to access the services and resources of the Cloud Service Providers (CSPs), and includes a network termination function, an API termination function, an inter-cloud mediation function, etc.

Referring to FIG. 5, the cloud network service orchestration layer 430 includes a virtual desktop delivery function 531 for encapsulating and delivering access to the entire information system environment or access to a remote client device via a network, and a connection broker function 532 including an authentication entity, a coordination entity, a monitoring and management entity, and a verification entity. The authentication entity allows the connection broker to provide approved access in a combination of personalized applications for different security levels by consulting a directory server so as to authenticate a user desktop session. The coordination entity allows the connection broker to perform a coordination function so that after the user desktop session has been authenticated, a common communication protocol for data and video transmission is used between the user terminal and the virtual desktop, in the case where various communication protocols may exist between the user terminal and the virtual desktop. The monitoring and management entity allows the connection broker to perform the actions of monitoring the runtime status of the virtual machine and guaranteeing the operating environment for the required applications. The verification entity allows the connection broker to provide a software license verification function so that the user terminal 50 can access a validated application hosted on the virtual desktop.

In the above-described virtual desktop delivery function 531, the Virtual Desktop Delivery Protocol (VDDP) is the core component of the virtual desktop delivery function 531, and provides a communication channel between the server for Desktop as a Service (DaaS) and the user terminal 50 so as to transfer all pieces of interaction information, for example, information about a display, input, a cursor, control and configuration, and monitoring information.

Further, in the above-described monitoring and management entity, the connection broker commands the virtual machine infrastructure to allocate a new idle virtual machine instance in response to a newly received request, or to allocate a previous instance in response to a request presented by a client-side device after recovery from system failure. Also, the connection broker may request the virtual machine infrastructure to prepare a new cloud virtual machine for a newly logged-in user session (login user session). The above-described cloud network service orchestration layer 430 further includes a records function 533, a configuration function 534, etc.

Referring to FIG. 5, the cloud services layer 440 includes a DaaS function 541 and a resource pool function 545. The DaaS function provides the virtual desktop service to the user terminal 50 via a broadband network. The resource pool function 545 is a broadband resource repository or repository server set in which guest OSs and applications are serialized and stored, and includes a visualized modeling tool which generates a virtual template enabling the cloud virtual machine to be created by the virtual machine infrastructure. The resource pool function 545 has the ability to dynamically assemble the resources required by a currently running virtual desktop, including OSs, application software, user profiles and system configuration, and to produce relevant image files. Further, the resource pool function 545 supports a network-based bootstrap protocol that enables communication with the virtual machine infrastructure and that enables virtual desktops to be remotely generated from the serialized image files. As shown in FIG. 5, the above-described cloud services layer 440 may further include a service orchestration function 542, a service publication function 543, and a service adaptation function 544.

Referring to FIG. 5, the resources layer 450 has physical resources 551 including computing resources, storage resources, network resources, power resources, and other essential facilities in the cloud computing environment, and virtual resources 552 including virtual machines, virtual network resources, and virtual storage resources. The virtual machines are virtual machines created in a virtual machine infrastructure 553 using different server virtualization technologies, such as Xen and a Kernel-based Virtual Machine (KVM). Referring to FIG. 5, the functional layered architecture for the virtual desktop service according to the embodiment of the present invention may further provide a cross-layer function 560 including a monitoring and Service Level Agreement (SLA) function and a management, support and security function.

The above-described virtual machine infrastructure 553 denotes a cluster environment having High Availability (HA) characteristics, and is internally configured such that a large number of running virtual machine instances are generated from the same virtual machine template and are composed of identical parameters. Since almost all virtual machine infrastructures 553 provide virtual machine migration capability, they enable a currently running instance to be migrated to another hosting server in the event of system failure so as to maintain business continuity.

The virtual desktop service described in the present specification may be a service for providing a data storage hard disk or applications to the space of the Internet. In other words, this service may be a desktop service using a virtual machine created by applying desktop virtualization technology, rather than using actual physical hardware for a PC or a desktop for business use. In this case, the created virtual machine for the desktop is located at a remote place, such as in an Internet data center, and can be used in the same way as a local desktop, at any time and from anywhere. The virtual desktop service described in the present specification may be a DaaS service, a cloud computing service, or a cloud desktop service. The architecture for the virtual desktop service according to the embodiment of the present invention (the service architecture and the functional layered architecture) may be the design scheme of the system or server that provides the virtual desktop service to the user terminal, or may be the system or the server itself that provides the virtual desktop service to the user terminal.

Figure 6:
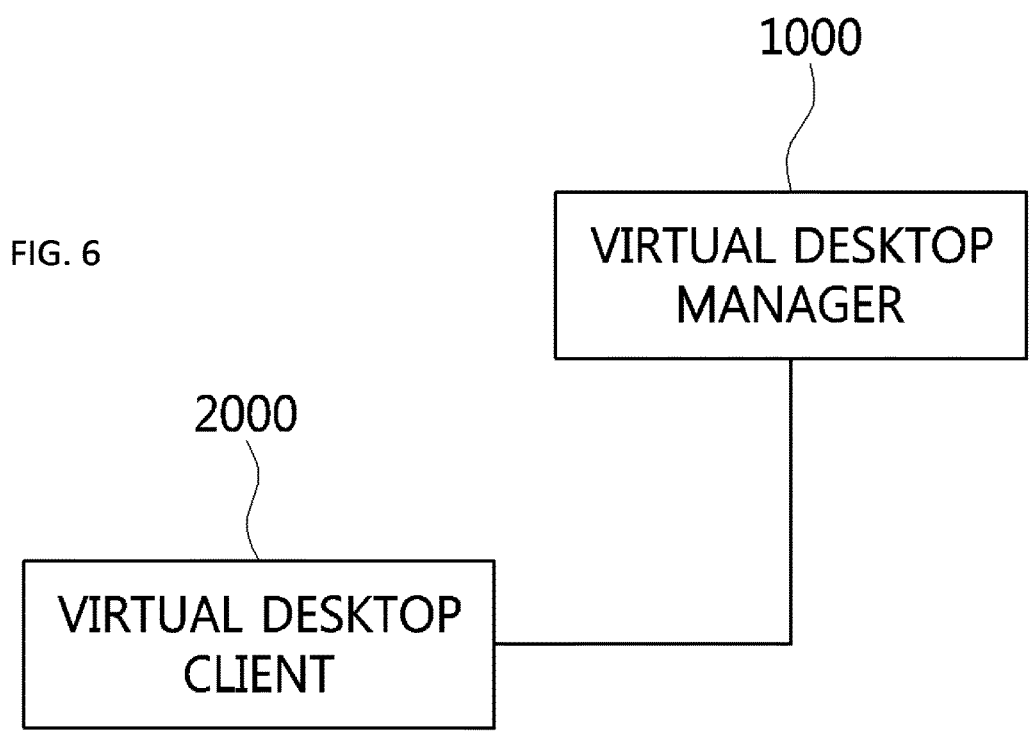
FIG. 6 is a diagram showing the configuration of a desktop virtualization system according to an embodiment of the present invention.

FIG. 6 is a diagram showing the configuration of a desktop virtualization system according to an embodiment of the present invention.

Referring to FIG. 6, a desktop virtualization system (hereinafter also referred to as a "DaaS system") according to an embodiment of the present invention includes a virtual desktop manager device 1000 and a virtual desktop client device 2000.

The virtual desktop manager device 1000 allocates a virtual desktop server to the virtual desktop client device 2000 at the request of a user, and provides functions of controlling the creation, management, termination, and migration of virtual machines. The detailed configurations of the virtual desktop manager device 1000 and the virtual desktop client device 2000 will be described in detail below with reference to FIGS. 7 and 8.

Figure 7:
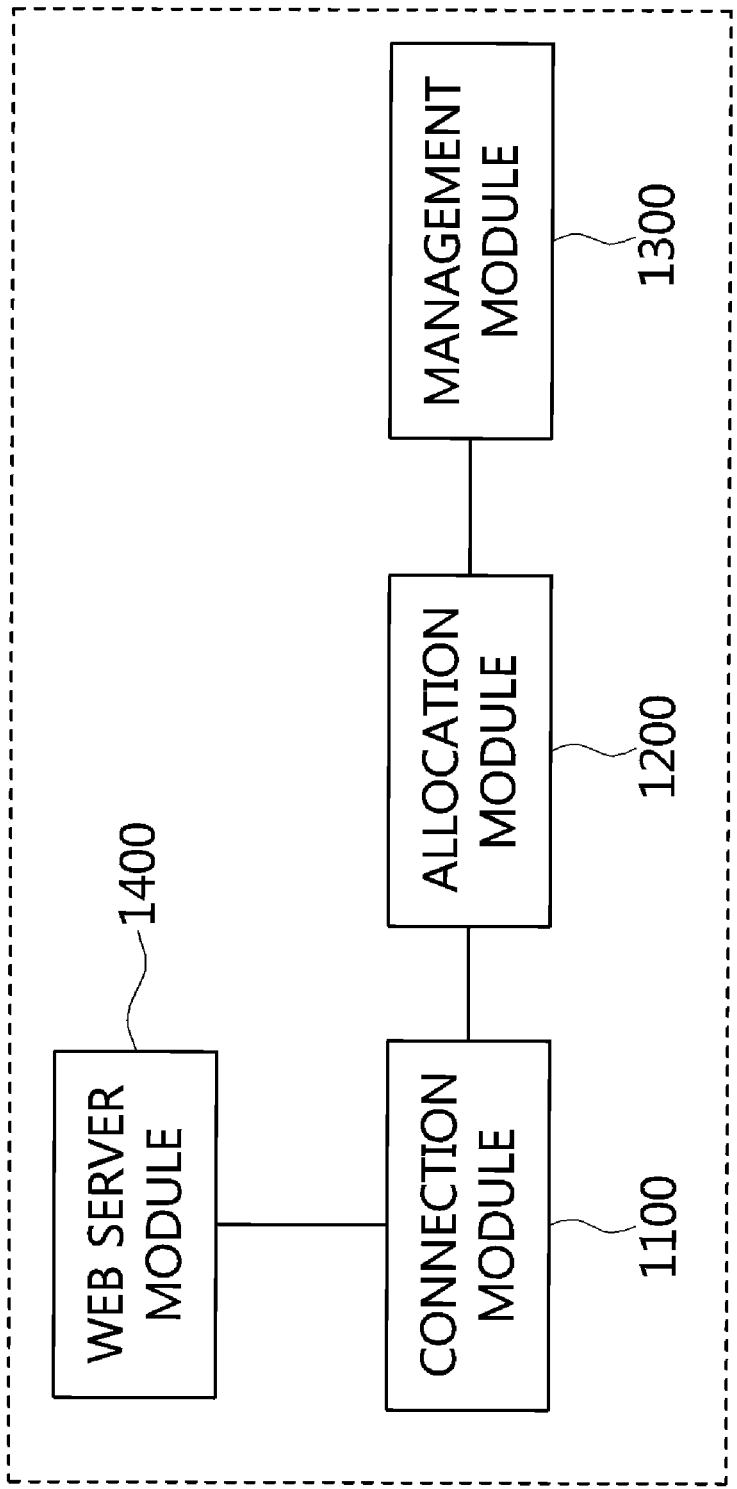
FIG. 7 is a diagram showing a virtual desktop manager device according to an embodiment of the present invention.

FIG. 7 is a diagram showing a virtual desktop manager device according to an embodiment of the present invention.

Referring to FIG. 7, the virtual desktop manager device 1000 according to the embodiment of the present invention includes a connection module 1100, an allocation module 1200, a management module 1300, and a web server module 1400.

The connection module 1100 permits the connection of the virtual desktop client device 2000 of a user who has been authenticated to a virtual desktop server. In order for the user to be remotely provided with virtual desktop service through a DaaS system, the user accesses the connection module 1100 for making a connection to the virtual desktop server. Here, the connection module 1100 permits the allocation of any virtual machine only to the user who accesses the connection module via user authentication, based on information about the request of the user and the virtual machines of virtual desktop servers constituting the current system. Further, after a virtual desktop server has been allocated, the connection module 1100 may provide a connection function for a virtual desktop environment and a screen redirection function using the remote access protocol of the allocated virtual machine. Furthermore, when the use of the allocated virtual machine has been completed by the user, the connection module 1100 may store the current configuration corresponding to the user's account so that the user accesses the connection module again at the time desired by the user, and may delete the virtual desktop connection function and the screen redirection function.

The allocation module 1200 checks the operation states of virtual desktop servers, and then allocates an optimal virtual desktop server to the virtual desktop client device 2000. At this time, the allocation module 1200 may provide a virtual machine provisioning function of monitoring, in real time, information about the use of resources by the virtual desktop servers and the allocation of virtual machines in order to allocate the virtual machine that support the best virtual desktop service to a remote user who requests the virtual desktop service through the connection module 1100. Here, the allocation module 1200 may monitor, in real time, the states of allocation of resources to virtual desktop servers constituting the DaaS system, information about the use of resources by the virtual desktop servers, and information about whether the created virtual machines are being used. Here, the allocation module 1200 provides the best user-customized virtual desktop server to the remote user, and may allocate another virtual machine in real time when a fault occurs in an allocated virtual machine. At this time, the allocation module 1200 may allocate virtual desktop servers by separating an image required to operate virtual machines from the user disk image of the virtual desktop client device 2000.

The management module 1300 monitors the status of operation of virtual desktop servers and virtual machines, and executes control commands from the virtual desktop servers. The web server module 1400 provides a web-based management tool GUI to each user.

Figure 8:
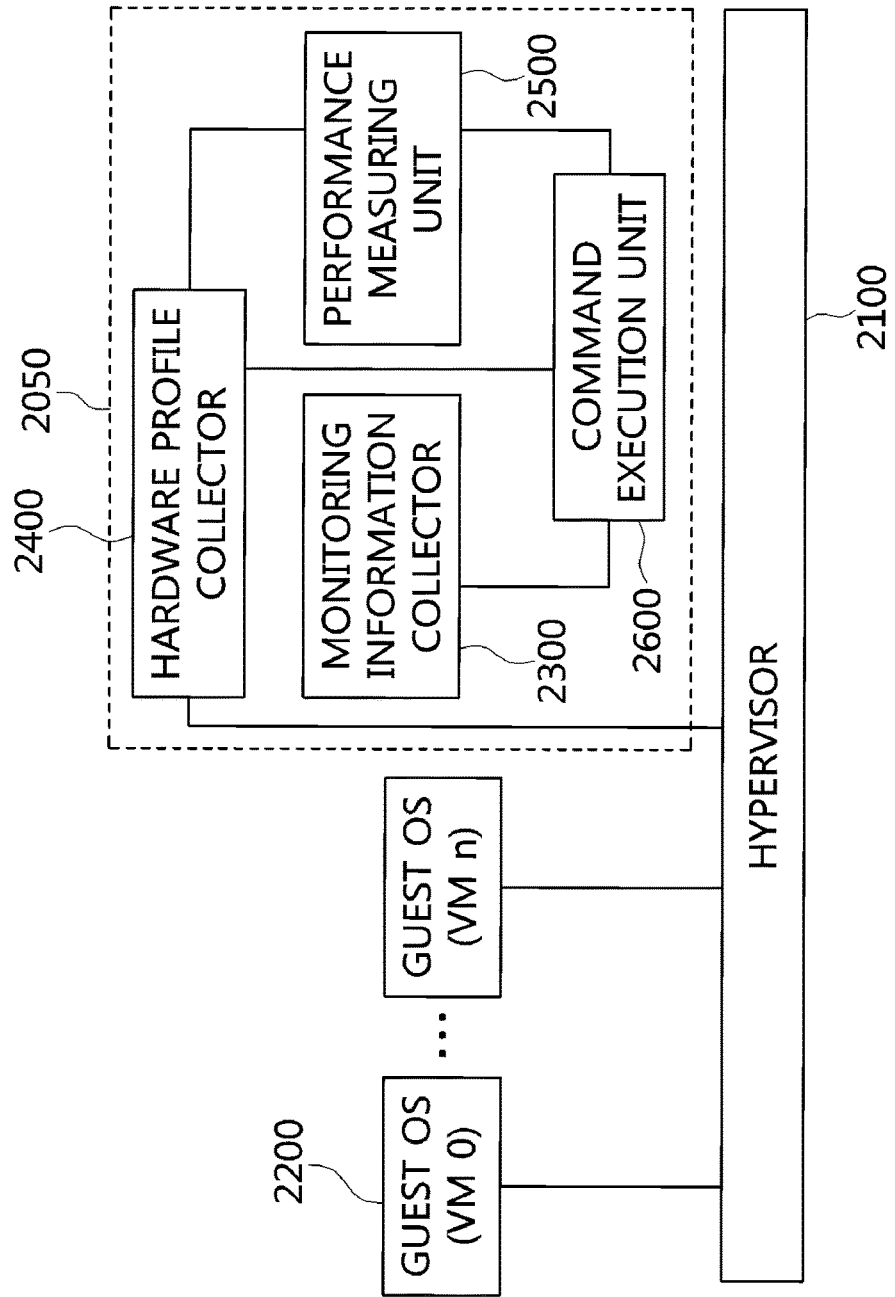
FIG. 8 is a diagram showing a virtual desktop client device according to an embodiment of the present invention.

FIG. 8 is a diagram showing a virtual desktop client device according to an embodiment of the present invention. Referring to FIG. 8, the virtual desktop client device 2000 according to the embodiment of the present invention includes a hypervisor 2100, a monitoring information collector 2300, a hardware profile collector 2400, a performance measuring unit 2500, and a command execution unit 2600. Here, the monitoring information collector 2300, the hardware profile collector 2400, the performance measuring unit 2500, and the command execution unit 2600 may be implemented in a virtual desktop agent 2050.

The hypervisor 2100 accommodates one or more virtual machines 2200 on hardware. The hypervisor 2100 may communicate with the virtual machines 2200 and the components of the virtual desktop agent 2050 using a programmed daemon. Here, the types of virtual machines 2200 may be implemented in full-virtualization or half-virtualization forms. The monitoring information collector 2300 monitors the virtual machines 2200.

The hardware profile collector 2400 collects information about the hardware and OS level of the virtual desktop client device 2000. The performance measuring unit 2500 calculates the performance information of the virtual machine 2200 using the information monitored by the monitoring information collector 2300. The command execution unit 2600 buffers and executes control commands transferred from the virtualization servers. Here, control commands related to the control of virtual machines are processed via a programmed daemon, and commands related to the virtual desktop client device 2000 may be processed at the level of the hypervisor 2100 and OSs.

Meanwhile, as network protocols for the desktop virtualization system, Transmission Control Protocol (TCP)/User Datagram Protocol (UDP) are used, and the method for operating the desktop virtualization system related to management will be described in detail below with reference to FIGS. 9 and 10.

Figure 9:
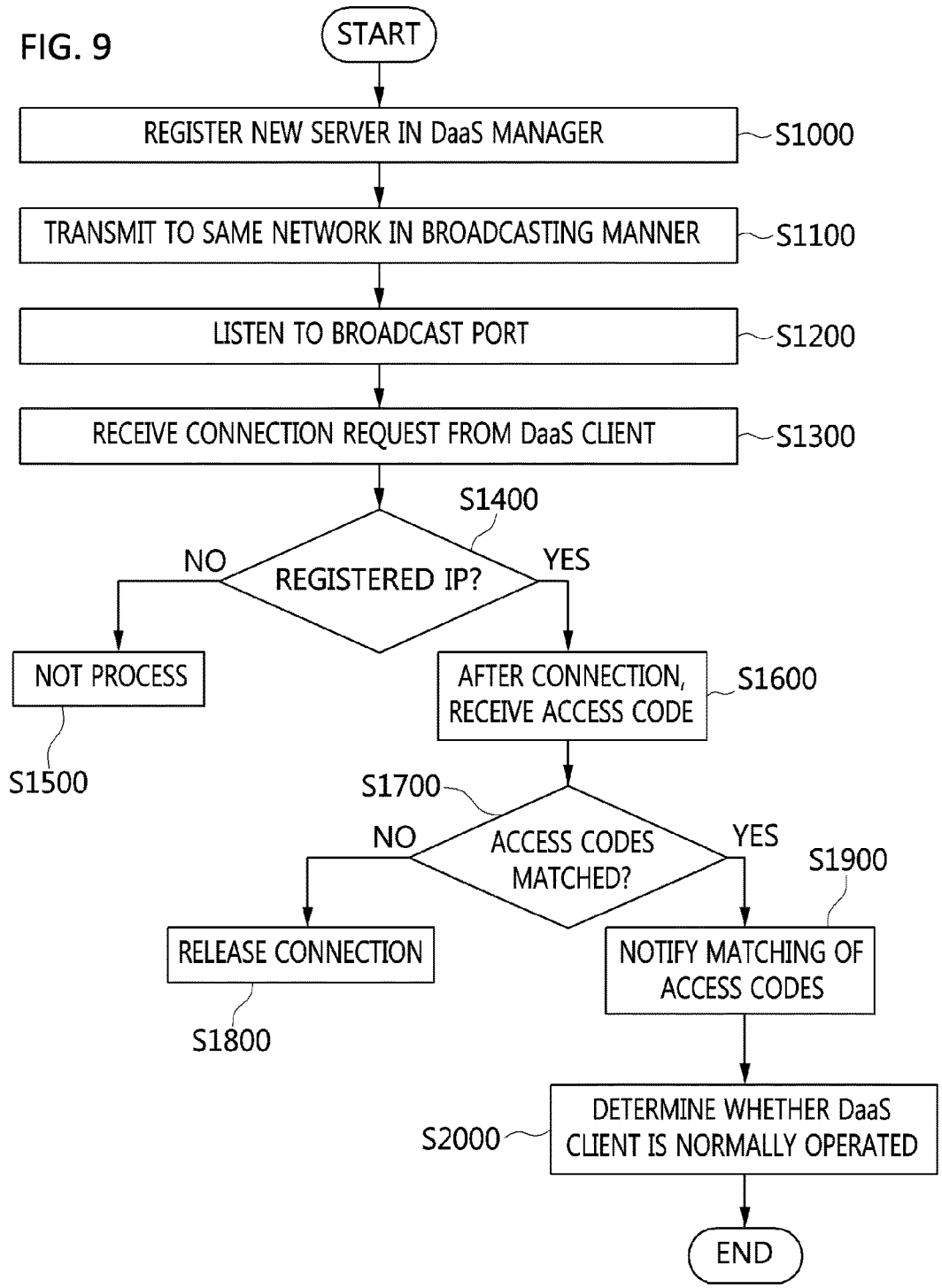
FIG. 9 is a flowchart showing a management method using the virtual desktop manager device according to an embodiment of the present invention.

FIG. 9 is a flowchart showing a management method based on a virtual desktop manager device according to an embodiment of the present invention. Referring to FIG. 9, in the management method based on the virtual desktop manager device according to the embodiment of the present invention, a new server is registered by a user in the virtual desktop manager device 1000 at step S1000.

Meanwhile, a method for registering a new server will be described below. First, the user attempts to access the virtual desktop manager device 1000 on the virtual desktop client device 2000. When the user is a new user, he or she accesses the connection module 1100. Thereafter, the new user is assigned a member ID and a password via a member subscription procedure. The user accesses the virtual desktop manager device 1000 using the assigned access ID, and the virtual desktop manager device 1000 generates a new image. In the case of such a new image, the virtual desktop manager device 1000 selects a preset virtualization image suitable for an existing user pattern, or generates an image by setting the CPU, memory, and HDD desired by the user. Information obtained after the image is generated is stored in the connection module 1100. To perform service, the connection module 1100 requests a redirection function from the management module 1300 using the generated image, and subsequent direct management is continuously performed by the management module 1300.

Thereafter, the virtual desktop manager device 1000 transmits the IP address and the connection port thereof to all servers registered in the same network, in a broadcasting manner at step S1100. Here, in order to transmit information to registered client devices without changing the registered client devices when the IP address of the server of the virtual desktop manager device 1000 is changed, the IP address and connection port of the virtual desktop manager device 1000 may be periodically transmitted or retransmitted at regular intervals when a new server is not connected.

Then, the virtual desktop manager device 1000 is operated by a TCP server and listens to the broadcast port at step S1200. Thereafter, when a connection request message (TCP connection) is received from the virtual desktop client device 2000 at step S1300, it is determined whether the client device has the same IP address as that of a client device registered in the management server at step S1400. When the client device has the IP address of a client device that is not registered, TCP connection is not processed at step S1500. In contrast, when the client device has a registered IP address, an access code is received from the client device at step S1600. Here, the access code may be configured to be changeable via the GUI of the virtual desktop manager device.

Thereafter, the access code transmitted from the virtual desktop client device 2000 is compared with a pre-stored access code, and information about whether the codes match each other is transmitted to the client device that is attempting to gain access at step S1700. Here, the result of transmission of the information about whether access codes match may be transmitted as a resulting value of '1' when the codes match each other, whereas the result may be transmitted as a resulting value of '0' when the codes do not match each other.

Meanwhile, when the access codes do not match each other, a result indicating that the access codes do not match each other is transmitted, and the corresponding connection is released at step S1800. In contrast, when the access codes match each other, a result indicating that the access codes match each other is transmitted at step S1900, and whether the virtual desktop agent of the virtual desktop client device is running normally is determined at step S2000. Here, by means of a separate thread or process, whether to maintain the connection of the virtual desktop agent may be determined. Here, in the case of TCP, the connection may be maintained using a keep-alive function, even if no data is being transmitted.

Figure 10:
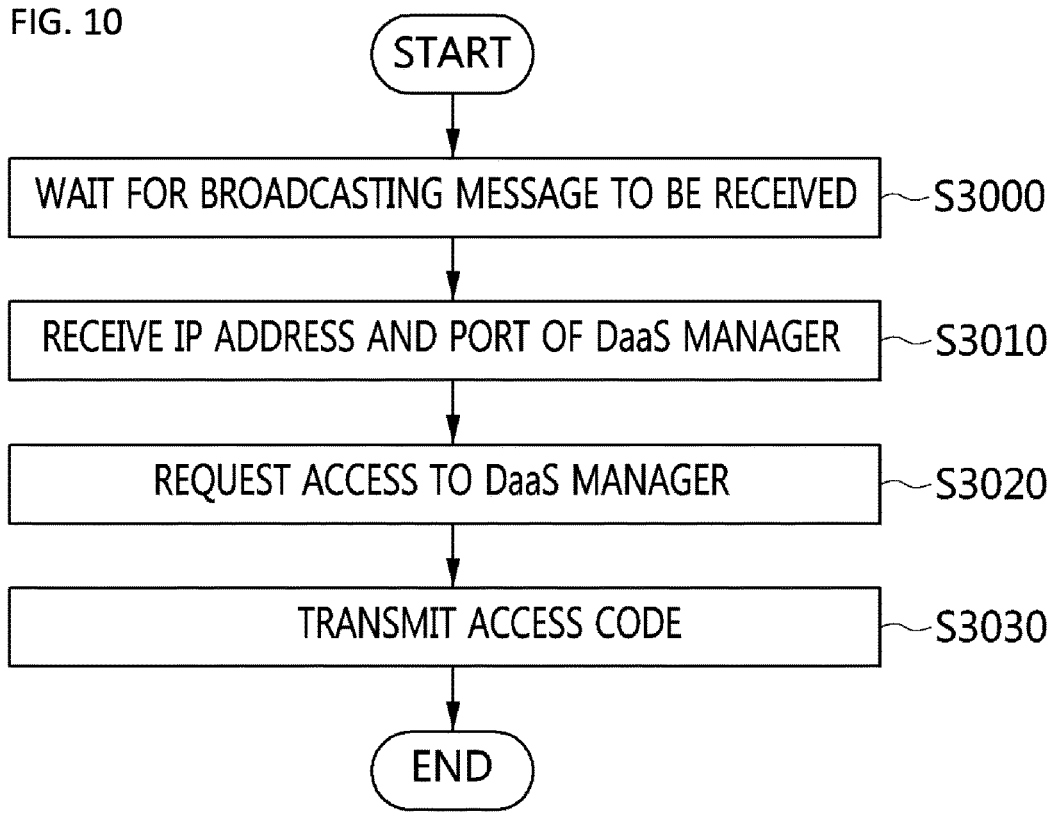
FIG. 10 is a flowchart showing a management method using the virtual desktop client device according to an embodiment of the present invention.

FIG. 10 is a flowchart showing a management method based on a virtual desktop client device according to an embodiment of the present invention.

Referring to FIG. 10, in the management method based on the virtual desktop client device according to the embodiment of the present invention, a virtual desktop agent waits for an IP address and port information to be received from the virtual desktop manager device 1000 when initially operated in order to access the virtual desktop manager device 1000 at step S3000. At this time, when the virtual desktop agent is operated, a broadcast receiver code is initially executed. When the TCP connection is released during the running of the virtual desktop agent after the TCP connection has been set up, the broadcast receiver code may be executed again. Thereafter, the virtual desktop agent receives the IP address and port of the virtual desktop manager device 1000 in a broadcasting manner at step S3010, and requests access to the virtual desktop manager device 1000 using the received IP address and port at step 3020.

Thereafter, when the connection is completed, the virtual desktop agent transmits an access code to the virtual desktop manager device 1000 at step S3030. Here, the access code may be stored as a separate file. Thereafter, the virtual desktop agent waits for the result of processing the access code. When an access error occurs, the connection is released, and thus the virtual desktop agent executes the broadcast receiver code again.

In accordance with the present invention, the user may access the virtual desktop service immediately after power has been applied to the client system. When the virtual machine of the virtual desktop service is terminated, the power of the client is also turned off, and thus an environment is provided in which users may be provided with virtual machine service without being aware of the OS or the virtual desktop client software that are used in order to operate the client.

In accordance with the present invention, a user OS image and a user disk image to be allocated to each user for the virtual desktop service may be promptly provided.

Also, since a prepared disk image is allocated, the number of operations of creating virtual machines and of copying images is reduced, thus greatly reducing the server load in a server virtualization environment.

Figure 11:
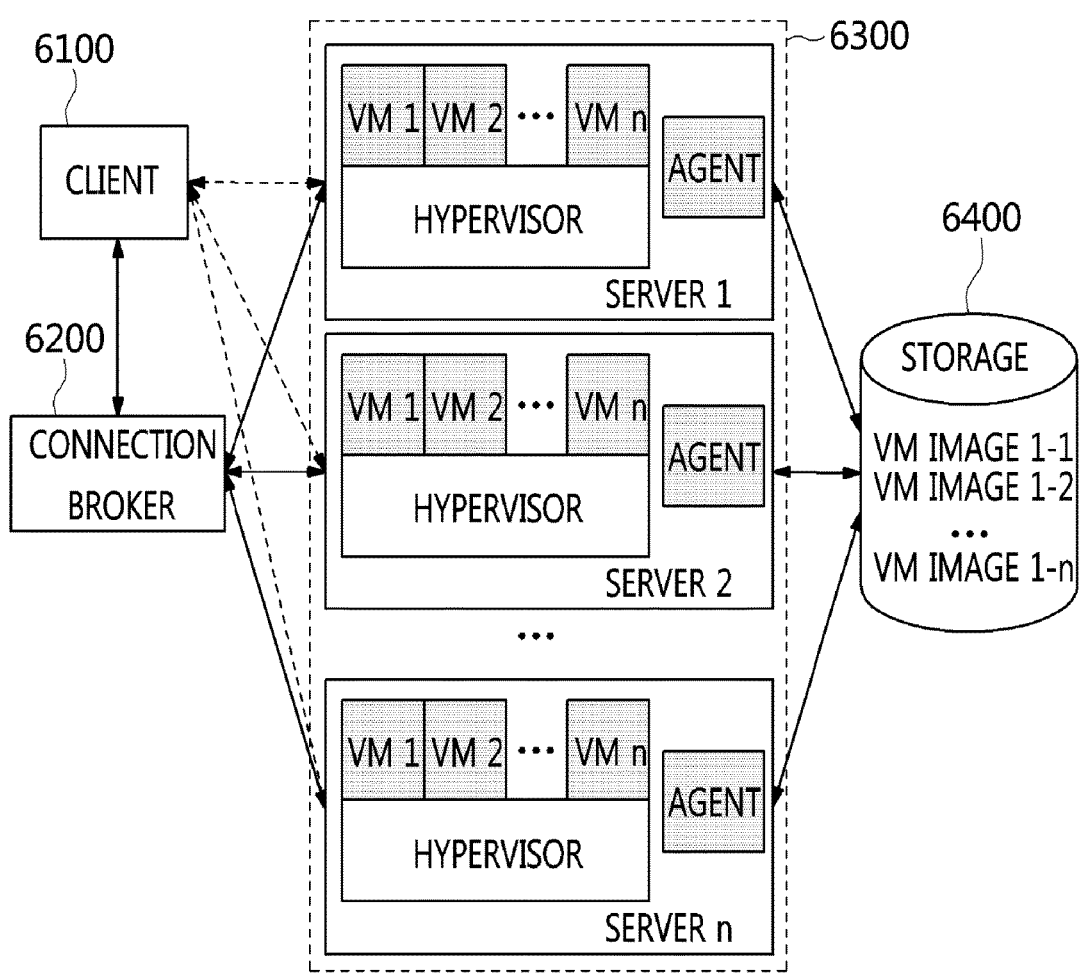
FIG. 11 is a diagram schematically showing a virtual desktop service structure according to an embodiment of the present invention.

FIG. 11 is a diagram schematically showing the structure of server-centered virtual desktop service according to an embodiment of the present invention.

Referring to FIG. 11, a virtual server-centered virtual desktop service structure 610 according to the present invention may be configured to include a client 6100, a connection broker 6200 (hereinafter also referred to as a "management server"), operation servers 6300, and shared storage 6400. Here, the client 6100 may denote one or more user terminals. The client 6100 may select user terminal registration information, such as 'Allocated User', 'Pooled User', or 'Multi-VM User', during the procedure for registering the management server 6200. In this procedure, depending on whether the above-described user terminal registration information is authorized by the manager of the management server 6200, a user request may be accepted or rejected. Alternatively, the form of the user terminal belonging to the client 6100 may be changed by a decision made by the manager during the procedure for registering the management server 6200. Alternatively, the user terminal registration information may be determined according to a previously defined policy. Alternatively, the user terminal registration information may be determined or changed in response to various requests, such as a service type based on the user's selection, in the procedure for registering the client 6100.

As shown in FIG. 11, the virtual desktop service structure 610 according to the present invention provides service in which a client program is installed on the user terminal and in which its own virtual machines (VMs), created on a hypervisor in the virtualization server of a data center or a service provider, may be used using a designated access protocol. To provide VMs to the client 6100 corresponding to the user terminal, user profile information (user information file), a user OS image, and a user disk image are required. The user OS image and the user disk image have a form such that they are shared by the operation servers 6300 using the shared storage 6400. The user profiles may be present in respective operation servers 6300. When a VM use request is received from the client 6100, the management server 6200 may perform task allocation or the like in consideration of user authentication and load distribution. Further, the VM use request may be processed via the agent programs of the operation servers 6300, each having a hypervisor. The operation servers 6300 may return the result of allocation or non-allocation of a VM to the client 6100 as a response to the VM use request depending on the processing of the VM use request.

In the present invention, the operation servers 6300 have the same use profiles for each user terminal, and are configured to share the same OS image and the same disk (storage) with each other. This configuration may support functions for improving availability so that, when one operation server 6300 is interrupted, another operation server 6300 may provide service in place of the operation server 6300 that is interrupted. For this, each operation server 6300 may include at least one VM provided to the client, a hypervisor for supporting the execution of the VM, and an agent for invoking an OS image and a user disk image, which are pre-stored in the shared storage, and supporting the provision of the VM to the client. The agent may support the generation of the OS image and the user disk image related to the client using an image generator, and may perform control such that the OS image and the user disk image are stored in the shared storage.

In the present invention, VMs are allocated by classifying user terminals depending on the method of using VMs so as to support the desktop service. Here, the management server 6200 may classify user terminal registration information into types corresponding to an allocated user (or a dedicated user), a pooled user, and a multi-VM user.

An 'allocated user' is a user who continuously uses a VM allocated (dedicated) to him or her, and permanently has his or her own VM. Basically, allocated users may be divided into users based on a preset or manual scheme. The preset scheme is a method by which a service provider determines the VM environment of the user in advance and provides the VM environment. The manual scheme is a method by which the user may set his or her VM. A 'pooled user' is a user who possesses a VM to be used only once. When a user terminal classified as a 'pooled user' type logs off the operation server, the VM that was used by the user is deleted. When the user accesses the operation server again, a new VM is allocated to the user terminal. When the pooled user disconnects his or her terminal from the operation server, the operation server 6300 does not store the user's personal profile. A 'multi-VM user' is a user designated such that a single user can use multiple VMs.

Figure 12:
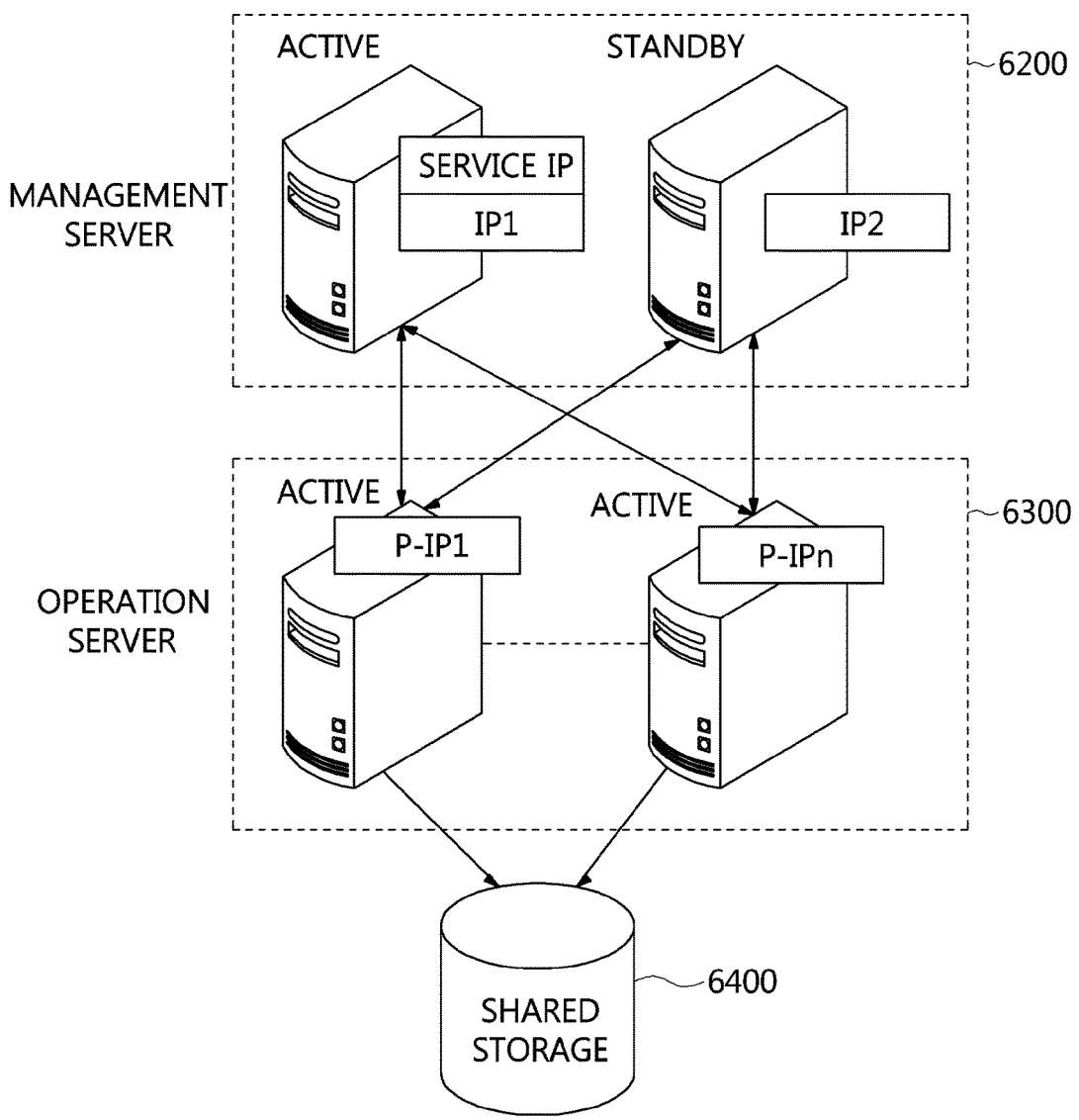
FIG. 12 is a diagram showing server components among all components constituting a server virtual machine provision system for providing a High Availability (HA) server virtual machine according to an embodiment of the present invention.

FIG. 12 is a diagram showing the server components of the overall configuration of a High Availability (HA) server VM provision system according to an embodiment of the present invention.

As shown in FIG. 12, in the server VM provision system of the present invention, the management server 6200 is configured in an active-standby form for HA, and the remaining operation servers 6300 may be configured in an active-active form. The server VM provision system provides cross-validation of the states of the management server 6200 and the operation servers 6300 by clustering all of the servers 6200 and 6300. The server VM provision system according to the present invention supports the operation servers 6300 so that multiple user VMs are distributed to and present in various operation servers (at least two operation servers), rather than locating the user VMs in a single operation server 6300, as described above with reference to FIG. 11. Accordingly, the server VM provision system according to the present invention may seamlessly and continuously provide virtual desktop service by allocating virtual machines from another operation server to the client 6100 corresponding to the user terminal when a failure occurs in the specific operation server from which VMs have been allocated.

Figure 13:
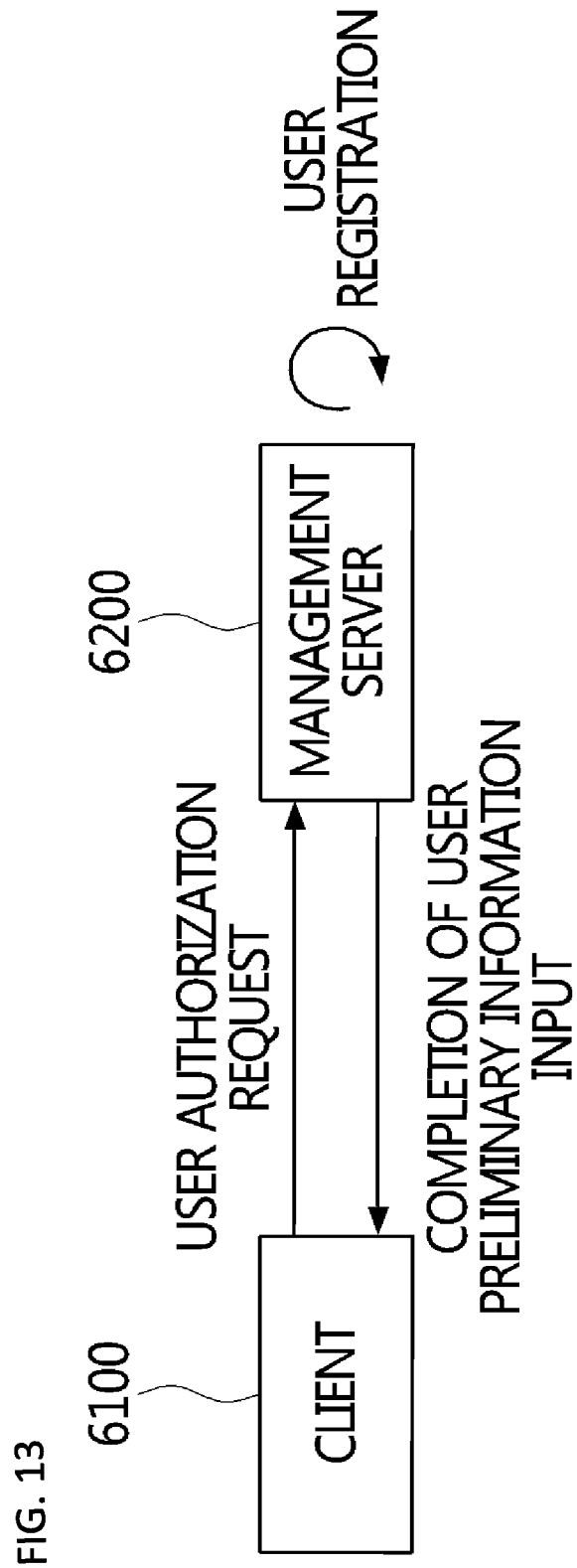
FIG. 13 is a diagram showing user authorization in the virtual desktop service according to an embodiment of the present invention.

FIG. 13 is a diagram showing user authorization in virtual desktop service according to an embodiment of the present invention.

Referring to FIG. 13, the client 6100 corresponding to each user terminal must be authorized to use its own VM in order to operate the virtual desktop service according to the present invention. For this, the client 6100 may access the management server 6200 using a communication module. Next, the client 6100 may enter basic preliminary information for user registration. Here, the client 6100 enters his or her personal information (a name, a unique ID, an address, an email address, a phone number, etc.) required to use VMs, and may then request the allocation of VMs from the service provider, for example, the management server 6200. In this procedure, the client 6100 may use various methods, such as by directly requesting, via a web interface provided by the management server 6200, the provisioning of VMs or by requesting such provision by email. Further, in a typical company, a public institution, etc., user information may be provided at one time to the manager of a service provider, for example, the manager of the management server 6200, without the user terminal directly requesting the provision of VMs. For this, the management server 6200 may support a manager direct registration method that uses a management tool for registering user information at one time.

When the user has been authorized to use VMs, the client 6100 sets its own login ID and password using a web interface or a client program, and performs a procedure for logging in to the management server 6200. Here, when the login ID and password are set, the user terminal may generate a login ID and a password as essential item fields (e.g. a resident registration number, an employee identification number or an ID designated by a service provider). The management server 6200 may perform the procedure for authenticating the information contained in the essential item fields and the login information of the client 6100, based on preset information.

Figure 14:
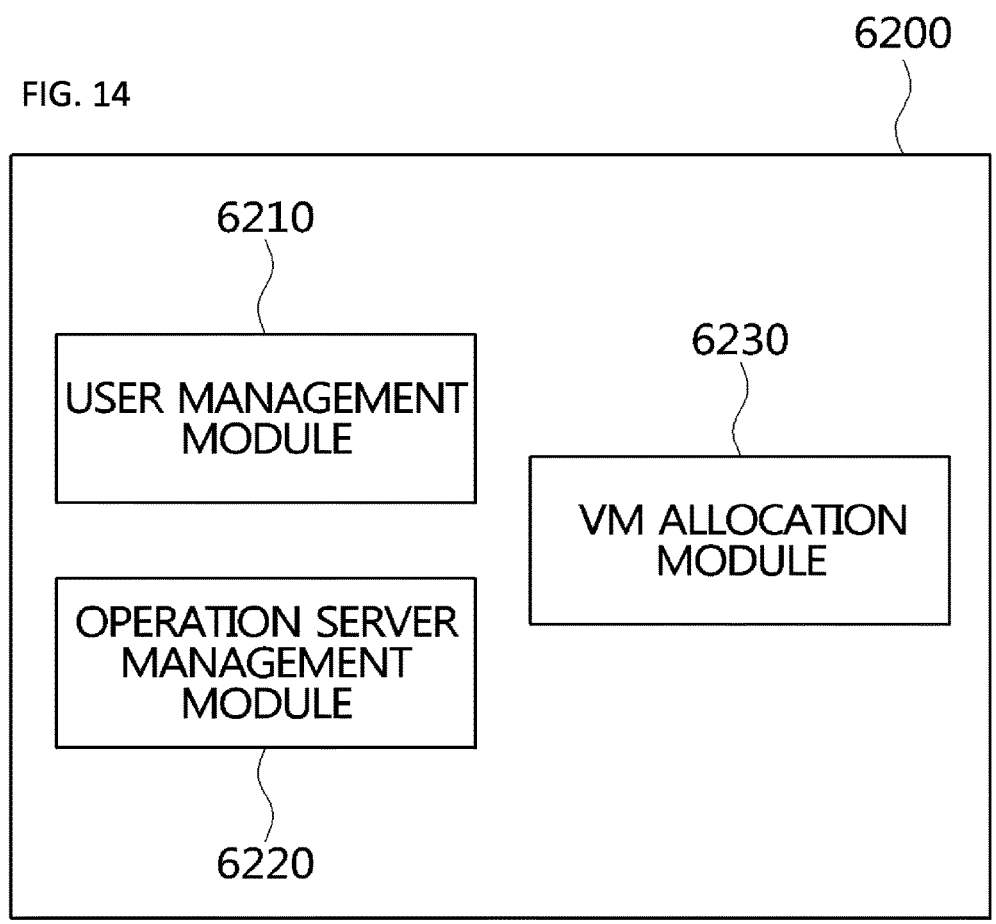
FIG. 14 is a diagram schematically showing the configuration of a management server for supporting virtual desktop service according to an embodiment of the present invention.

FIG. 14 is a diagram schematically showing the configuration of a management server for supporting a virtual desktop service according to an embodiment of the present invention.

Referring to FIG. 14, the management server 6200 of the present invention may include a user management module 6210, an operation server management module 6220, and a VM allocation module 6230.

The user management module 6210 supports access by the client 6100, the registration of user information, etc. The user management module 6210 may establish a communication channel with the client 6100 by controlling the communication module of the management server 6200, and may provide a web page or the like prompting the client 6100 to register user information. Alternatively, when an email or the like in which user information is set forth is received from the client 6100, the user management module 6210 may register the user information by parsing the user information. In this procedure, the user management module 6210 may classify pieces of user terminal registration information for respective clients 6100. For example, the user management module 6210 may classify user terminals into a user terminal for a 'allocated user', to which server VMs are to be semi-permanently allocated, a user terminal for a 'pooled user' to which server VMs are to be allocated, and a user terminal for a 'Multi-VM user' to which server VMs are to be allocated, for respective clients 6100. For this, the user management module 6210 may provide the client 6100 with an item enabling any one of multiple pieces of user terminal registration information to be selected. In this procedure, the user management module 6210 may record the classification of user terminal registration information related to the allocation of server VMs according to a billing policy. When a client 6100 for which a separate item is not selected accesses the user management module 6210, the user management module may classify the user of the corresponding user terminal as a 'pooled user'.

The operation server management module 6220 may manage the states of multiple operation servers. For example, the operation server management module 220 may allocate information about the states of server VMs allocated by the operation servers. Further, the operation server management module 6220 may transfer the information about the states of the operation servers to the VM allocation module 6230. Meanwhile, the operation server management module 6220 may transfer the user terminal registration information provided by the client 6100 to the operation servers.

The VM allocation module 6230 may receive information about access by the client 6100 from the user management module 6210, and may check the user terminal registration information. Further, the VM allocation module 6230 may determine which server VMs are to be allocated, based on the user terminal registration information. For example, the VM allocation module 6230 may determine whether to provide a previously allocated server VM, to provide a temporary server VM, or to provide information about multiple server VMs and provide a selected specific server VM to the client 6100 that has logged in. When the allocation of server VMs has been determined, the VM allocation module 6230 checks the information about the states of the operation servers from the operation server management module 6220. Then, the VM allocation module 6230 may request the allocation of server VMs from at least one operation server depending on the states of the operation servers. Furthermore, the VM allocation module 6230 may receive information about access to server VMs and access permission information thereof from the corresponding operation server, and may transfer the received information to the client 6100. Meanwhile, when the operation server 6300 is designed such that it is capable of directly transmitting the server VM access information and the access permission information to the client 6100, the VM allocation module 6230 may not perform the task of transmitting information related to server VMs.

The VM allocation module 6230 may be involved in the control of OS images and user disk images, which are required in order to provide the VMs of the client 6100. For example, the VM allocation module 6230 may support the control of the operation of image generators that generate OS images and user disk images or the control of a specific operation server 6300 for operating the image generators. Accordingly, the VM allocation module 6230 may control the storage of OS images and user disk images in the shared storage 6400. Information about the positions of the OS images and the user disk images in the shared storage 6400 may be provided to the operation server 6300 so that the OS images and the user disk images may be used in a procedure in which the operation server 6300 provides VMs. When the operation server 6300 is directly involved in the generation and storage of OS images and user disk images, a function related to the image generators may be omitted from the VM allocation module 6230.

Figure 15:
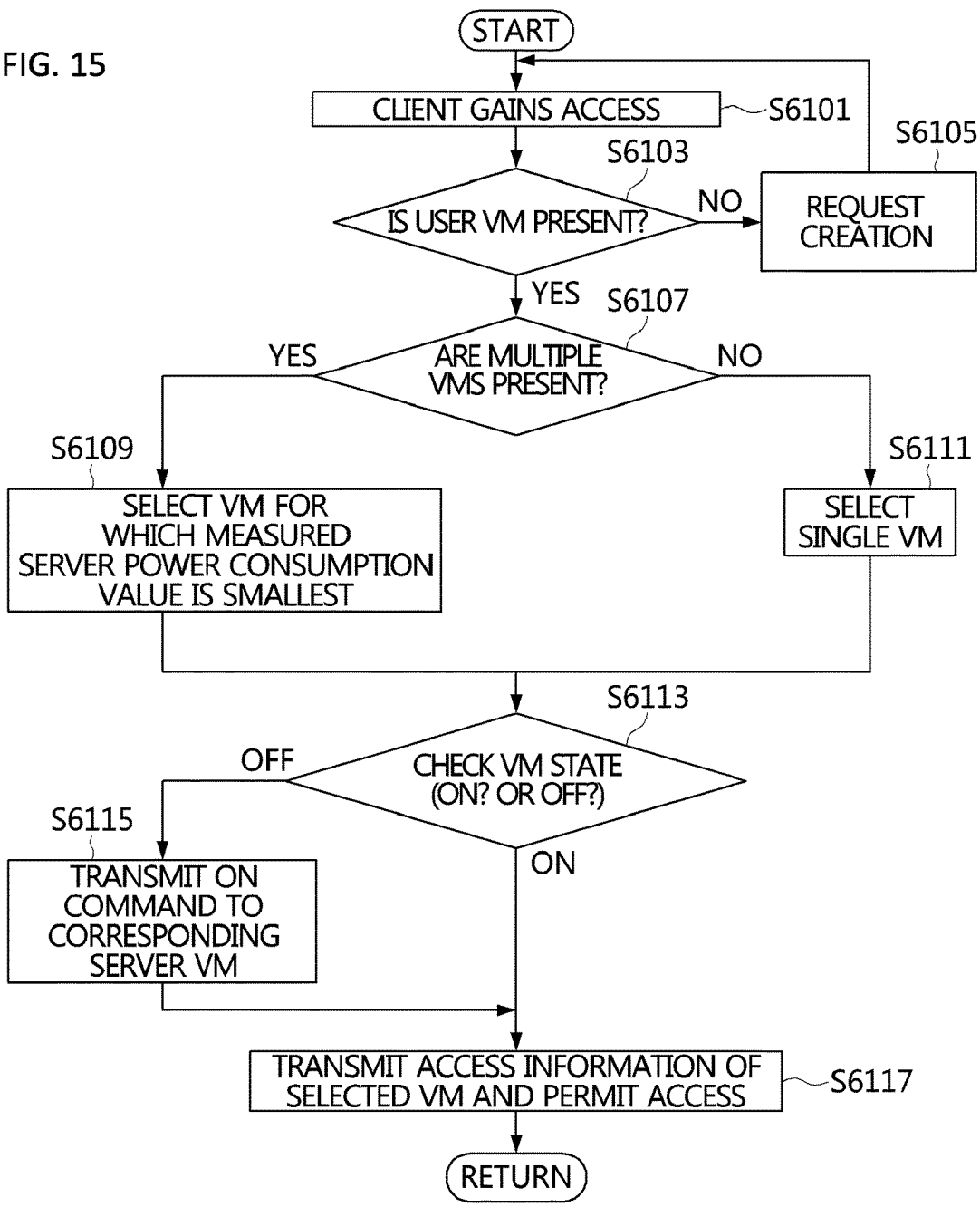
FIG. 15 is a diagram showing the creation and allocation of a virtual machine for an allocated user type in the virtual desktop service according to an embodiment of the present invention.

FIG. 15 is a diagram showing the creation and allocation of a VM for an 'allocated user' in the virtual desktop service according to an embodiment of the present invention. In FIG. 15, when the client 6100 performs an initial login procedure, the management server 6200 may perform a procedure for checking which user terminal registration information the client 6100 has and determining which VMs are to be allocated based on the checked information.

Referring to FIG. 15, when the client 6100 accesses the management server 6200 at step S6101, the management server 6200 checks the user terminal registration information of the client, and may perform a procedure for generating and allocating server VMs for the client 6100 when the user terminal registration information contains information about an allocated user. For this, when the client 6100 corresponding to the allocated user accesses and logs in to the management server 6200, the management server 6200 may determine whether there is a user VM allocated to the client at step S6103.

When no user VM is allocated to the client 6100, the process of the management server 6200 branches to the step S6105 of requesting the client 6100 to create a VM. For this, the management server 6200 may send a VM creation request message to the client 6100 using a webpage, a message, or the like. Then, the client 6100 performs a procedure for creating a VM, either in conformity with the characteristics of the user terminal or in response to the user request. Here, when the creation of the VM fails, the client 6100 may perform the operation by requesting the creation of a VM from the manager of the management server 6200. When the creation of the VM has been completed, information about the created VM is stored in a DB. When the client 6100 logs in to the management server 6200 using the value stored in the DB, the management server 6200 may determine again whether the user VM of the client 6100 is present. As described above with reference to FIGS. 11 and 12, each management server 6200 and each operation server 6300 may constitute a type of system that supports both a load distribution function, in which multiple identical VMs are present, and a failover (failure overcoming) function.

Meanwhile, when a user VM is present at step S6103, the process of the management server 6200 may branch to the step S6107 of determining whether multiple VMs are allocated to the client 6100. Here, when there are multiple VMs, the process of the management server 6200 branches to the step S6109 of performing control such that the VM for which a measured server power consumption value is smallest is selected from among the multiple VMs. For this operation, the management server 6200 may check the characteristics of operation servers and may perform control such that the operation server having better data processing characteristics is selected. In contrast, when a single VM is allocated to the client 6100 at step S6107, the process of the management server 6200 may branch to the step S6111 of performing control such that the single VM is selected.

Next, the management server 6200 may check the state of the selected VM and determine whether the selected VM is in an ON state or an OFF state at step S6113. When the selected VM is in an OFF state, the process of the management server 6200 may branch to the step S6115 of transmitting an ON command to the corresponding server VM. Thereafter, the process of the management server 6200 may branch to the step S6117 of supporting access so that information about access to the selected VM is transmitted to the client 6100 while access permission information is transmitted to the client 6100.

Figure 16:
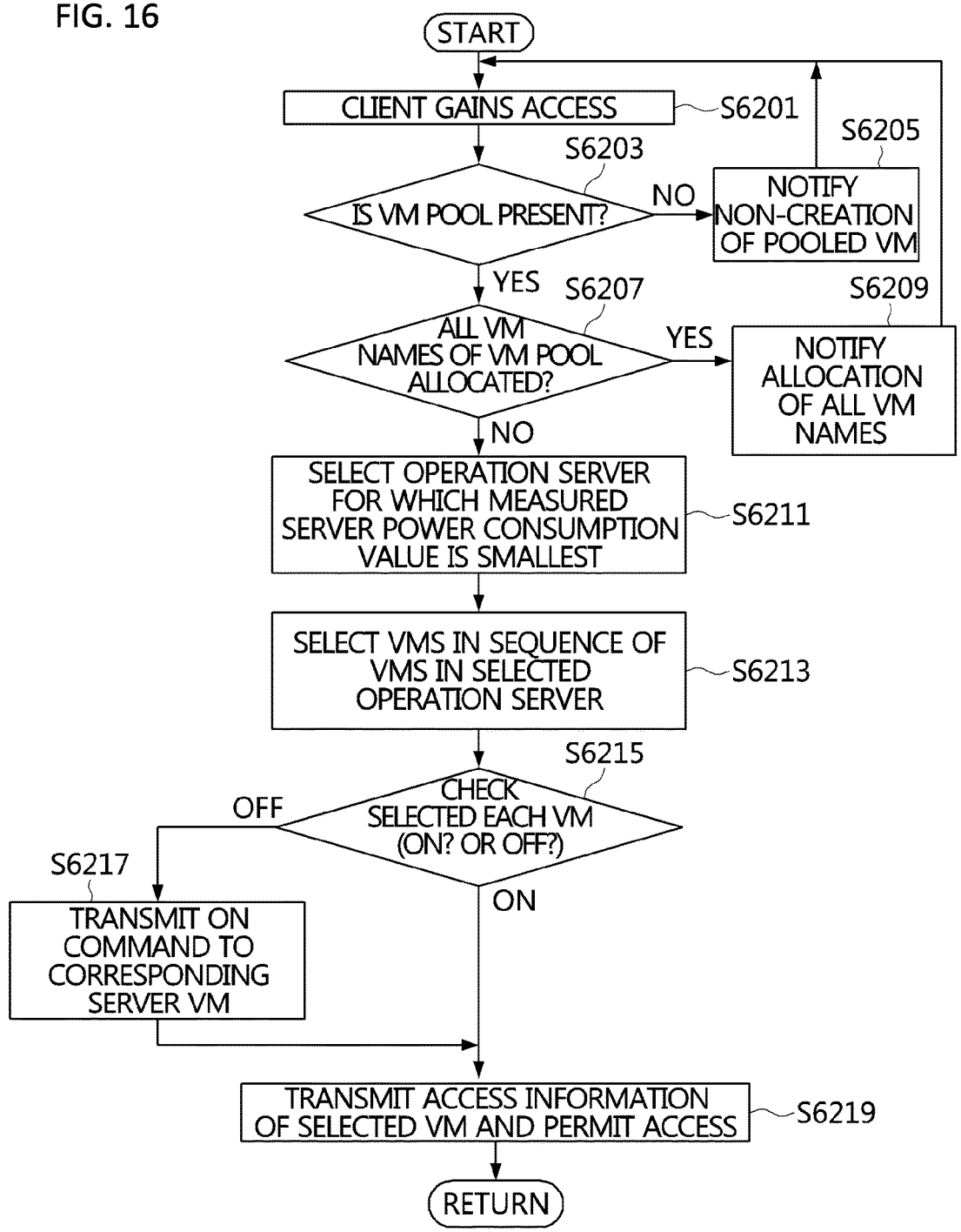
FIG. 16 is a diagram showing the creation and allocation of a virtual machine for a pooled user type in the virtual desktop service according to an embodiment of the present invention.

FIG. 16 is a diagram showing the creation and allocation of a VM for a pooled user in the virtual desktop service according to an embodiment of the present invention.

Referring to FIG. 16, when a client accesses the management server 6200 at step S6201, user terminal registration information may be checked by utilizing login information that is acquired when the client accesses the manager server 6200. Further, when the user terminal registration information is the 'pooled user' type, the management server 6200 determines that a VM allocated to the client 6100 is not present, and branches to the step S6203 of determining whether there is a VM pool.

When there is no VM pool at step S6203, the process of the management server 6200 may branch to the step S6205 of notifying the client 6100 that a pooled VM is not been created. Then, the client 6100 may undergo a series of procedures for requesting the creation of a VM pool using any of various schemes such as access to a web interface or sending an email, and performing operations for the request so as to use server VM service. The client 6100 may access the management server 6200 again after the VM pool creation procedure has been completed.

When there is a VM pool at step S6203, the process of the management server 6200 may branch the step S6207 of checking whether all VM names in the VM pool have been allocated. Further, when all VM names in the VM pool have already been allocated, the process of the management server 6200 may branch to the step S6209 of notifying the client 6100 having requested the allocation of VMs that all VMs have been allocated. That is, the management server 6200 may inform the client 6100 that there is no VM to be allocated. Here, the management server 6200 may provide information about the expected waiting time to the client 6100 based on experimentally obtained statistical information or the like.

Meanwhile, when not all VM names in the VM pool have been allocated at step S6207, that is, when there is a VM name that is allocable to the client 6100, the process of the management server 6200 may branch to the step S6211 of selecting the operation server, for which the smallest server power consumption value is measured, from among the operation servers belonging to the VM Pool. Further, the management server 6200 may select VMs to be allocated in the sequence of VMs included in the selected operation server at step S6213. Thereafter, the management server 6200 may check the state of each selected VM at step S6215. When the VM is in an OFF state, the process may branch to the step S6217 of transmitting an ON command to the corresponding server VM. The management server 6200 may transmit information about access to the selected VM and the access permission information to the client 6100 at step S6219.

The above-described management server 6200 according to the present invention supports the allocation of VMs so that a temporarily available VM may be allocated from the VM pool to a pooled user. In the present invention, the VM belonging to the VM pool is implemented as a VM that was previously created by the operation server 6300 under the control of the management server 6200, and thus a function of creating a VM at the request of the client 6100 is not supported.

Figure 17:
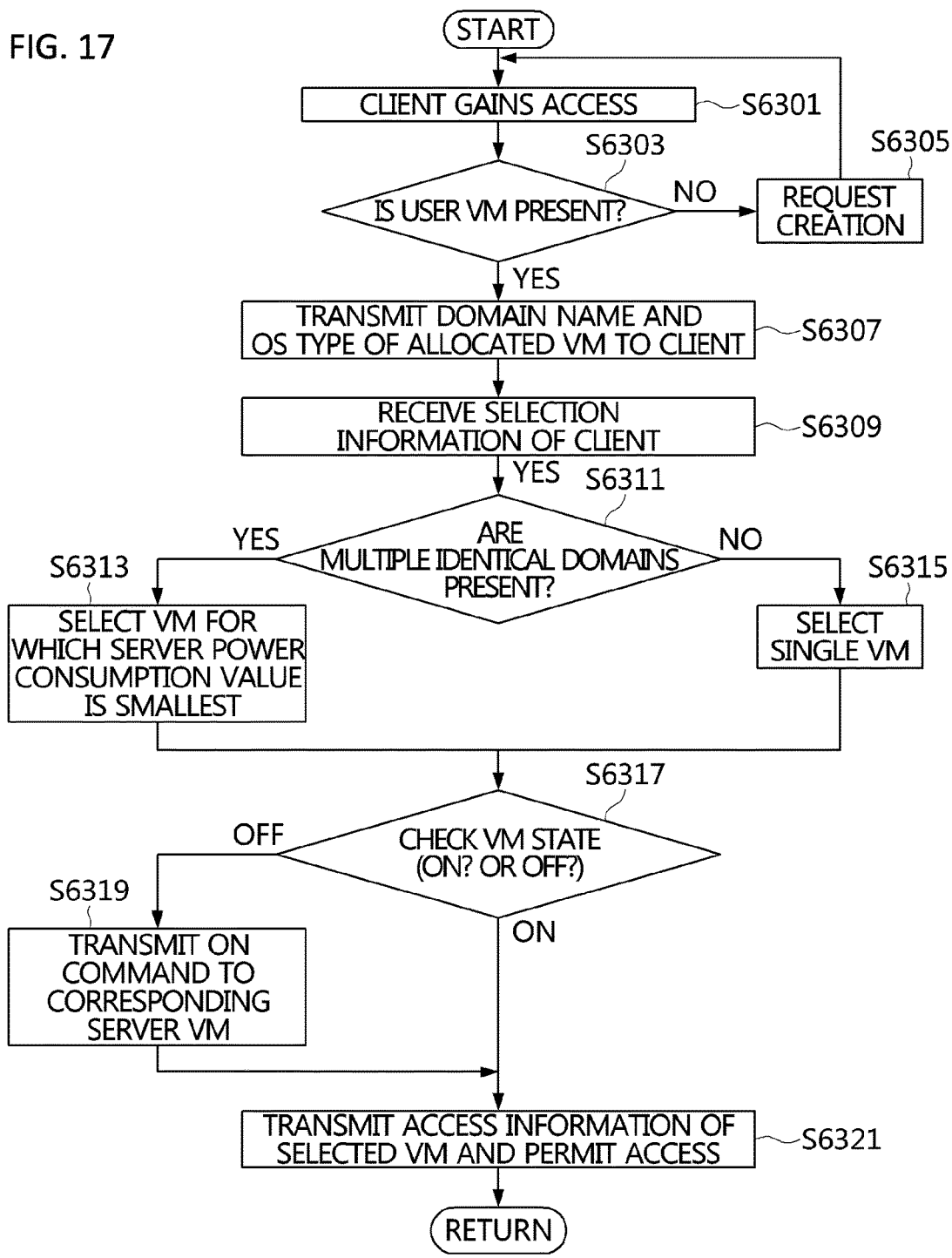
FIG. 17 is a diagram showing the creation and allocation of a virtual machine for a multi-VM user type in the virtual desktop service according to an embodiment of the present invention.

FIG. 17 is a diagram showing the creation and allocation of a VM for a multi-VM user in the virtual desktop service according to an embodiment of the present invention.

Referring to FIG. 17, in order to provide a virtual desktop service according to the present invention, the management server 6200 may support the processing of access by a client at step S6301. The client 6100 may perform a login procedure when accessing the management server 6200. In this procedure, the management server 6200 may identify that the client is a multi-VM user by checking user terminal registration information, and may determine whether there is any user VM allocated to the client 6100 at step S6303. When there is no user VM, the management server 6200 may transmit a user VM creation request to the client 6100 at step S6305. Then, the client 6100 may perform a process for creating a user VM using one of various schemes such as access to a web interface or sending an email. In contrast, when there is a user VM at step S6303, the management server 6200 may transmit the domain name and OS type of the allocated user VM to the client at step S6307. Depending on the user terminal registration information that is the 'multi-VM user' type, the client 6100 may have multiple VMs that are allocated. Accordingly, the management server 6200 transmits information about all VMs allocated to the client 6100. For this, the management server 6200 may collect and manage information about the allocation states of VMs by the operation servers 6300.

Thereafter, the management server 6200 may receive information about the VM selected by the client 6100 at step S6309. In this procedure, the client 6100 may transmit information about the selection of the VM, desired to access thereby, from among multiple VMs provided by the management server 6200, to the management server 6200. The management server 6200 may determine whether there are multiple identical domains at step S6311. When there are multiple identical domains, the process of the management server 6200 may branch to the step S6313 of selecting a VM in the domain in which server power consumption is lowest from among the multiple domains. In contrast, when there is a single identical domain, the management server 6200 may select a single VM at step S6315. Thereafter, the management server 6200 may check the state of the selected VM at step S6317. When the VM is in an OFF state, the process may branch to the step S6319 of transmitting an ON command to the corresponding server VM. The management server 6200 may transmit access information and access permission information for the selected VM being in the ON state to the client 6100.

As described above, in order to allocate a 'multi-VM user' type-VM according to the present invention, the management server 6200 supports the client 6100 so that the client 6100 may select the VM desired to be accessed. The operation performed after the client 6100 selects a VM may be performed by allocating a VM and accessing the VM using the same method as the above-described method of the allocated user type.

Meanwhile, in the case of the allocated user type and the multi-VM user type, only a user previously registered as a user may create his or her VM on the client. The client 6100 creates a VM by inputting information about the name of the VM to be used thereby, the number of CPUs, the size of memory, the size of storage space, and the OS to be used. The above-described function may be requested by the manager rather than the user, and the requested information may be executed by the manager in local space using a management tool.

Figure 18:
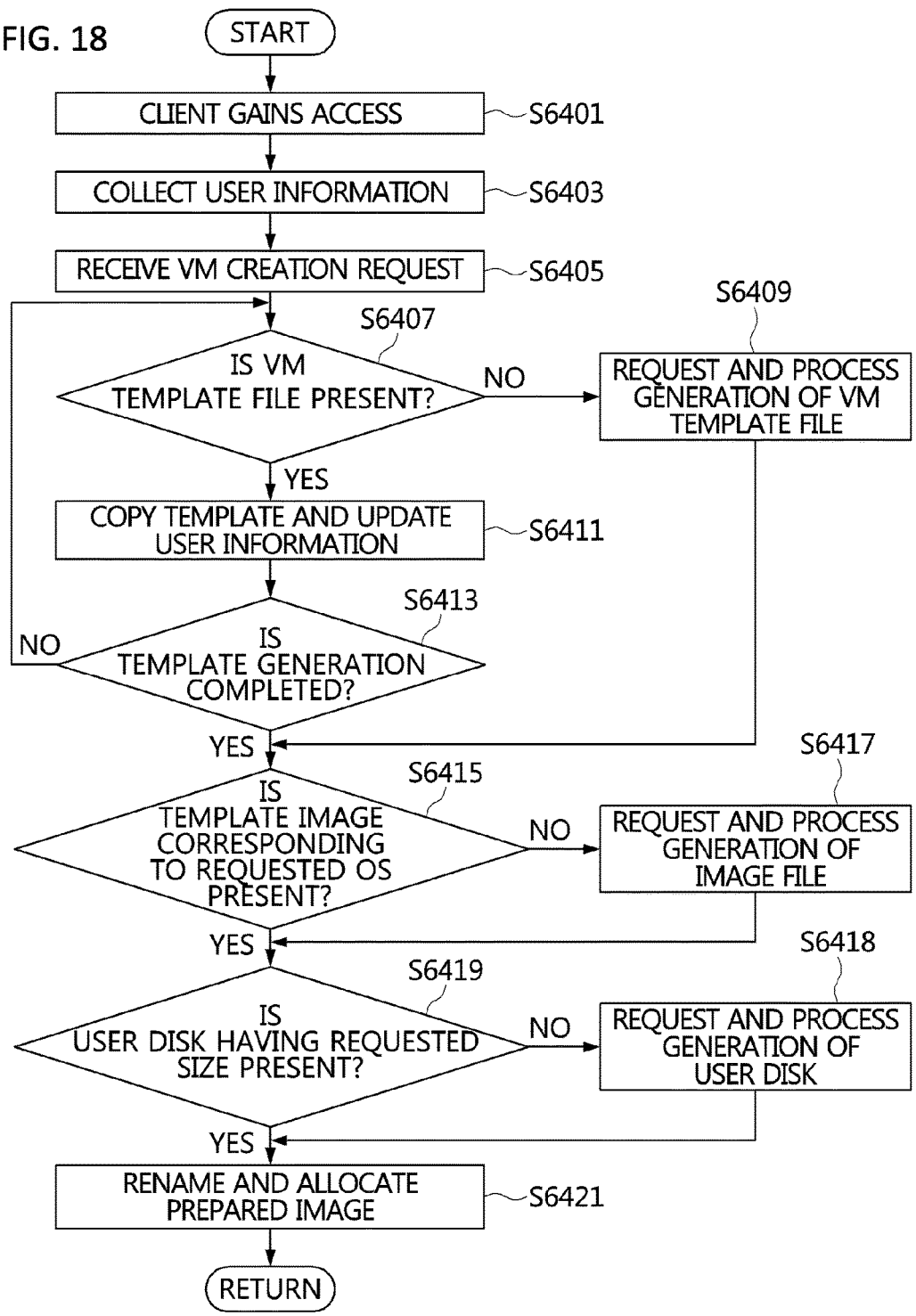
FIG. 18 is a flowchart showing a method for creating a virtual machine at the request of a user.

FIG. 18 is a diagram illustrating a method for creating a VM in response to a user request.

Referring to FIG. 18, the client 6100 accesses the management server 6200 at step S6401, and may request VM information from the management server 6200. The management server 6200 may collect user information input by the client 6100 at step S6403, and may receive a VM creation request at step S6405. Here, the user information may be information about resources and an OS to be used in the VM. The management server 6200 may transmit a VM creation request to the operation server 6300 using the user information, and the operation server 6300 may generate a VM template file. In this procedure, the operation server 6300 may check whether there is a VM template file corresponding to the user information at step S6407. Here, if there is no VM template file, the process may branch to the step S6409 of requesting and processing the generation of a VM template file.

When the VM template file generation request is transmitted to the client 6100, the client 6100 may perform a procedure for generating a VM template file in response to the VM template file generation request. The VM template file is a file in which the attributes of VMs that are used are stored, and may be serviced only when a golden template file, preset by the manager, is present. If there is no preset golden template file, the client 6100 may be supported so that a VM template file is generated using a template generator, and tasks related to the VM creation request may be temporarily stopped until the golden template file is generated. When there is a VM template file at step S6407, the process of the operation server 6300 may proceed to the step S6411 of copying the template and updating the user information. Thereafter, the operation server 6300 may determine whether the generation of the template has been completed at step S6413, and may return to a procedure prior to step S6407 when the generation of the template is not completed.

When the generation of the VM template file is completed at step S6413, the operation server 6300 allocates the OS image and user disk of the client 6100, and checks whether a previously generated template image is present at step S6415. At this step, when there is no template image corresponding to the OS requested by the client 6100, the process branches to the step S6417 of requesting the generation of a template image from the client 6100 and processing the generation of the template image. Here, in order to generate the template image, the generation of a file using an image generator is requested, and the current task is temporarily stopped. At step S6415, when there is a template image, whether a user disk having the size requested by the client 6100 is present may be determined at step 6419. When there is no such user disk, the generation of a user disk image may be requested from the client 6100 and the generation of the user disk image may be processed at step S6417. When a template image and a user disk are present, the operation server 6300 may rename the template file according to the name set in the template file and allocate the renamed template file to the client 6100 at step S6421, and may also rename the user disk using the same method.

Meanwhile, the template image generation request and the user disk image generation request in the aforementioned process may be processed under the control of the operation server 6300 or under the control of the management server 6200. When the template image generation request and the user disk image generation request are processed under the control of the management server 6200, the operation server 6300 may transmit the image generation request to the client 6100 through the management server 6200, and the client 6100 may process the image generation request through the management server 6200. Alternatively, when the operation server 6300 is designed to establish a communication channel with the client 6100 and support the transmission and processing of an image generation request, the client 6100 may also process the image generation request through the operation server 6300.

Meanwhile, to establish the above-described VM creation flow, the manager prepares a template file for service in advance and allows the template file to be recognized by the system.

The OS image and disk image of the user may be provided in response to a generation request received from the client 6100 in the state in which they are prepared in advance. For this operation, the client 6100 may generate the OS image and the user disk image in advance using a template file generator and an image generator. Accordingly, a basic golden template file and a basic golden image file may be generated and stored before VMs are allocated, and may be used to operate the system. The golden image file and the golden template file implemented in this way may be provided in real time when they are requested by the client 6100, and may be used to simply copy and reconfigure template files, to previously copy template images, to maintain a specific number of template images, and to rename the template images.

Since the size of a template file is not large, a method for simply copying the template file may be adopted. However, since an OS image has a large size, it is efficient to use a method for driving an image generator and setting, in advance, OS images and user disk images, which are to be provided when being requested, in order to request OS images from a VM in real time.

Figure 19:
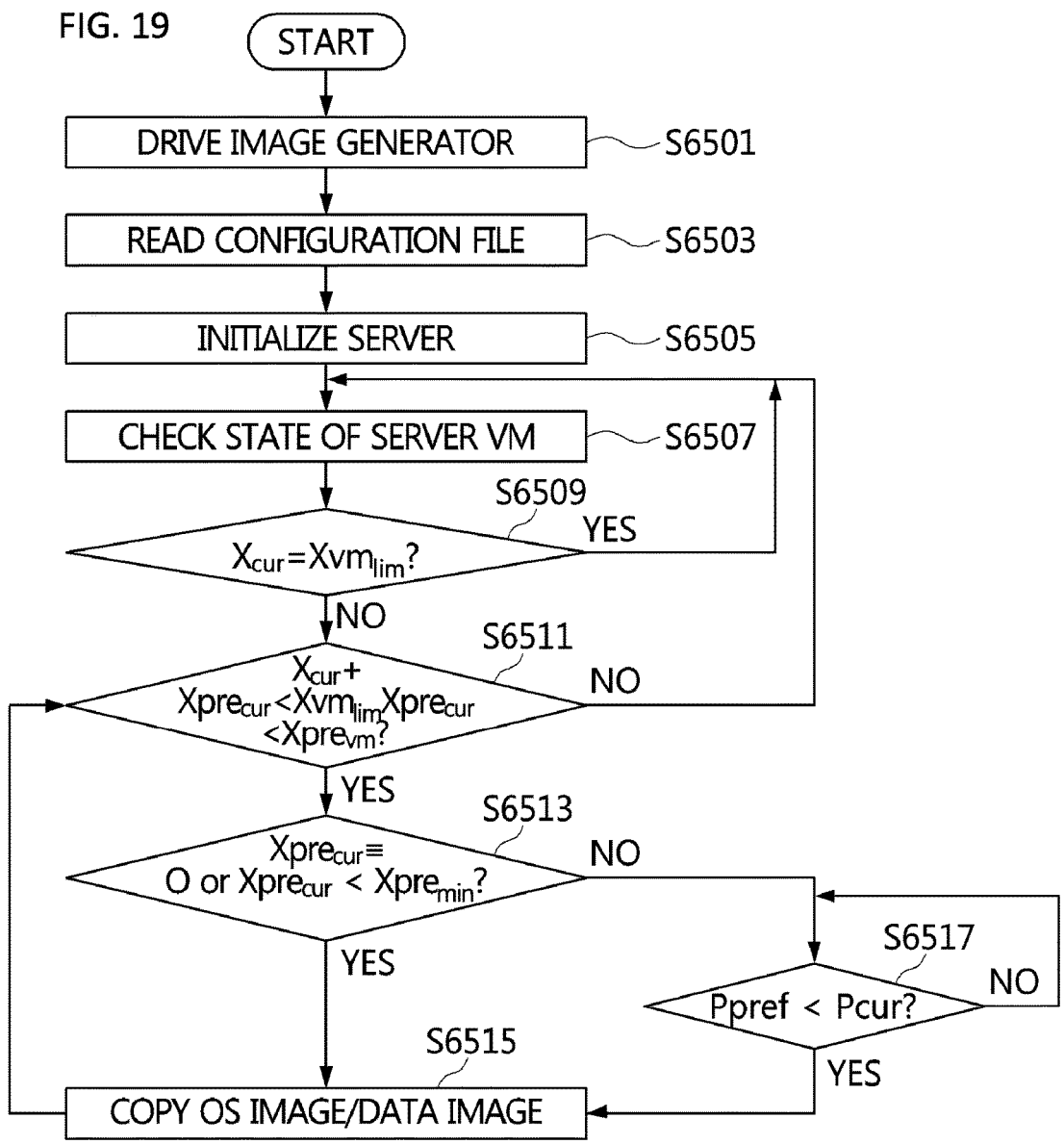
FIG. 19 is a flowchart showing the operation of an image generator according to the present invention.

FIG. 19 is a flowchart showing the operation of an image generator according to the present invention.

Referring to FIG. 19, the operation server 6300 drives an image generator in order to operate the image generator according to the present invention at step S6501. Further, the operation server 6300 may read a configuration file at step S6503. As the values of an initial configuration file, the values of $Xvm_{limit}$ and $Xpre_{vm}$, the type of OS that is used, and the positions of a golden image file and a golden template file may be fetched.

Next, the operation server 6300 may perform server initialization at step S6505. In the server initialization task, items related to the configuration file are checked. The operation server 6300 may temporarily stop its operation when neither a golden image file nor a golden template file is present. Thereafter, the operation server 6300 may check the states of server VMs at step S6507. The operation server 6300 may check whether the number of current VMs (Xcur) is identical to the maximum number of images ($Xvm_{limit}$) that can be installed per operation server at step S6509. That is, when the above-described initialization task is performed, the operation server 6300 checks the number of current VMs (Xcur) and determines whether the number of current VMs (Xcur) is identical to $Xvm_{limit}$. When the values are identical to each other, no more VMs can be installed in the corresponding operation server, and thus the process returns to the procedure prior to step S6507, where the states of the server VMs are continuously checked.

Meanwhile, when Xcur is not identical to $Xvm_{limit}$ at step S6509, the operation server 6300 may determine whether the condition given in the following Equation (1) is satisfied at step S6511.

$$Xcur + Xpre_{cur} < Xvm_{lim}Xpre_{cur} < Xpre_{vm} \quad (1)$$

In Equation (1), Xcur denotes the total number of current VMs, $Xpre_{cur}$ denotes the number of VMs that are currently prepared, $Xvm_{limit}$ denotes the number of images that can be installed per operation server, and $Xpre_{vm}$ denotes the maximum number of images that can be maintained per operation server.

When the condition of $Xvm_{lim}Xpre_{cur}$ is not satisfied at step S6509, the process of the operation server 6300 may return to the procedure prior to the step S6507 of controlling the process such that the subsequent procedure is performed again. Further, when the above condition is satisfied at step S6509, the process of the operation server 6300 may branch to the step S6513 of determining whether the following Equation (2) is satisfied.

$$Xpre_{cur} = O \text{ or } Xpre_{cur} < Xpre_{min} \quad (2)$$

In Equation (2), $Xpre_{cur}$ denotes the number of VMs that are currently prepared, and $Xpre_{min}$ denotes the minimum number of images that can be maintained per operation server.

When the condition stated at step S6513 is satisfied, the operation server 6300 may copy OS images and data images at step S6515. Thereafter, the process of the operation server 6300 may return to the step S6511 of determining whether the corresponding condition is satisfied. In contrast, when the corresponding condition is not satisfied at step S6513, the process of the operation server 6300 may branch to the step S6517 of determining whether an availability value Ppref, by which the operation server may be operated, is lower than a server availability value Pcur. That is, the operation server 6300 checks a measured server power consumption value or a server availability value, and copies images after waiting until the availability value Pref becomes lower than Pcur. Such an operation is a method for improving the utilization of CPUs attributable to the copying of the servers.

Meanwhile, although the driving of the image generator has been described as being performed by the operation server 6300, the present invention is not limited thereto. That is, the image generator may be provided by the management server 6200 to the client 6100, may support the generation of OS images and user disk images, and may then support the storage of images such that the OS images and user disk images are stored in the shared storage 6400, either directly or through the operation server 6300. The management server 6200 and the operation server 6300 may manage information about the positions of the OS images and the user disk images stored in the shared storage 6400 for respective clients in order to provide VMs.

As described above, the method and system for providing server VMs and the apparatus supporting the method according to the embodiments of the present invention may support the provision of different types of VMs depending on the user terminal registration information or the type of user terminal, previously registered by the client 6100, corresponding to the user terminal. Such an operation may consequently support the provision of images so that user OS images and user disk images to be allocated to the client 6100 can be provided within a short period of time, and may improve the speed of VM allocation. Also, since the present invention allocates prepared image files, the number of operations such as the creation of VMs or copying of images is minimized, and thus a server load may be minimized.

The virtual desktop provision method and server according to the present invention relate to lightweight protocol technology for satisfactorily supporting virtual desktop service even in a place where the network environment is poor, and provides a lightweight protocol, to which an image compression engine for reducing the consumption of network bandwidth when a control engine and a screen are transmitted is added, in order to provide virtual desktop service optimized for the access environment of the client terminal.

Further, the virtual desktop provision method and server according to the present invention may provide optimal service by collecting and analyzing network traffic, device specifications, and computing resources of client terminals, thus allowing users to be adaptively provided with optimal virtual desktop service in response to variation in their network conditions or computing resources.

Figure 20:
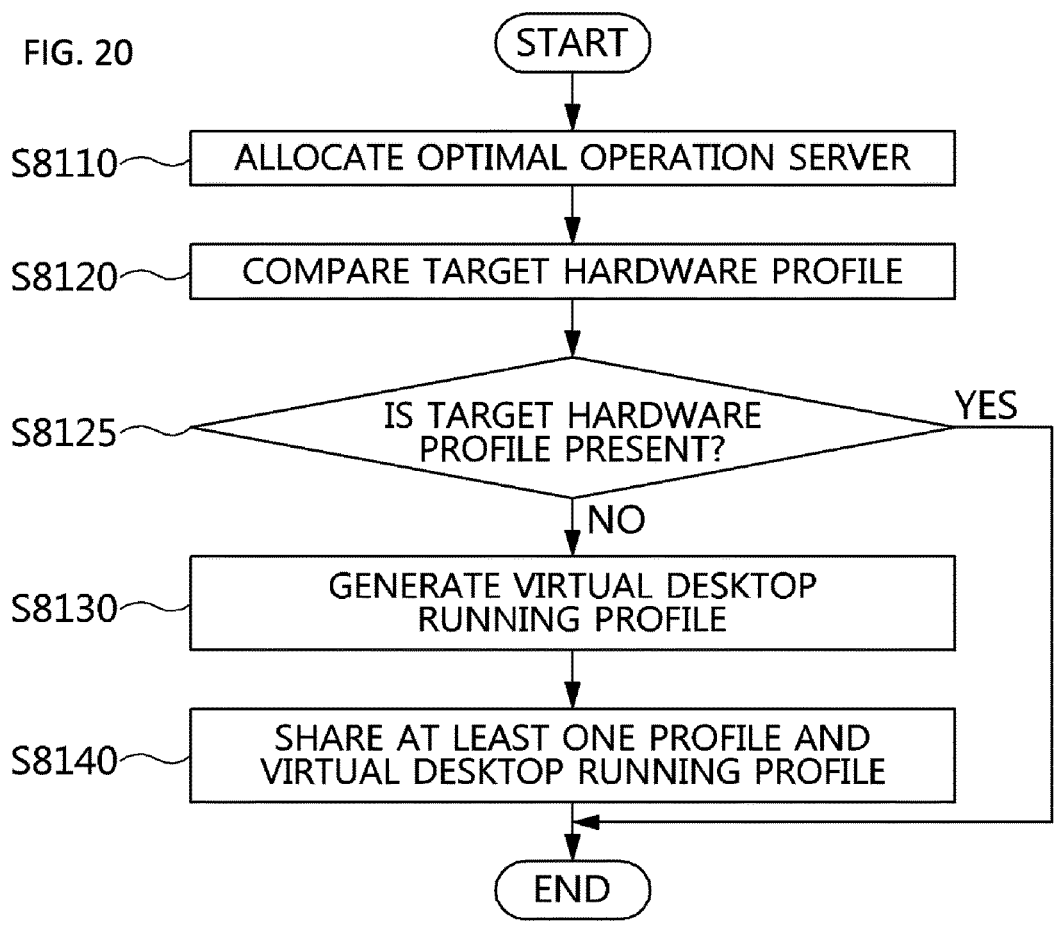
FIG. 20 is an operation flowchart showing a profile management method for running virtual desktops in heterogeneous servers according to an embodiment of the present invention.

FIG. 20 is an operation flowchart showing a profile management method for running virtual desktops in heterogeneous servers according to an embodiment of the present invention.

In a conventional virtual desktop system, in order to run virtual desktops in different heterogeneous servers, a user may run virtual desktops either by manually modifying a profile or via desktop migration performed for a long period of time. However, since this method not only causes inconvenience, but also consumes a lot of time, it has appeared as an important issue in the operation of systems. Therefore, the present invention is intended to present a method for storing virtual desktop running profiles together with user profiles and virtual desktop images in shared storage and utilizing the virtual desktop running profiles so that different heterogeneous servers may run the virtual desktops.

Referring to FIG. 20, the profile management method for running virtual desktops in heterogeneous servers according to the embodiment of the present invention may allocate any one optimal operation server that will run a virtual desktop, among multiple operation servers, at step S8110. For example, the user may access a virtual desktop system through a login procedure, and may personally request the allocation of a virtual desktop from the virtual desktop system. To run such a virtual desktop, an optimal operation server capable of running the virtual desktop may be allocated first.

Here, any of multiple operation servers must be able to run the virtual desktop requested by the user and generate profiles required to run the desktop.

When the optimal operation server is not normally operated, a reserved operation server that is managed separately from multiple operation servers may be allocated. For example, one reserved operation server may always be provided in a service-ready state so that the number of multiple operation servers is N+1. When a certain operation server, which is currently performing service, is down, the reserved operation server in the ready state is recognized in real time, and is then capable of running a virtual desktop that was being serviced by the down operation server. By means of this reserved operation server, the availability of the entire system may be improved.

Here, in consideration of at least one of server availability and utilization corresponding to multiple operation servers, the optimal operation server may be allocated. Among the operation servers, the operation server most suitable for load balancing may be determined to be the optimal operation server, and may then be allocated.

Further, the profile management method for running virtual desktops in heterogeneous servers according to the embodiment of the present invention may compare multiple hardware profiles corresponding to multiple operation servers with a target hardware profile corresponding to the optimal operation server at step S8120.

That is, whether the target hardware profile is present among the multiple hardware profiles may be determined at step S8125.

Here, each hardware profile may be a profile containing the hardware information of an operation server to be consulted in order for the user to generate a virtual desktop. Therefore, the multiple operation servers may include information about different hardware components.

Therefore, whether the optimal operation server is an existing server or a heterogeneous server may be determined by comparing the hardware profiles with each other.

If it is determined at step S8125 that a target hardware profile is not present among the multiple hardware profiles, the profile management method for running virtual desktops in heterogeneous servers according to the embodiment of the present invention may generate a virtual desktop running profile required to run a virtual desktop based on the target hardware profile at step S8130.

In contrast, if it is determined at step S8125 that a target hardware profile is present among the multiple hardware profiles, the virtual desktop may run because the virtual desktop running profile is present in the shared storage.

That is, the fact that there is no information identical to that of the target hardware profile among the multiple hardware profiles may mean that the optimal operation server corresponding to the target hardware profile is a heterogeneous operation server that has never been allocated. That is, since the optimal operation server has different hardware characteristics, it may not use virtual desktop running profiles shared via the shared storage. Therefore, the optimal operation server may generate a virtual desktop running file for running the virtual desktop.

Here, a virtual desktop template corresponding to the target hardware profile may be generated, and the virtual desktop running profile may be generated using the virtual desktop template. Further, for multiple operation servers, virtual desktop templates respectively corresponding thereto may be present. The information about the virtual desktop templates present in the system may be updated such that it includes the virtual desktop template generated to correspond to the target hardware profile.

Here, the virtual desktop running profile may include information about at least one of the type and number of virtual devices required to run the virtual desktop. For example, the virtual desktop running profile may include information corresponding to a virtual CPU, virtual memory, a virtual hard disk, or various types of virtual devices.

Further, the profile management method for running virtual desktops in heterogeneous servers according to the embodiment of the present invention may share the virtual desktop running profile, together with at least one profile required to run the virtual desktop, with the optimal operation server so that the optimal operation server may run the virtual desktop at step S8140.

Here, the at least one profile may include a user profile corresponding to information about the user who requests the virtual desktop and a virtual desktop state profile corresponding to the current state information of the virtual desktop processed by the user after the virtual desktop has started to run. That is, the optimal operation server may run the virtual desktop using the virtual desktop running profile, the user profile, the virtual desktop state profile, or the like. For example, the user profile may include private information such as the ID, password, and personal information of the user, information such as the virtual desktop name of the user, and virtual desktop environment information such as a Windows user profile.

Here, the multiple operation servers may share a virtual desktop image required to boot the virtual desktop. The virtual desktop image may correspond to the virtual disk of the virtual desktop. That is, the virtual desktop may be booted using the virtual disk in a way similar to that of remote booting.

In this case, the multiple operation servers are configured to, when the user accesses the corresponding server again and requests a virtual desktop, load a virtual desktop state profile based on the user profile and run the virtual desktop in correspondence with the current state information. For example, when the virtual desktop runs, the state in which the virtual desktop runs may be stored and updated in the form of a profile. The virtual desktop state profile may correspond to such a profile. Therefore, since the virtual desktop state profile may include memory information about the current processing situation of the user, the operation server may load the virtual desktop state profile and may maintain the environment of the user without change when the user subsequently accesses the operation server again.

Here, the virtual desktop state profile may be separately stored in micromachined electromechanical (MEM) memory units respectively corresponding to multiple operation servers.

That is, from the standpoint of performance of virtual desktops, since virtual desktops basically provide service using emulated hardware devices, the booting speed and operating speed of the virtual desktops become low, and it may be difficult to compare the performance of the virtual desktops with that of normal PCs due to the I/O limitation of a storage device. Therefore, to overcome such speed limitation, both the user profiles required to run the virtual desktops and the virtual desktop state profile containing the current state information are stored and used in the MEM memory of the operation server, and thus the stored information may be utilized for improving the running speed of virtual desktops.

Although not shown in FIG. 20, the profile management method for running virtual desktops in heterogeneous servers according to the embodiment of the present invention may collect multiple pieces of hardware information from multiple operation servers.

Here, the multiple pieces of hardware information may be collected using at least one of information about hardware in OSs corresponding to the multiple operation servers and hardware controllers of the multiple operation servers. For example, the information about hardware in OSs may mean a repository in the case of Windows and a proc file system in the case of Linux. Further, a profile management device may access Baseboard Management Controllers (BMCs), which are provided in respective multiple operation servers and are configured for out-of-band management, and may then collect hardware information over the network.

Here, the multiple operation servers may be equipped with agents for collecting hardware information and may transmit the collected hardware information to the profile management device using the agents.

Although not shown in FIG. 20, the profile management method for running virtual desktops in heterogeneous servers according to the embodiment of the present invention may store multiple hardware profiles generated based on multiple pieces of hardware information.

Figure 21:
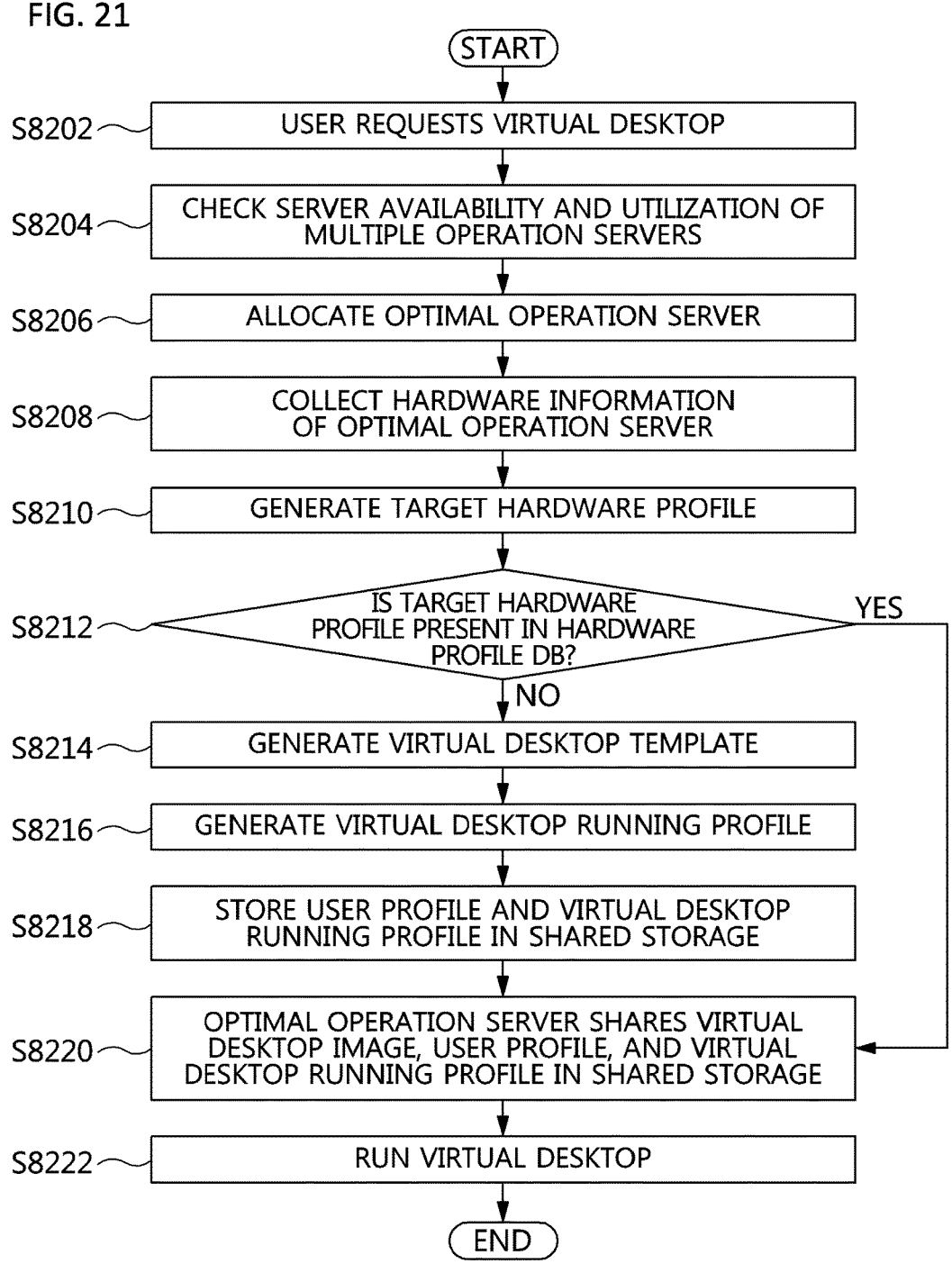
FIG. 21 is an operation flowchart showing in detail a profile management method for running virtual desktops in heterogeneous servers according to an embodiment of the present invention.

FIG. 21 is an operation flowchart showing in detail a profile management method for running virtual desktops in heterogeneous servers according to an embodiment of the present invention.

Referring to FIG. 21, in the profile management method for running virtual desktops in heterogeneous servers according to the embodiment of the present invention, a user may access a virtual desktop system through a login procedure, and may request the virtual desktop system to allocate a virtual desktop at step S8202.

Thereafter, the server availability and utilization of multiple operation servers may be checked to allocate an optimal operation server at step S8204.

Then, among multiple operation servers, any one optimal operation server that will run a virtual desktop may be allocated to the user at step S8206. That is, among the multiple operation servers, an operation server most suitable for load balancing may be determined to be the optimal operation server and may then be allocated.

Thereafter, the hardware information of the optimal operation server may be collected at step S8208.

The hardware information of the optimal operation server may be collected using at least one of information about hardware in an OS corresponding to the optimal operation server and the hardware controller of the optimal operation server.

Thereafter, a target hardware profile may be generated based on the hardware information of the optimal operation server at step S8210.

Then, whether a target hardware profile is present in a hardware profile DB may be determined at step S8212.

Here, whether a target hardware profile is present may be determined by comparing multiple hardware profiles corresponding to multiple operation servers included in the hardware profile DB with the target hardware profile corresponding to the optimal operation server.

If it is determined at step S8212 that there is no target hardware profile in the hardware profile DB, a virtual desktop template required to run the virtual desktop may be generated based on the target hardware profile at step S8214.

Next, a virtual desktop running profile may be generated using the virtual desktop template at step S8216.

Thereafter, a user profile and the virtual desktop running profile may be stored in the shared storage at step S8218.

Here, the virtual desktop running profile may include information about at least one of the type and number of virtual devices required to run the virtual desktop. For example, the virtual desktop running profile may include information corresponding to a virtual CPU, virtual memory, a virtual hard disk, or various types of virtual devices.

Here, the user profile may be stored together in shared storage. For example, the user profile may include private information such as the ID, password, and personal information of the user, information such as the virtual desktop name of the user, and virtual desktop environment information such as a Windows user profile.

Thereafter, the optimal operation server may share a virtual desktop image, the user profile, and virtual desktop running profile in the shared storage at step S8220.

Here, the virtual desktop image may correspond to the virtual disk of the virtual desktop. That is, the virtual desktop may be booted using the virtual disk in a way similar to that of remote booting.

Thereafter, the optimal operation server may run the virtual desktop at step S8222.

Figure 22:
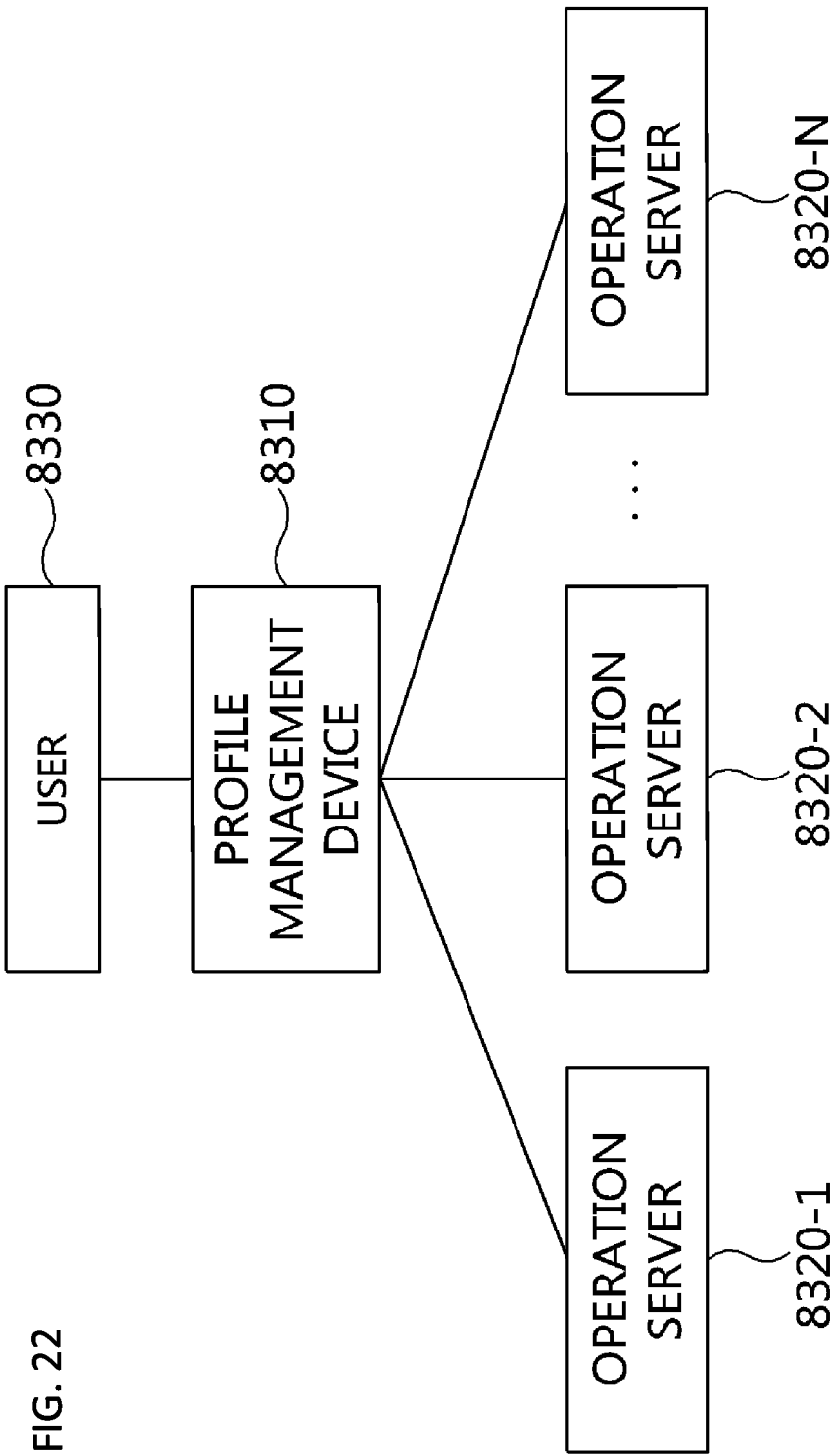
FIG. 22 is a block diagram showing a virtual desktop system using a profile management device for running virtual desktops in heterogeneous servers according to an embodiment of the present invention.

FIG. 22 is a block diagram showing a virtual desktop system using a profile management device for running virtual desktops in heterogeneous servers according to an embodiment of the present invention.

Referring to FIG. 22, the virtual desktop system using a profile management device for running virtual desktops in heterogeneous servers may include a profile management device 8310, multiple operation servers 8320-1 to 8320-N, and a user 8330.

The profile management device 8310 may allocate any one optimal operation server that will run a virtual desktop, among multiple operation servers 8320-1 to 8320-N, to the user.

When the optimal operation server is not normally operated, a reserved operation server that is managed separately from the multiple operation servers 8320-1 to 8320-N may be allocated.

Here, the optimal operation server may be allocated in consideration of at least one of the server availability and utilization of the multiple operation servers 8320-1 to 8320-N.

Further, the profile management device 8310 may collect multiple pieces of hardware information from the multiple operation servers 8320-1 to 8320-N.

Here, the multiple pieces of hardware information may be collected using at least one of information about hardware in OSs corresponding to the multiple operation servers 8320-1 to 8320-N and hardware controllers of the multiple operation servers 8320-1 to 8320-N.

Also, the profile management device 8310 may store multiple hardware profiles generated based on the multiple pieces of hardware information.

Further, the profile management device 8310 may compare multiple hardware profiles corresponding to the multiple operation servers 8320-1 to 8320-N with a target hardware profile corresponding to the optimal operation server.

Furthermore, the profile management device 8310 may generate a virtual desktop running profile for running the virtual desktop based on the target hardware profile when there is no target hardware profile among the hardware profiles.

Here, a virtual desktop template corresponding to the target hardware profile may be generated, and the virtual desktop running profile may be generated using the virtual desktop template.

The virtual desktop running profile may include information about at least one of the type and the number of virtual devices required to run the virtual desktop.

Further, the profile management device 8310 may share the virtual desktop running profile, together with at least one profile required to run the virtual desktop, with the optimal operation server so that the optimal operation server may run the virtual desktop.

Here, the at least one profile may include at least one of the user profile corresponding to information about the user 8330 who requests the virtual desktop and a virtual desktop state profile corresponding to the current state information of the virtual desktop processed by the user 8330 after the virtual desktop has started to run.

Here, a virtual desktop image to be used to boot the virtual desktop may be shared among the multiple operation servers 8320-1 to 8320-N.

Here, when the user 8330 accesses the virtual desktop system again and requests the virtual desktop, the multiple operation servers 8320-1 to 8320-N may load virtual desktop state profiles based on the user profile and run the virtual desktop in correspondence with the current state information.

Here, the virtual desktop state profiles may be separately stored in MEM memory units respectively corresponding to the multiple operation servers 8320-1 to 8320-N.

The multiple operation servers 8320-1 to 8320-N may be servers that are allocated to the user 8330 so as to run the virtual desktop. That is, the user may access the virtual desktop system and request the virtual desktop from the virtual desktop system. The profile management device 8310 may allocate any one optimal operation server most suitable for the running of the virtual desktop, among the multiple operation servers 8320-1 to 8320-N, to the user.

The user 8330 may access the virtual desktop system so as to be provided with the virtual desktop service, and may be allocated to use a virtual desktop running on the optimal operation server allocated through the profile management device 8310.

Figure 23:
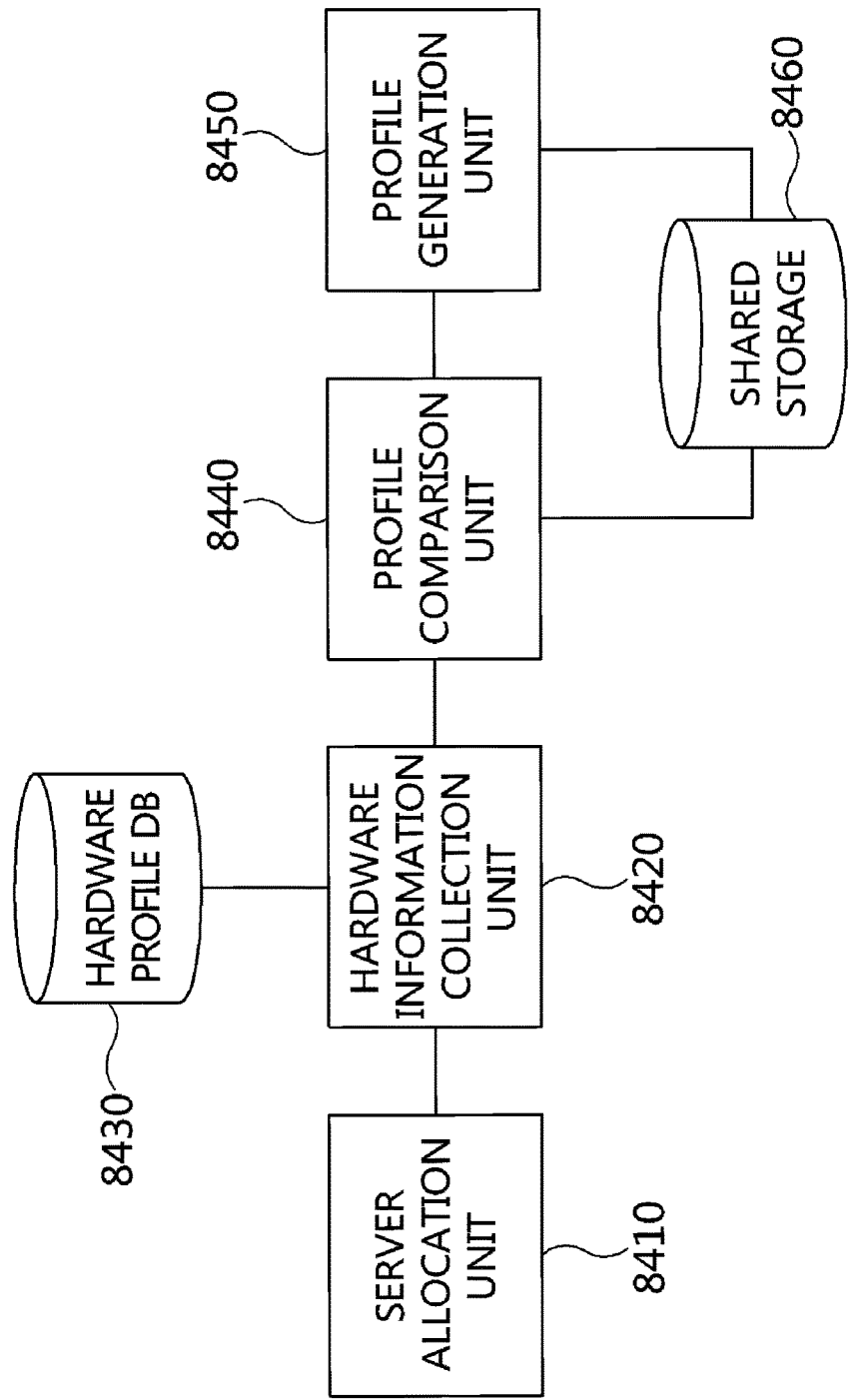
FIG. 23 is a block diagram showing an example of the profile management device for running virtual desktops in heterogeneous servers shown in FIG. 22.

FIG. 23 is a block diagram showing an example of a profile management device for running virtual desktops in heterogeneous servers shown in FIG. 22.

In a conventional virtual desktop system, in order to run virtual desktops in different heterogeneous servers, a user may run virtual desktops either by manually modifying a profile or via desktop migration performed for a long period of time. However, since this method not only causes inconvenience, but also consumes a lot of time, it has appeared as an important issue in the operation of systems. Therefore, the present invention is intended to present a method for storing virtual desktop running profiles together with user profiles and virtual desktop images in shared storage and utilizing the virtual desktop running profiles so that different heterogeneous servers may run the virtual desktops.

Referring to FIG. 23, the profile management device 8310 for running virtual desktops in heterogeneous servers, shown in FIG. 23, may include a server allocation unit 8410, a hardware information collection unit 8420, a hardware profile DB 8430, a profile comparison unit 8440, a profile generation unit 8450, and shared storage 8460.

The server allocation unit 8410 may allocate any one optimal operation server that will run a virtual desktop, among the multiple operation servers, to the user. For example, the user may access the virtual desktop system through a login procedure, and may request the virtual desktop system to allocate the virtual desktop. To run such a virtual desktop, the optimal operation server, which is capable of running the virtual desktop, may be allocated.

Here, any of multiple operation servers must be able to run the virtual desktop requested by the user and generate profiles required to run the desktop.

When the optimal operation server is not normally operated, a reserved operation server that is managed separately from multiple operation servers may be allocated. For example, one reserved operation server may always be provided in a service-ready state so that the number of multiple operation servers is N+1. When a certain operation server, which is currently performing service, is down, the reserved operation server in the ready state is recognized in real time, and is then capable of running a virtual desktop that was being serviced by the down operation server. By means of this reserved operation server, the availability of the entire system may be improved.

Here, in consideration of at least one of server availability and utilization corresponding to multiple operation servers, the optimal operation server may be allocated. Among the operation servers, the operation server most suitable for load balancing may be determined to be the optimal operation server, and may then be allocated.

The hardware information collection unit 8420 may collect multiple pieces of hardware information from the multiple operation servers.

Here, the multiple pieces of hardware information may be collected using at least one of information about hardware in OSs corresponding to the multiple operation servers and hardware controllers of the multiple operation servers. For example, the information about hardware in OSs may mean a repository in the case of Windows and a proc file system in the case of Linux. Further, a profile management device may access Baseboard Management Controllers (BMCs), which are provided in respective multiple operation servers and are configured for out-of-band management, and may then collect hardware information over the network.

In this case, the multiple operation servers may be equipped with agents for collecting hardware information and may transmit the collected hardware information to the profile management device using the agents.

The hardware profile DB 8430 may store multiple hardware profiles generated based on the multiple pieces of hardware information.

The profile comparison unit 8440 may compare multiple hardware profiles corresponding to multiple operation servers with a target hardware profile corresponding to the optimal operation server.

That is, whether the target hardware profile is present among the multiple hardware profiles may be determined.

Here, each hardware profile may be a profile containing the hardware information of an operation server to be consulted in order for the user to generate a virtual desktop. Therefore, the multiple operation servers may respectively, include information about different hardware components.

Therefore, whether the optimal operation server is an existing server or a heterogeneous server may be determined by comparing the hardware profiles with each other.

If no target hardware profile is present among the multiple hardware profiles, the profile generation unit 8450 may generate a virtual desktop running profile required to run the virtual desktop based on the target hardware profile.

Further, if the target hardware profile is present among the multiple hardware profiles, the virtual desktop may run because the virtual desktop running profile is present in the shared storage.

That is, the fact that there is no information identical to that of the target hardware profile among the multiple hardware profiles may mean that the optimal operation server corresponding to the target hardware profile is a heterogeneous operation server that has never been allocated. That is, since the optimal operation server has different hardware characteristics, it may not use virtual desktop running profiles shared via the shared storage. Therefore, the optimal operation server may generate a virtual desktop running file for running the virtual desktop.

Here, a virtual desktop template corresponding to the target hardware profile may be generated, and the virtual desktop running profile may be generated using the virtual desktop template. Further, for multiple operation servers, virtual desktop templates respectively corresponding thereto may be present. The information about the virtual desktop templates present in the system may be updated such that it includes the virtual desktop template generated to correspond to the target hardware profile.

Here, the virtual desktop running profile may include information about at least one of the type and number of virtual devices required to run the virtual desktop. For example, the virtual desktop running profile may include information corresponding to a virtual CPU, virtual memory, a virtual hard disk, or various types of virtual devices.

The shared storage 8460 may share the virtual desktop running profile, together with at least one profile required to run the virtual desktop, with the optimal operation server so that the optimal operation server may run the virtual desktop.

Here, the at least one profile may include a user profile corresponding to information about the user who requests the virtual desktop and a virtual desktop state profile corresponding to the current state information of the virtual desktop processed by the user after the virtual desktop has started. That is, the optimal operation server may run the virtual desktop using the virtual desktop running profile, the user profile, the virtual desktop state profile, or the like. For example, the user profile may include private information such as the ID, password, and personal information of the user, information such as the virtual desktop name of the user, and virtual desktop environment information such as a Windows user profile.

Here, the multiple operation servers may share a virtual desktop image required to boot the virtual desktop. The virtual desktop image may correspond to the virtual disk of the virtual desktop. That is, the virtual desktop may be booted using the virtual disk in a way similar to that of remote booting.

In this case, the multiple operation servers are configured to, when the user accesses the corresponding server again and requests a virtual desktop, load a virtual desktop state profile based on the user profile and run the virtual desktop in correspondence with the current state information. For example, when the virtual desktop runs, the state in which the virtual desktop runs may be stored and updated in the form of a profile. The virtual desktop state profile may correspond to such a profile. Therefore, since the virtual desktop state profile may include memory information about the current processing situation of the user, the operation server may load the virtual desktop state profile and may maintain the environment of the user without change when the user subsequently accesses the operation server again.

Here, the virtual desktop state profile may be separately stored in MEM memory units respectively corresponding to multiple operation servers.

That is, from the standpoint of performance of virtual desktops, since virtual desktops basically provide service using emulated hardware devices, the booting speed and operating speed of the virtual desktops become low, and it may be difficult to compare the performance of the virtual desktops with that of normal PCs due to the I/O limitation of a storage device. Therefore, to overcome such speed limitation, both the user profiles required to run the virtual desktops and the virtual desktop state profile containing the current state information are stored and used in the MEM memory of the operation server, and thus the stored information may be utilized for improving the running speed of virtual desktops.

Figure 24:
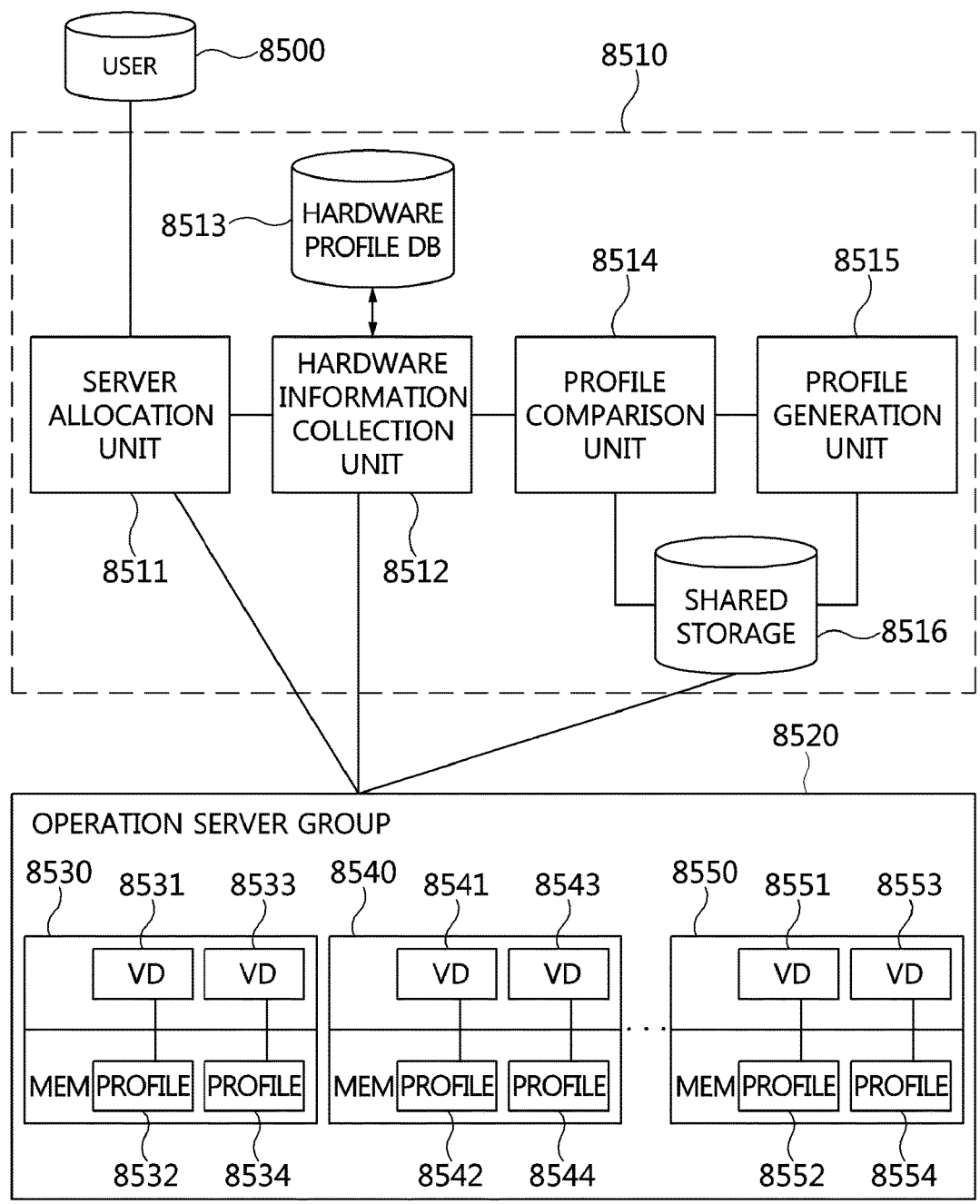
FIG. 24 is a diagram showing in detail a virtual desktop system using the profile management device for running virtual desktops in heterogeneous servers according to an embodiment of the present invention.

FIG. 24 is a diagram showing in detail a virtual desktop system using a profile management device for running virtual desktops in heterogeneous servers according to an embodiment of the present invention.

Referring to FIG. 24, the virtual desktop system using a profile management device for running virtual desktops in heterogeneous servers according to the embodiment of the present invention may include a user 8500, a profile management device 8510, and operation servers 8530, 8540, and 8550 included in an operation server group 8520.

A profile management process for running virtual desktops in heterogeneous servers using the components, shown in FIG. 25, will be described below. That is, when a request for the allocation of a virtual desktop is received from the user 8500, the server allocation unit 8511 of the profile management device 8510 may allocate an optimal operation server, among multiple operation servers 8530, 8540, and 8550 included in the operation server group 8520, to the user.

Here, the optimal operation server may be allocated in consideration of the server availability and utilization of respective multiple operation servers 8530, 8540, and 8550.

For example, when the operation server 8530 is assumed to be the optimal operation server and a heterogeneous operation server differing from other operation servers, a hardware information collection unit 8512 may collect hardware information from the operation server 8530, and may store a target hardware profile and store it in a hardware profile DB 8513.

Thereafter, the profile comparison unit 8514 may compare multiple hardware profiles stored in the hardware profile DB 8513 with the target hardware profile.

Here, since the operation server 8530 is a heterogeneous server, a hardware profile corresponding to the target hardware profile may not be present among the multiple hardware profiles.

Therefore, the profile generation unit 8515 may generate a virtual desktop template corresponding to the target hardware profile so as to run the virtual desktop on the operation server 8530, and may generate a virtual desktop running profile corresponding to the operation server 8530 using the virtual desktop template.

Thereafter, the generated virtual desktop running profile, together with the user profile, is stored in shared storage 8516, and thus the remaining multiple operation servers 8540 and 8550, as well as the optimal operation server, that is, the operation server 8530, may share the virtual desktop running profile with each other.

Hence, the operation server 8530 allocated to the user may share virtual desktop images, user profiles, and virtual desktop running profiles through the shared storage 8516, and may then run virtual desktops 8531 and 8533.

For example, when the user 8500 is assumed to access the virtual desktop system again and request the allocation of the same virtual desktop, the shared storage 8516 may load a virtual desktop state profile stored in at least one of the MEM memory units 8532, 8534, 8542, 8544, 8552, and 8554 corresponding to the multiple operation servers 8530, 8540, and 8550, and may run the virtual desktop in the same way as the environment in which the user 8550 runs the virtual desktop. Further, the virtual desktop state profile is stored and used in the MEM memory units 8532, 8534, 8542, 8544, 8552, or 8554, so that the time required to run the virtual desktop may be shortened, thus providing more effective service.

In accordance with the present invention, there can be provided profile management technology that is capable of more effectively providing virtual desktop service, rather than a method by which a user manually modifies a profile or provides a profile via desktop migration performed for a long period of time, when virtual desktop service is provided in different heterogeneous server environments.

Further, the present invention may improve the performance of virtual desktops by storing profiles, required to run the virtual desktops, in the memory of the servers for running virtual desktops.

Figure 25:
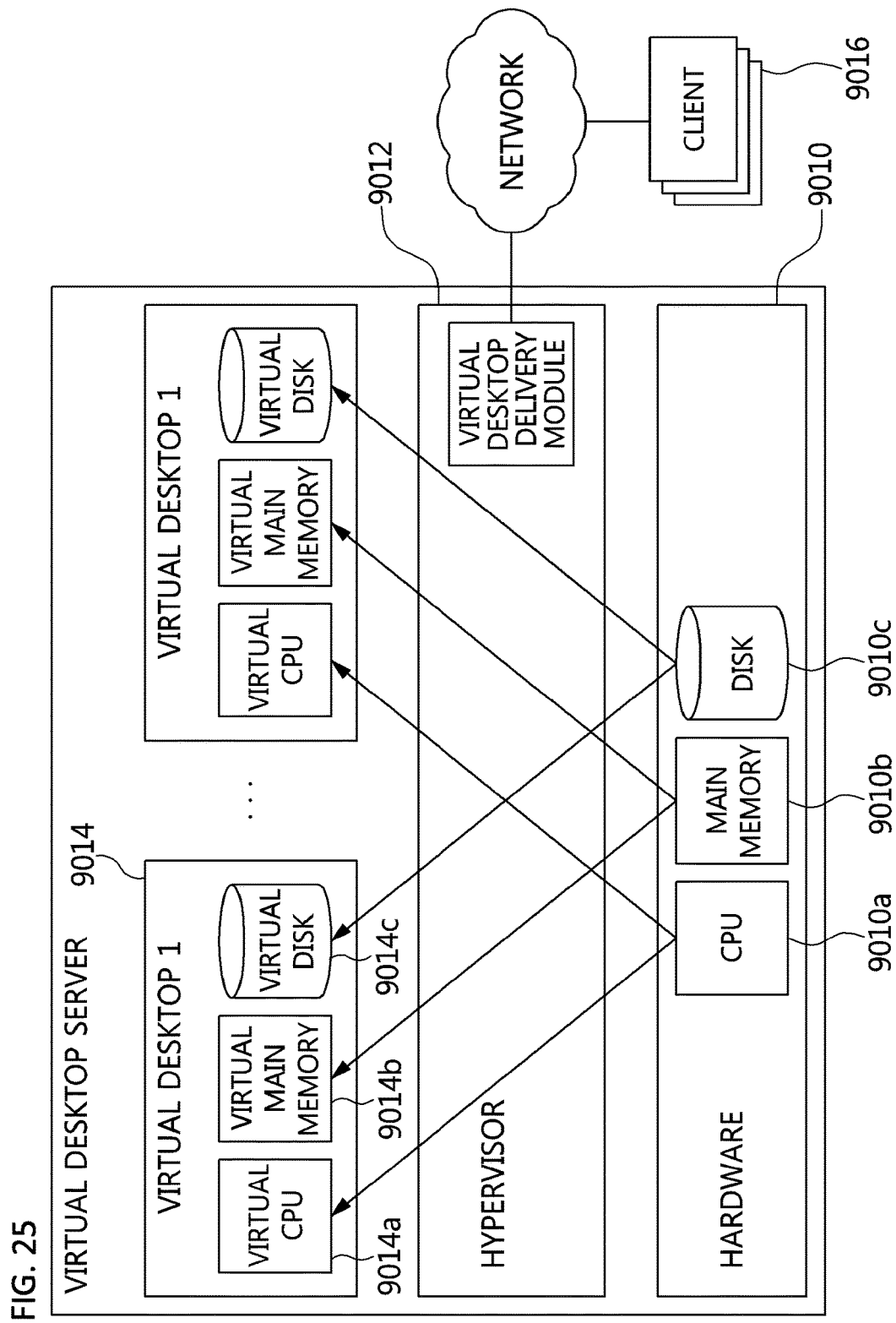
FIG. 25 is a configuration diagram showing a conventional hard disk-based virtual desktop system.

FIG. 25 illustrates in greater detail the VM infrastructure 130 shown in FIG. 2, and shows an existing system in which virtual desktop images are stored and operated in a hard disk. In FIG. 25, a hypervisor 9012 generates virtual CPU 9014a, virtual main memory 9014b, and a virtual disk 9014c based on a physical CPU 9010a, main memory 9010b, and a disk 9010c, and provides the generated components to a virtual desktop 9014. The virtual desktop 9014 is operated based on the generated virtual components.

The virtual desktop delivery module of the hypervisor 9012 transmits the virtual desktop 9014 to a client 9016 over a network.

In a single virtual desktop server, several tens of virtual desktops 9014 are operated. When all virtual desktops 9014 simultaneously access a virtual desktop image, as in the case of virtual desktop booting, loads are concentrated on a virtual disk 9014c in which the virtual desktop image is stored, and thus a problem arises in that the performance of the entire system is deteriorated. In particular, the speed of the virtual disk 9014c is much lower than that of other resources (e.g. CPU and memory) of the virtual desktop server, thus causing the deterioration of performance to be more serious.

Figure 26:
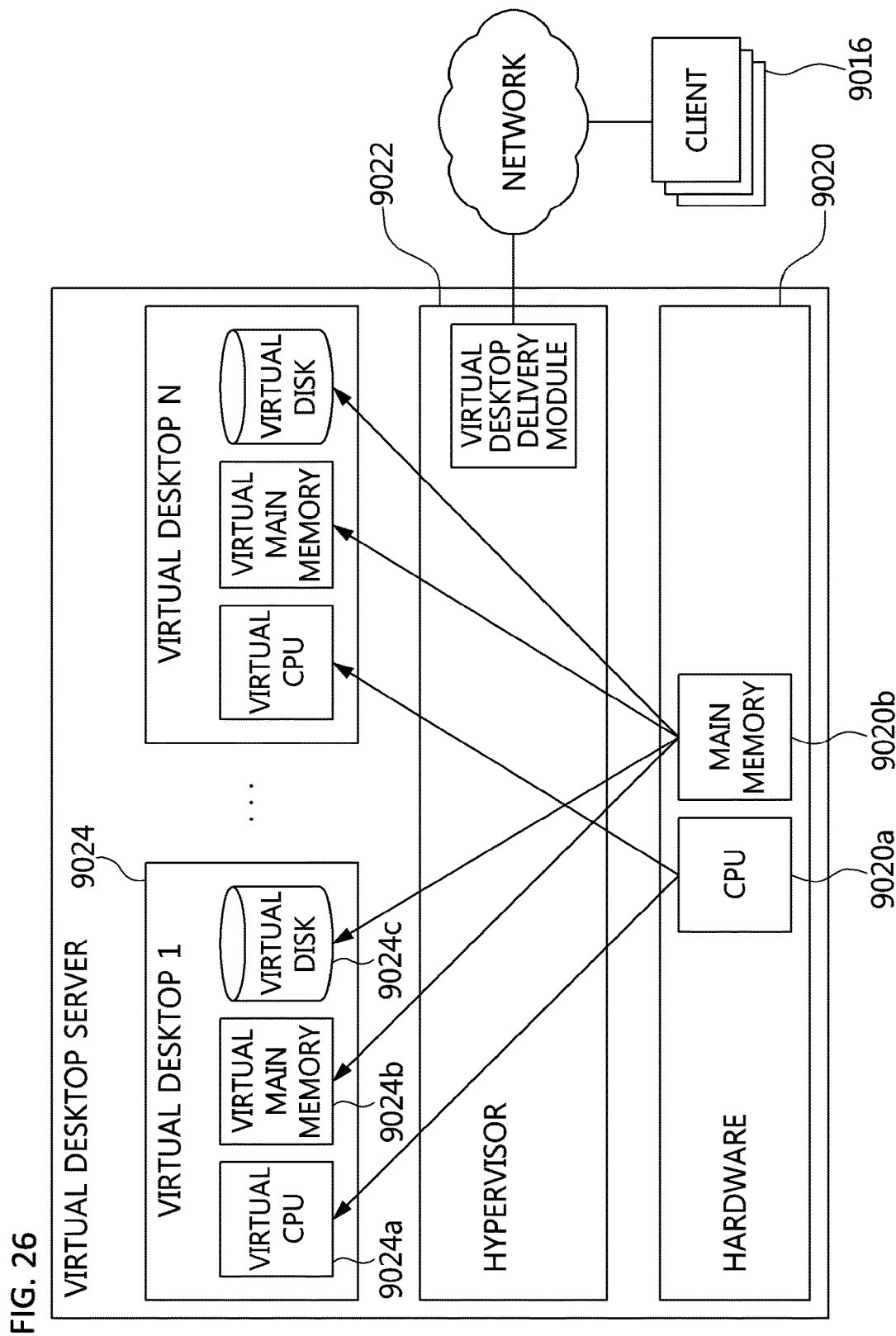
FIG. 26 is a schematic diagram showing a main memory-based virtual desktop system according to an embodiment of the present invention.

FIG. 26 is a schematic diagram showing a main memory-based virtual desktop system according to an embodiment of the present invention.

In FIG. 26, the scheme for generating a virtual CPU and virtual memory is identical to that of FIG. 25.

However, the scheme of FIG. 26 is different from that of FIG. 25 in that a virtual disk 9024c is generated using main memory 9020b, rather than a hard disk.

In FIG. 26, reference numeral 9020, not described here, denotes hardware, reference numeral 9022 denotes a hypervisor, and reference numeral 9024 denotes a virtual desktop.

Figure 27:
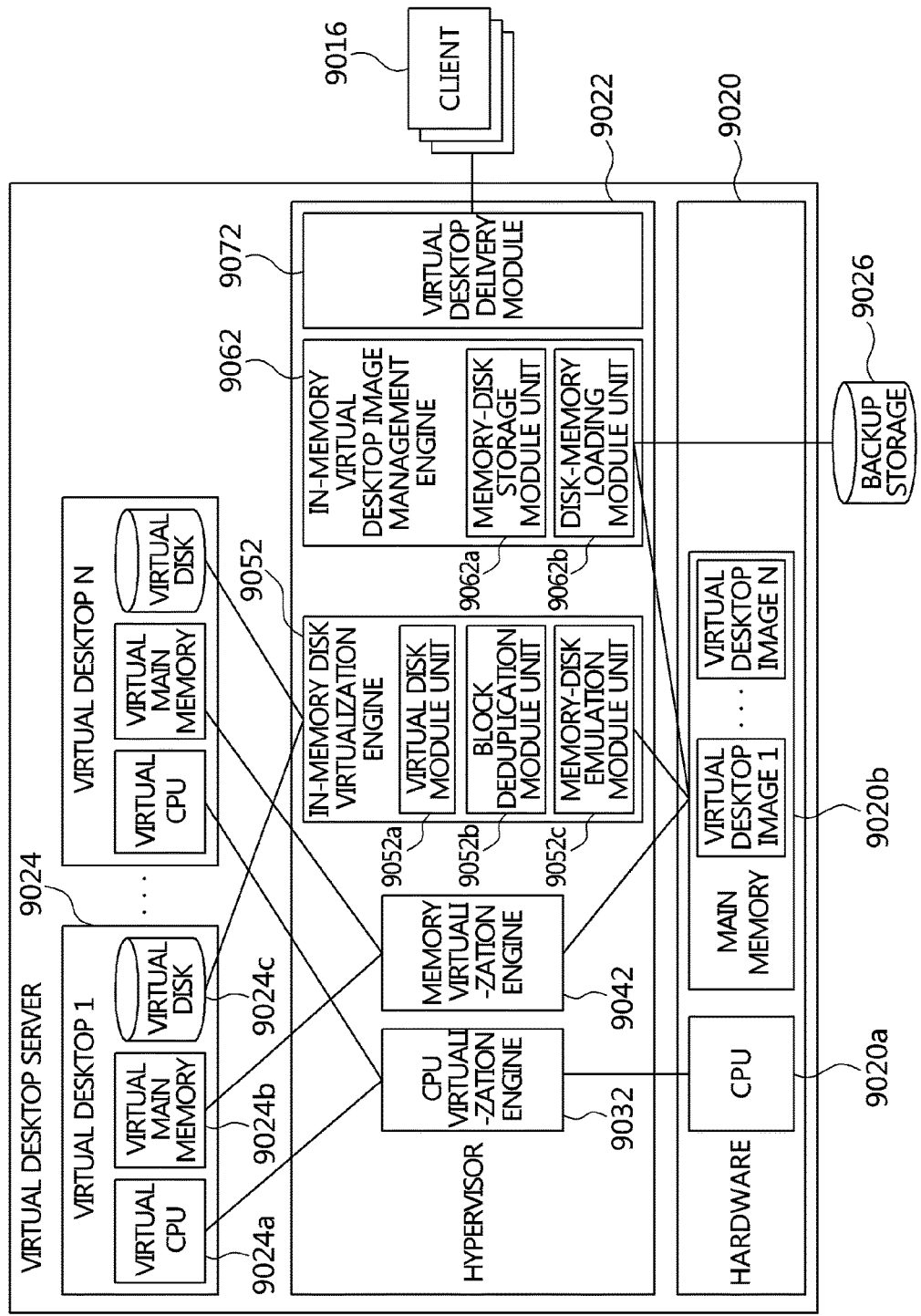
FIG. 27 is a diagram showing in detail the configuration of a main memory-based virtual desktop system according to an embodiment of the present invention.

FIG. 27 is a diagram showing in detail the configuration of a main memory-based virtual desktop system according to an embodiment of the present invention. The configuration shown in FIG. 27 may be referred to as an "in-memory virtual desktop system" or "in-memory virtual desktop server".

The main memory-based virtual desktop system according to the embodiment of the present invention includes hardware 9020, a hypervisor 9022, virtual desktops 9024, and clients 9016.

The hardware 9020 includes a CPU 9020a and main memory 9020b as physical resources. Here, the main memory 9020b stores multiple virtual desktop images (virtual desktop image 1 to virtual desktop image N).

The hypervisor 9022 virtualizes the resources (CPU 9020a and main memory 9020b) of the hardware 9020, and provides the virtualized resources to the virtual desktops 9024. Here, the virtual desktops 9024 may include multiple virtual desktops.

The virtual desktop 9024 is operated based on virtual resources. Further, the virtual desktop 9024 in operation is transmitted to the corresponding client 9016 through the virtual desktop delivery engine 9072 of the hypervisor 9022.

The backup storage 9026 is used as a storage device for backing up and recovering the virtual desktop images present in the main memory 9020b.

The hypervisor 9022 includes a CPU virtualization engine 9032, a memory virtualization engine 9042, an in-memory disk virtualization engine 9052, an in-memory virtual desktop image management engine 9062, and a virtual desktop delivery engine 9072.

The CPU virtualization engine 9032, which is an engine for virtualizing the CPU 9020a of the hardware 9020, is the same as the engine used by a conventional virtual desktop system.

The memory virtualization engine 9042, which is an engine for virtualizing the main memory 9020b of the hardware 9020, is the same as the engine used by the conventional virtual desktop system.

The in-memory disk virtualization engine 9052 generates a virtual disk 9024c based on the main memory 9020b, and provides the virtual disk 9024c to the corresponding virtual desktop 9024.

The in-memory disk virtualization engine 9052 includes a virtual disk module unit 9052a, a block deduplication module unit 9052b, and a memory-disk emulation module unit 9052c.

The virtual disk module unit 9052a receives block-based read/write commands generated in the virtual disk 9024c, and processes the block-based read/write commands using the block deduplication module unit 9052b and the memory-disk emulation module unit 9052c.

The block deduplication module unit 9052b performs deduplication on the blocks present in the virtual disk 9024c. By performing block-based deduplication, the physical size of all of the virtual desktop images may be reduced.

The memory-disk emulation module unit 9052c actually performs read/write operations on the main memory 9020b, which is accessible by address, in compliance with the read/write commands which are transmitted on a per-block basis. By means of such operation, virtual desktop images for the virtual desktops 9024 are stored in the main memory 9020b.

The in-memory virtual desktop image management engine 9062 includes a memory-disk storage module unit 9062a and a disk-memory loading module unit 9062b.

Since the main memory 9020b is volatile memory, pieces of data about the virtual desktop images (virtual desktop image 1 to virtual desktop image N) stored in the main memory 9020b are lost when the virtual desktop server is powered off Therefore, the memory-disk storage module unit 9062a stores the virtual desktop images, present in the main memory 9020b, in the backup storage 9026 before the virtual desktop server is powered off.

The disk-memory loading module unit 9062b loads the virtual desktop images, stored in the backup storage 9026, in the main memory 9020b when the virtual desktop server is powered on.

Figure 28:
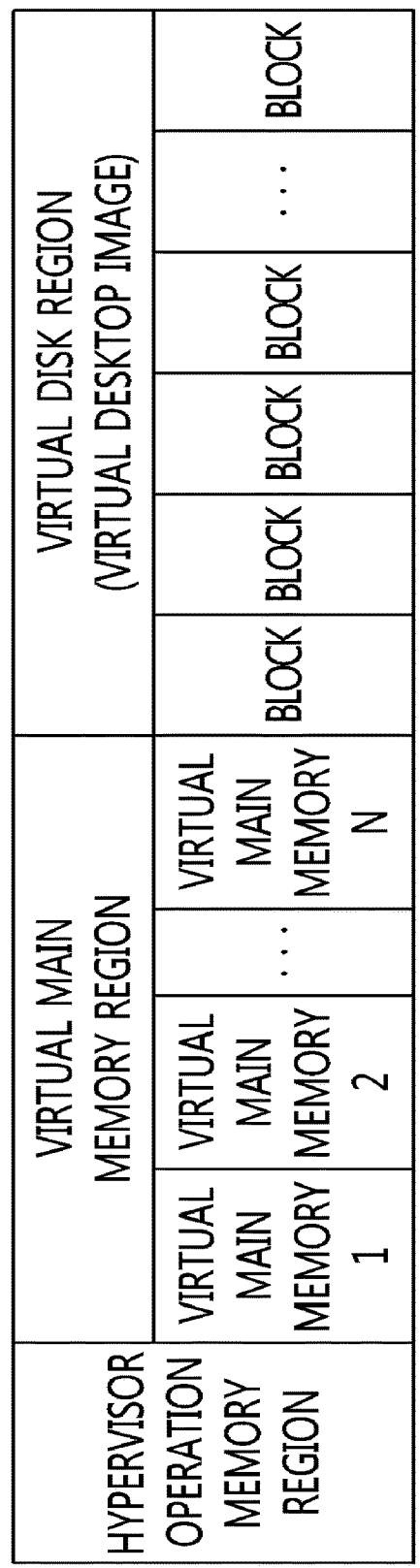
FIG. 28 is a diagram showing the structure of the main memory shown in FIG. 27.

FIG. 28 is a diagram showing the structure of the main memory 9020b shown in FIG. 27.

In an embodiment of the present invention, the main memory 9020b includes a hypervisor operation memory region, a virtual main memory region, and a virtual disk region.

The hypervisor operation memory region is the memory region necessary for the operation of the hypervisor 9022.

The virtual main memory region is the region to be used for the virtual main memory for virtual desktops. In other words, the virtual main memory region includes virtual main memory 9024b for all virtual desktops 9024.

The virtual disk region is the region to be used for virtual disks for virtual desktops. In other words, in the virtual disk region, virtual desktop images are stored. Further, the virtual desktop images are provided to the virtual desktops 9024 in the form of each virtual disk 9024c by the in-memory disk virtualization engine 9052.

Figure 29:
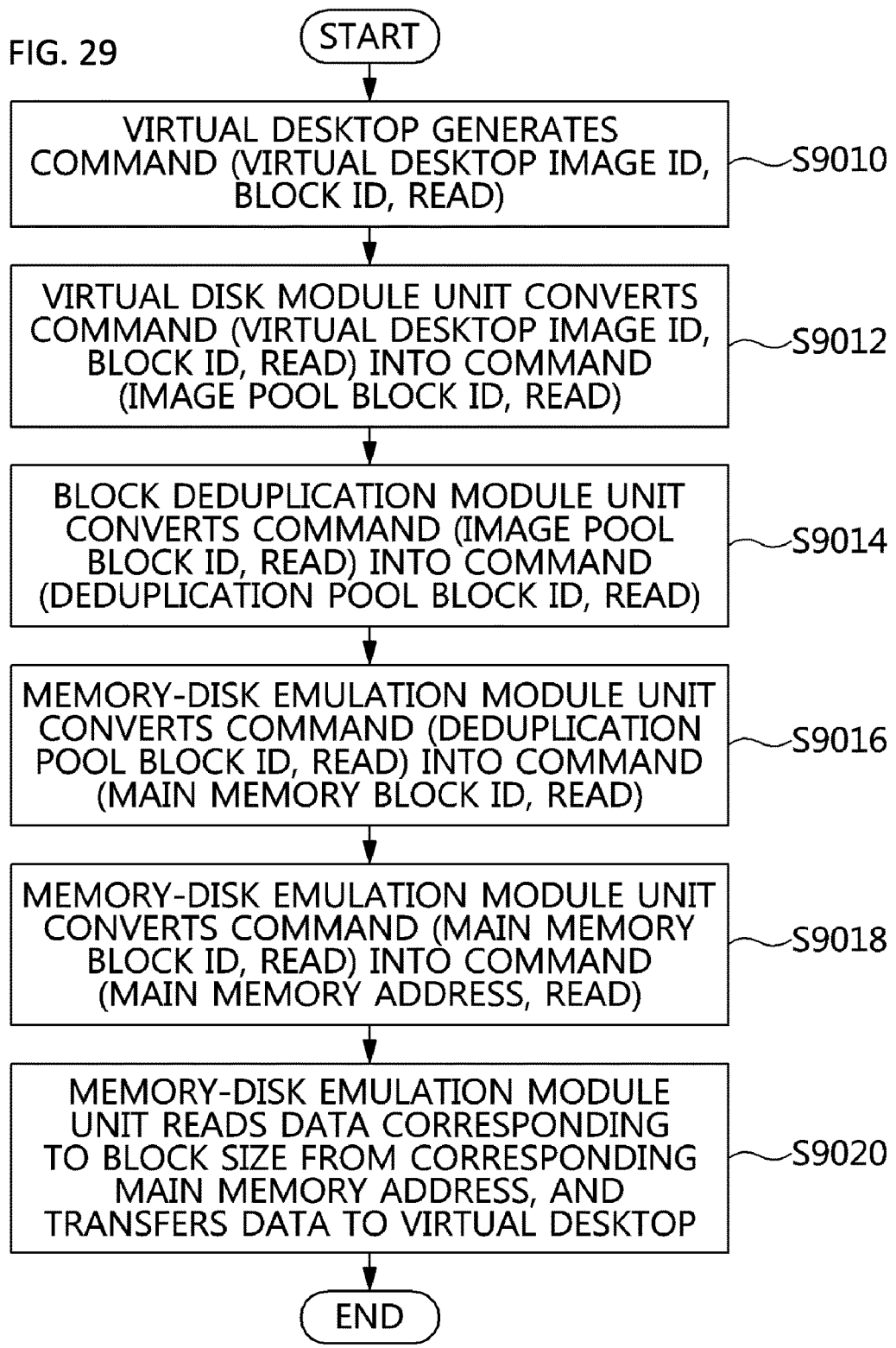
FIG. 29 is a flowchart showing a read procedure for the virtual disk shown in FIG. 27.

Next, a procedure for, when a read procedure for a block of the virtual disk 9024c occurs in the virtual desktop 9024, reading the block from the main memory 9020b will be described. FIG. 29 is a flowchart showing a read procedure for the virtual disk shown in FIG. 27, FIG. 30 is a diagram employed in the description of read/write procedures for the virtual disk shown in FIG. 27, and FIG. 31 is a diagram showing a deduplication table employed in the embodiment of the present invention.

By way of example, a description is made on the assumption that a read procedure for block 1 in virtual desktop 2 occurs.

First, in the virtual desktop 9024, when a read procedure for its own virtual disk 9024c occurs, the virtual desktop 9024 generates a read command and delivers it to the virtual disk module unit 9052a at step S9010. Here, the read command is represented by "(virtual desktop image ID, block ID, read)". In the above example, since the case where a read procedure for block 1 occurs in the virtual desktop 2 has been assumed, the read command may be represented by "(virtual desktop image 2, block 1, read)".

Figure 30:
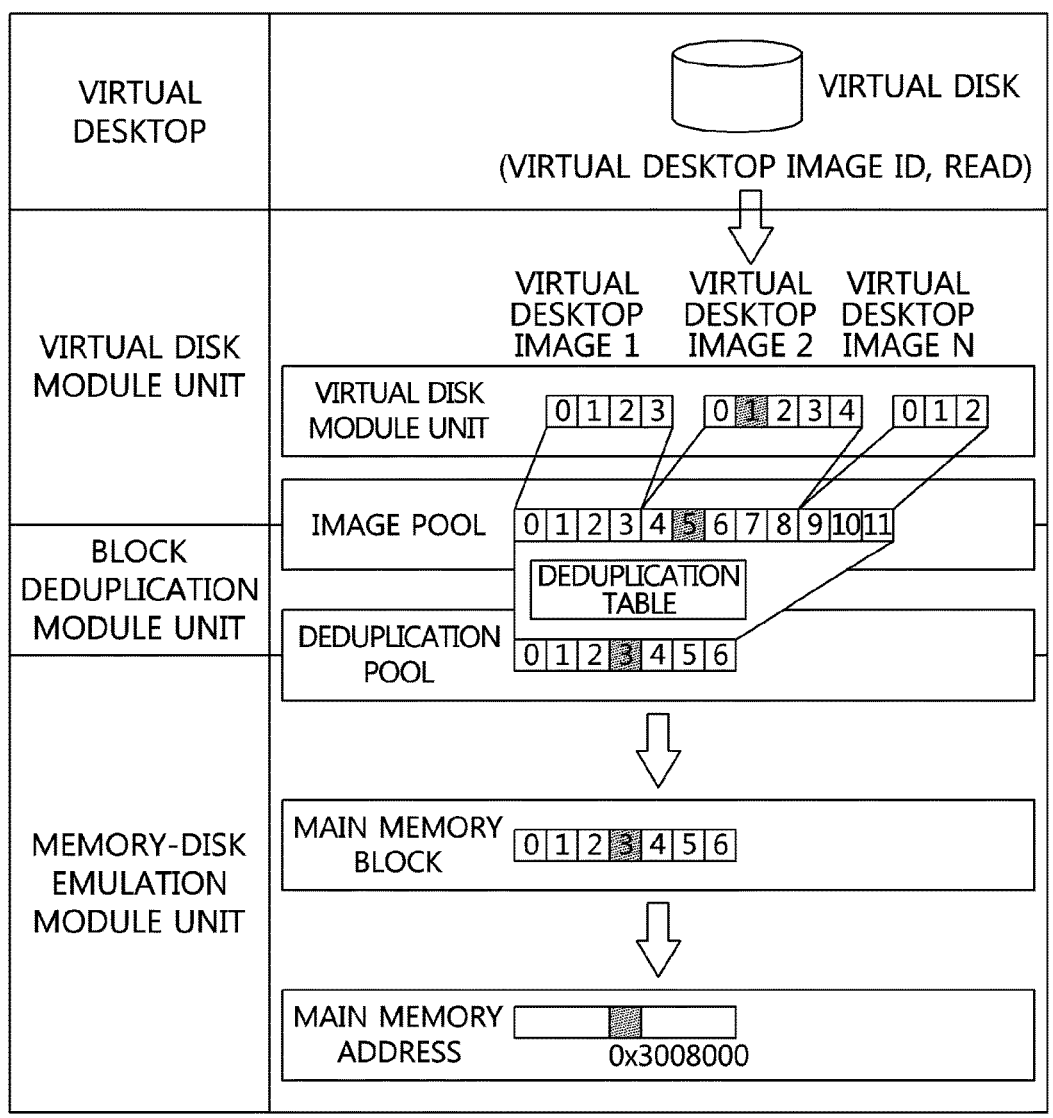
FIG. 30 is a diagram employed in the description of read/write procedures for the virtual disk shown in FIG. 27.
Figure 31:
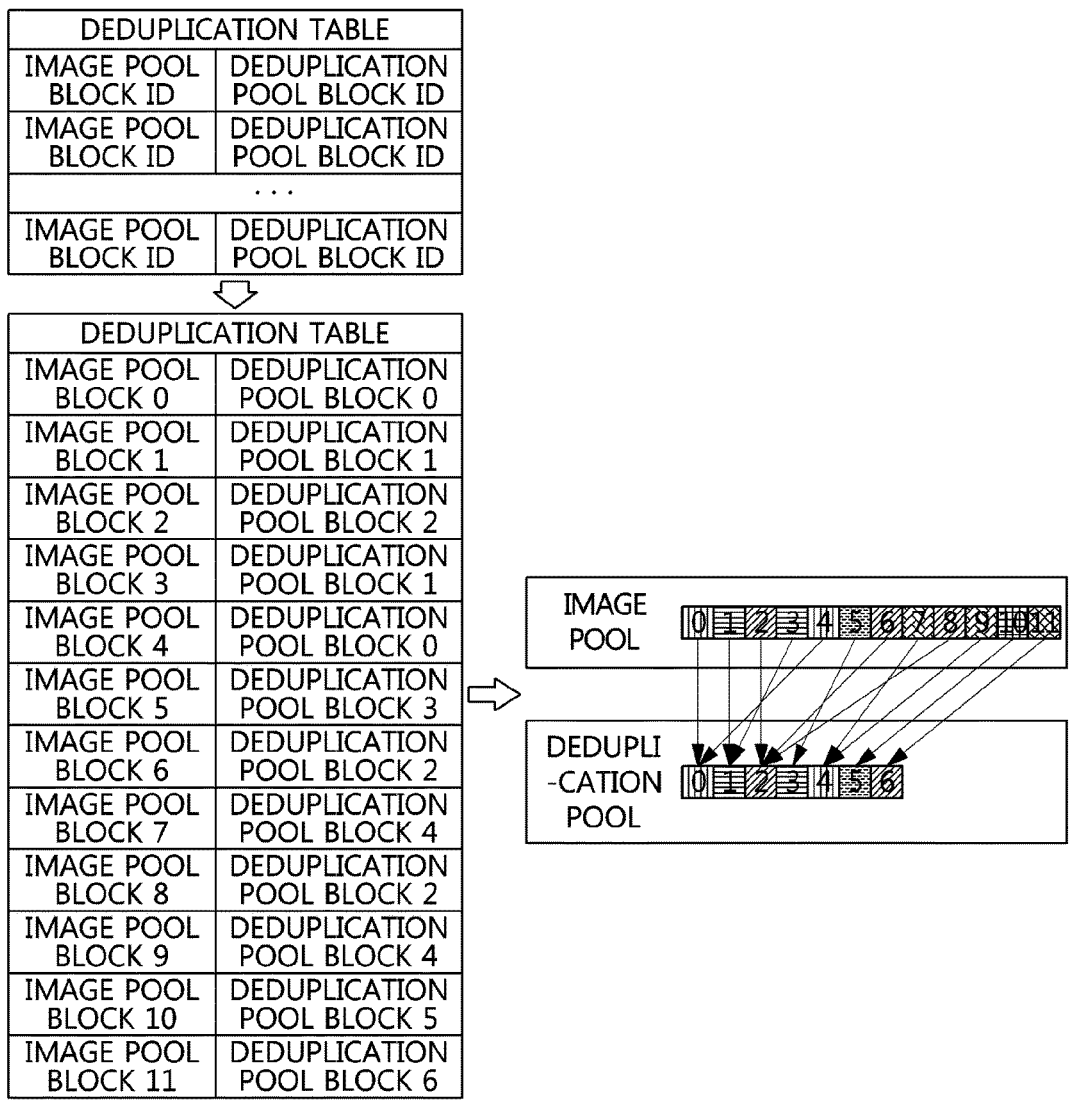
FIG. 31 is a diagram showing a deduplication table employed in the embodiment of the present invention.

Accordingly, the virtual disk module unit 9052a maintains a single image pool in order to manage all virtual desktop images (see FIG. 30). In this case, the blocks in the single image pool have unique block IDs which are not duplicated. Therefore, the virtual disk module unit 9052a converts the command (virtual desktop image ID, block ID, read) into the command (image pool block ID, read) at step S9012. Here, the image pool block ID may be generated using, for example, the formula "image pool block ID=start block ID+block ID of the corresponding virtual desktop image in the image pool". Referring to FIG. 30, in the above example, the start block ID of virtual desktop image 2 is 4, and the block ID is 1 because the read procedure occurs for block 1 of the virtual desktop image 2. Therefore, the image pool block ID is 5. As a result, the command (virtual desktop image 2, block 1, read) is converted into the command (image pool block 5, read).

Thereafter, the block deduplication module unit 9052b converts the command (image pool block ID, read) into the command (deduplication pool block ID, read) at step S9014. When such conversion is performed, the deduplication table of FIG. 31 is used. The deduplication table is represented by "(image pool block ID, deduplication pool block ID)". That is, the block ID present in the image pool denotes the mapped block ID in the deduplication pool.

The image pool includes blocks present in all virtual desktop images, wherein blocks having the same content may be mapped to a single block of the deduplication pool. In FIG. 31, blocks having the same pattern shape may be represented by a block having the same content. For example, since block 0 and block 4 of the image pool have the same content, they may both be mapped to block 0 of the deduplication pool. Accordingly, the block deduplication module unit 9052b converts, for example, the command (image pool block 5, read) into the command (deduplication pool block 3, read).

Thereafter, the memory-disk emulation module unit 9052c calculates the main memory block ID using the deduplication pool block ID at step S9016. Here, the main memory block ID is obtained by dividing the virtual disk region of the main memory 9020b, which is accessible by address, into blocks so as to store the virtual desktop images in the main memory 9020b on a per-block basis. An example of a method of calculating a main memory block ID from the deduplication pool block ID is a method using one-to-one mapping. That is, deduplication pool block i is mapped to main memory block i. For example, the command (deduplication pool block 3, read) is converted into the command (main memory block 3, read).

When the main memory block ID is calculated in this way, the memory-disk emulation module unit 9052c calculates the address of the main memory 9020b based on the main memory block ID at step S9018. Here, an example of a method of calculating the address of the main memory 9020b may be given using the formula "main memory address=start address of virtual disk main memory region+block size*main memory block ID".

Therefore, the memory-disk emulation module unit 9052c converts the command (main memory block ID, read) into the command (main memory address, read).

When the address of the main memory is determined, the memory-disk emulation module unit 9052c reads data corresponding to the block size from the corresponding main memory address, and transfers the data to the virtual desktop 9024 at step S9020. For example, the command (main memory block 3, read) is converted into the command (main memory address 0x30008000, read).

Figure 32:
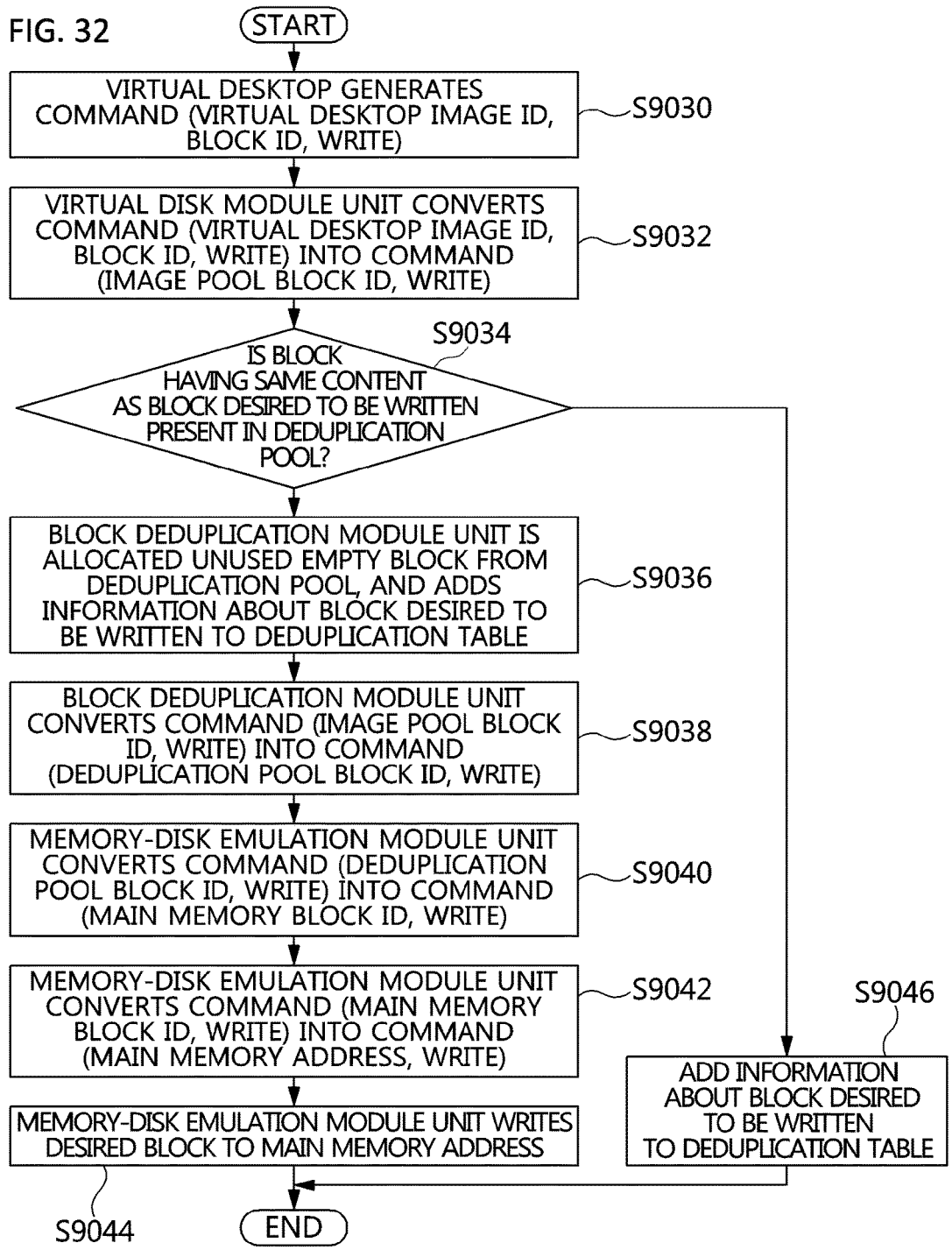
FIG. 32 is a flowchart showing a write procedure for the virtual disk shown in FIG. 27.

Next, a procedure in which the block of the virtual disk 9024c is stored in the main memory 9020b when a write operation for the block of the virtual disk 9024c occurs in the virtual desktop 9024 is described. FIG. 32 is a flowchart showing a write procedure for the virtual disk shown in FIG. 27.

When, in the virtual desktop 9024, a write operation on its own virtual disk 9024c occurs, the virtual desktop 9024 generates a write command and delivers it to the virtual disk module unit 9052a at step S9030. Here, the write command is represented by (virtual desktop image ID, block ID, write).

Accordingly, the virtual disk module unit 9052a converts the received command (virtual desktop image ID, block ID, write) into the command (image pool block ID, write) at step S9032. The virtual disk module unit 9052a delivers the command (image pool block ID, write) to the block deduplication module unit 9052b.

Thereafter, the block deduplication module unit 9052b checks whether a block having the same content as the block that is desired to be written is present in the deduplication pool at step S9034.

If the block having the same content is found, the block deduplication module unit 9052b adds information about the block desired to be written, that is, (image pool block ID, deduplication pool block ID), to the deduplication table at step S9046.

If no block having the same content is found, the block deduplication module unit 9052b is allocated an unused empty block from the deduplication pool and adds information about the block that is desired to be written to the deduplication table at step S9036.

Thereafter, the block deduplication module unit 9052b converts the command (image pool block ID, write) into the command (deduplication pool block ID, write) using the newly allocated block of the deduplication pool at step S9038.

Next, the memory-disk emulation module unit 9052c converts the command (deduplication pool block ID, write) into the command (main memory block ID, write) at step S9040.

In addition, finally, the memory-disk emulation module unit 9052c converts the command (main memory block ID, write) into the command (main memory address, write) at step S9042.

When the address of the main memory is determined in this way, the memory-disk emulation module unit 9052c writes the desired block to the corresponding main memory address at step S9044.

Figure 33:
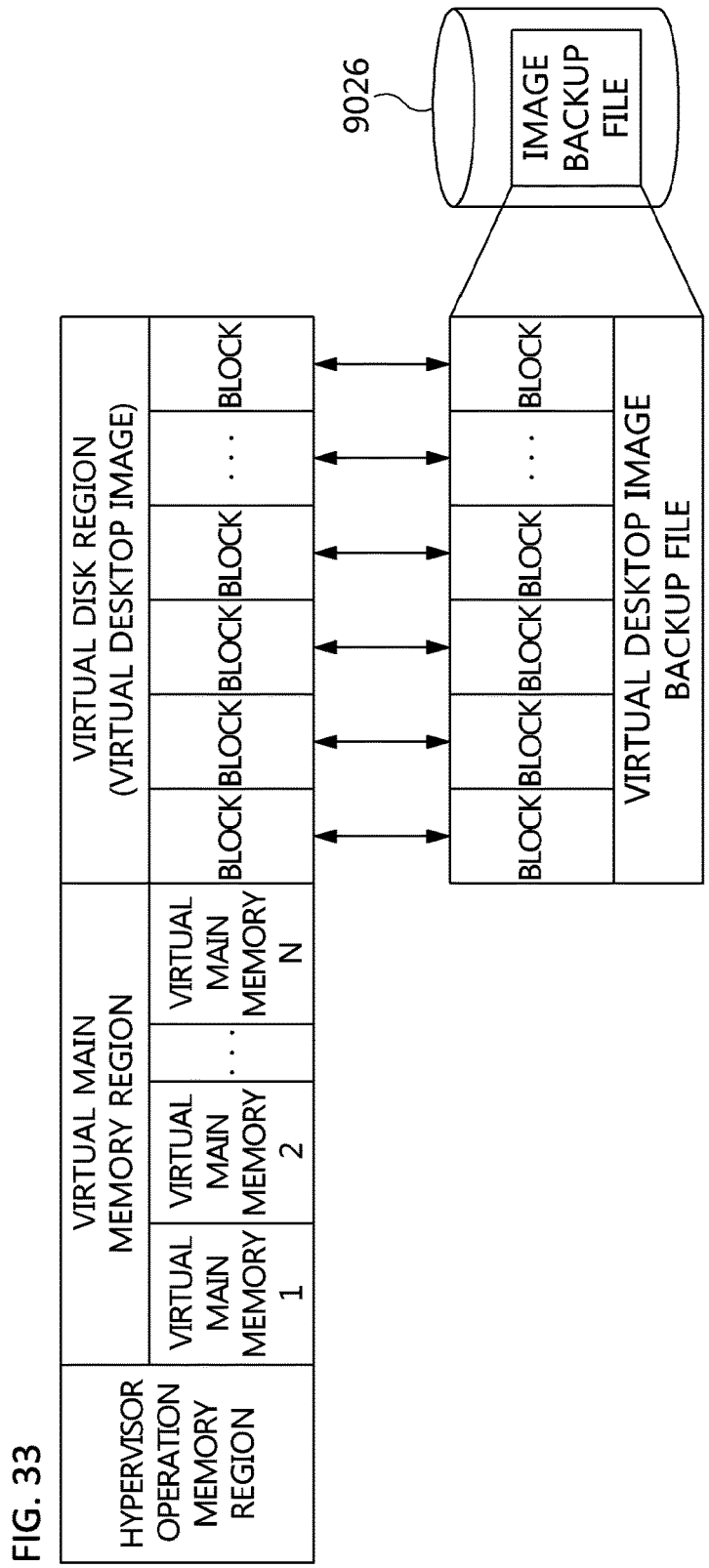
FIG. 33 is a diagram employed in the description of the storage and loading of a virtual desktop image in the main memory shown in FIG. 27.

Meanwhile, since the virtual disk region of the main memory 9020b in which the virtual desktop images are stored is nonvolatile memory, the virtual desktop images are lost when the virtual desktop server is powered off. Therefore, the in-memory virtual desktop image management engine 9062 performs a task of storing and loading the virtual disk region of the main memory 9020b in the nonvolatile backup storage 9026 (see FIG. 33). FIG. 33 is a diagram employed in the description of the storage and loading of the virtual disk images of the main memory 9020b shown in FIG. 27.

The memory-disk storage module unit 9062a of the in-memory virtual desktop image management engine 9062 stores the virtual desktop images, present in the main memory 9020b, in the backup storage 9026 before the virtual desktop server is terminated. That is, the memory-disk storage module unit 9062a copies the entire virtual disk region, stored in the main memory 9020b, to the backup storage 9026 in the form of a single file. Here, block i on the main memory is stored as block i at the corresponding location in the backup file.

Figure 34:
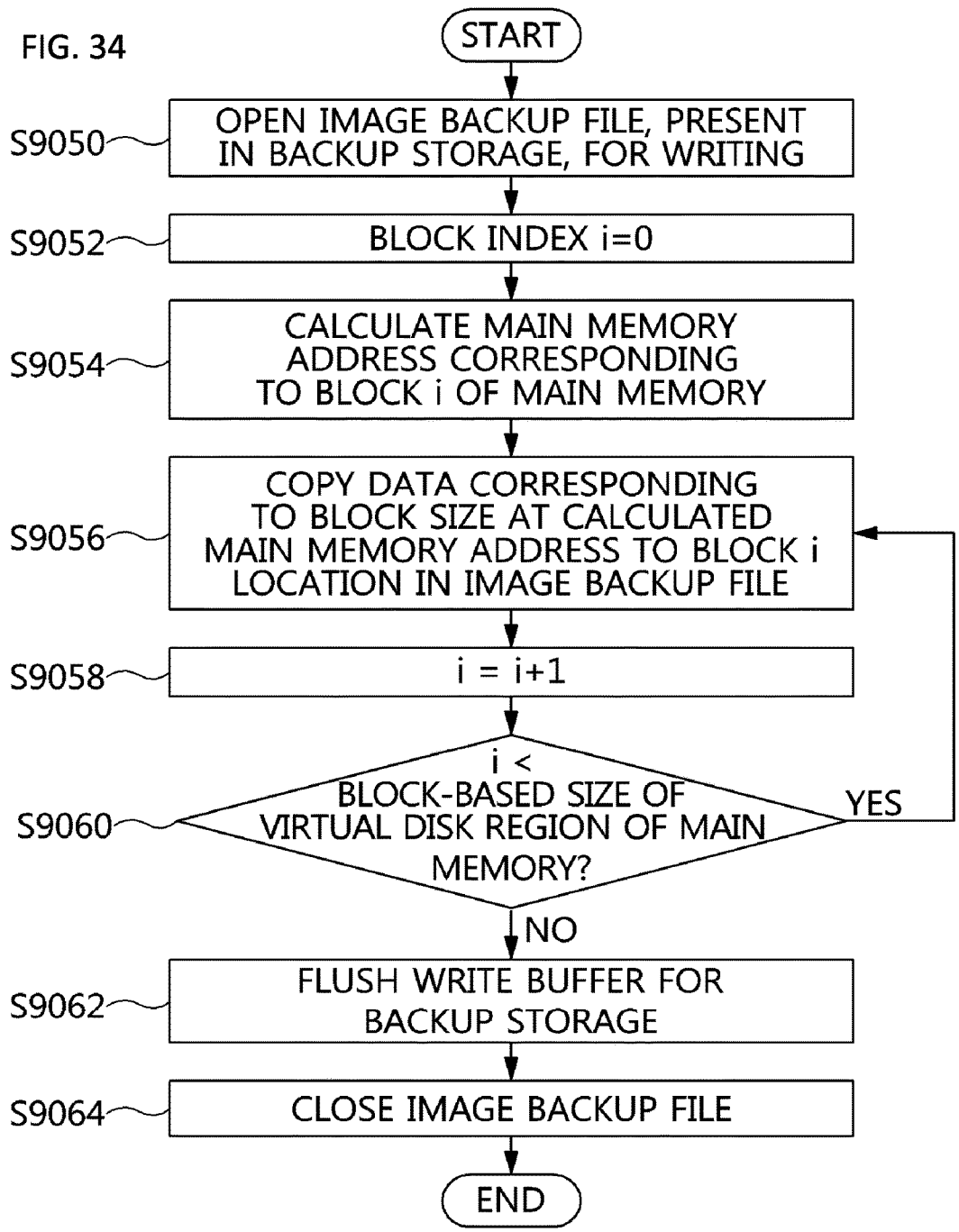
FIG. 34 is a flowchart showing the operation of the memory-disk storage module unit shown in FIG. 27.

FIG. 34 is a flowchart showing the operation of the memory-disk storage module unit 9062a shown in FIG. 27.

First, an image backup file present in the backup storage 9026 is opened for writing at step S9050.

Thereafter, block index i is initialized to '0' at step S9052.

Further, the address of the main memory corresponding to block i of the main memory 9020b is calculated at step S9054.

Thereafter, data corresponding to the block size at the calculated main memory address is copied to the location of block i in the image backup file at step S9056. The procedure for copying block i is repeatedly performed a number of times corresponding to the block-based size of the virtual disk region of the main memory 9020b at steps S9058 and S9060.

When all blocks of the main memory have been copied, a write buffer for image backup storage is flushed, and then all write operations are physically completed on the image backup file at step S9062. Thereafter, the image backup file is closed at step S9064, and the storage procedure is terminated.

Figure 35:
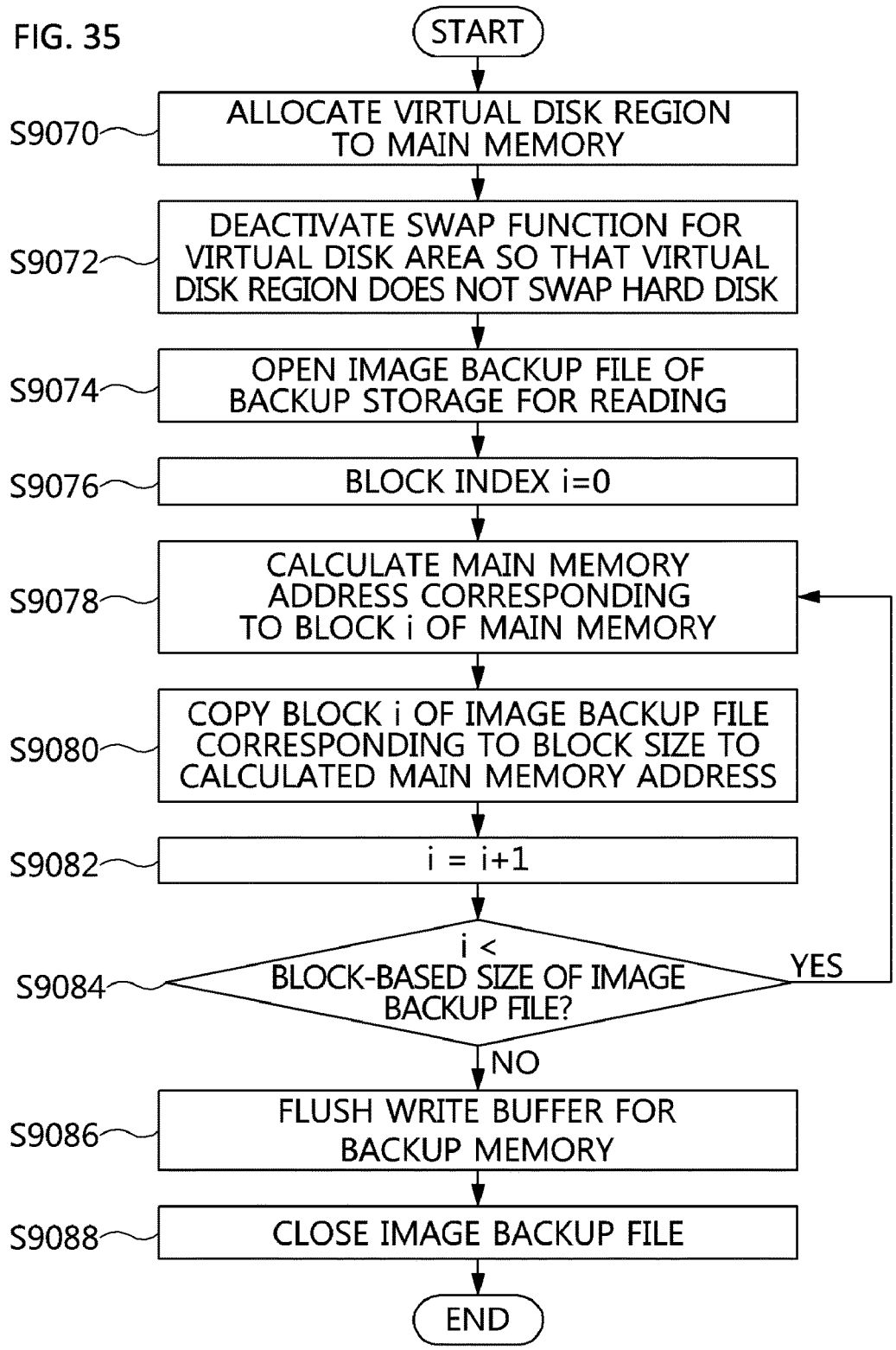
FIG. 35 is a flowchart showing the operation of the disk-memory loading module unit shown in FIG. 27.

FIG. 35 is a flowchart showing the operation of the disk-memory loading module unit 9062b shown in FIG. 27.

First, a virtual disk region is allocated to the main memory 9020b at step S9070. Thereafter, a swap function for a current region (i.e. virtual disk region) is deactivated so that the virtual disk region does not swap a hard disk at step S9072. Further, the image backup file present in the backup storage 9026 is opened for reading at step S9074. Block index i is initialized to '0' at step S9076.

The main memory address corresponding to block i of the main memory 9020b is calculated at step S9078. Thereafter, block i of the image backup file is copied to the calculated main memory address so that data corresponding to the block size is copied at step S9080. The procedure of copying block i is repeatedly performed a number of times corresponding to the block-based size of the image backup file at steps S9082 and S9084. After all blocks of the image backup file have been copied, the write buffer for main memory is flushed, and then all write operations are physically completed on the main memory at step S9086. Thereafter, the image backup file is closed at step S9088, and then the loading procedure is terminated.

In accordance with the present invention, virtual desktop images are stored in main memory rather than a storage device and high-speed virtual desktop service is provided. Therefore, even if many read/write requests by virtual desktops for virtual disks occur simultaneously, high-speed processing in main memory is possible, thus improving the performance of the entire system.

As described above, in accordance with the present invention, there is an advantage in that architecture that is capable of efficiently providing virtual desktop service may be provided.

In accordance with the present invention, a DaaS system including a virtual desktop manager and a client device is used, thus enabling the DaaS system to be efficiently managed using a multi-PC system based on desktop virtualization, to be easily applied to systems, and to be applied even to existing virtualization systems.

Figure 36:
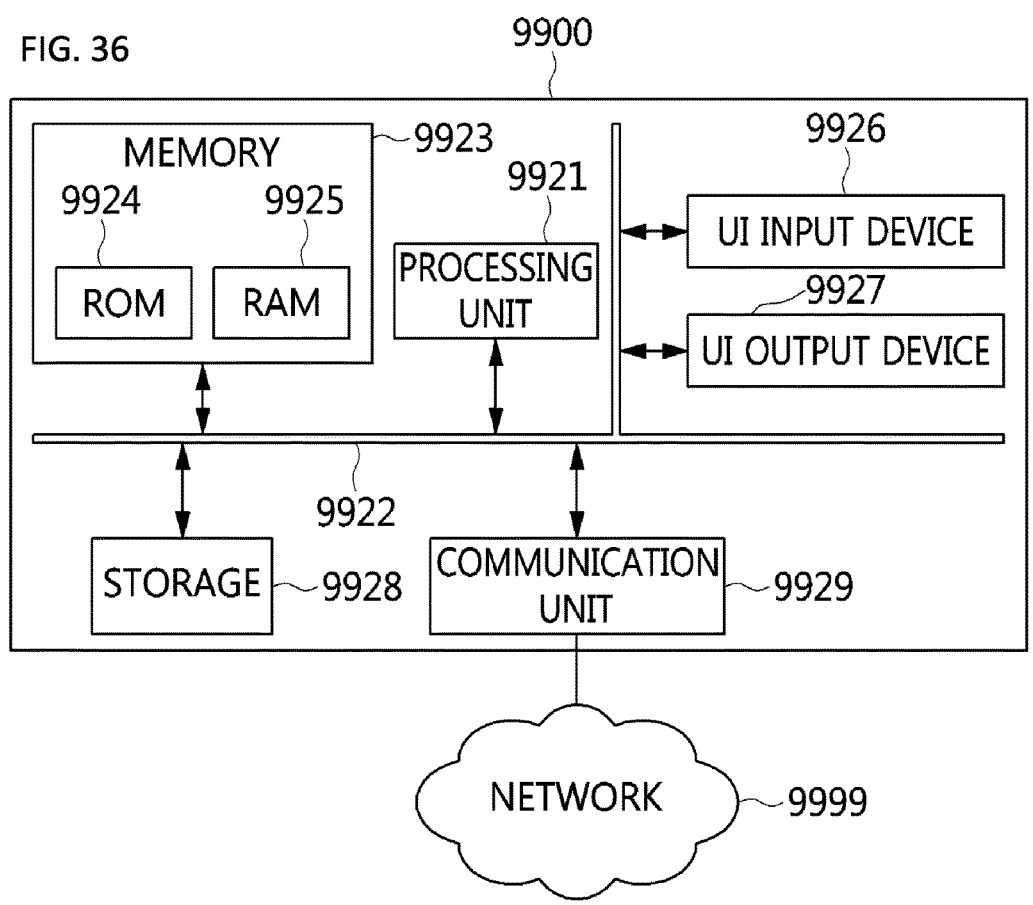
FIG. 36 illustrates a computer that implements an apparatus, a device or a server according to an example.

FIG. 36 illustrates a computer that implements an apparatus, a device or a server according to an example.

As shown in FIG. 36, computer 9900 may include a processing unit 9921, memory 9923, a UI input device 9926, a UI output device 9927, storage 9928 and a communication unit 9929, which communicate with each other through a bus 9922.

The processing unit 9921 may include at least one processor and/or at least one processing core. The processing unit 9921 may be a semiconductor device for executing processing instructions stored in the memory 9923 or the storage 9928. The processing unit 9921 may process tasks required for the operation of the computer 9900. The processing unit 9921 may execute codes in the operations or steps of the processing unit 9921 which will be described in the embodiments.

The processing unit 9921 may generate or process information and/or data used for the operation of the apparatus, the device or the server in the embodiments. And, the processing unit 9921 may process a determination, a comparison and a analysis on information and/or data used for the operation of the apparatus, the device or the server in the embodiments.

Each of the memory 9923 and the storage 9928 may be any of various types of volatile or nonvolatile storage media. For example, the memory may include at least one of ROM 9924 and RAM 9925. The memory 9923 and the storage 9928 may store information, data and/or code required for the operation of the electronic device 9900. The storage 9928 may include a DataBase.

The UI input device 9926 may be a touch screen, a keyboard and/or a mouse. The UI output device 9927 may be a display.

The electronic device 9900 may further include a communication unit 9929 connected to a network 9999. For example, the communication unit 9929 may be a network chip or port.

The communication unit 9929 may receive information and/or data required for the operation of the electronic device 9900 from other apparatus, other device or other server. And the communication unit may transmit information and/or data required for the operation of the electronic device 9900 to the other apparatus, the other device or the other server.

The communication unit 9929 may transmit information and/or data to the other apparatus, the other device or the other server in the network 9999 and may receive information and/or data from the other apparatus, the other device or the other server.

Programs may be stored in the memory 9923 in the form of system programs, applications, or other programs. Also, at least some parts of at least one program may be stored in remote memory, which may communicate with the electronic device 9900.

The above-mentioned embodiments according to the present invention may be implemented as program instructions that can be executed by various computer means. In this case, the program instructions may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as CDROM and a DVD, magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

There is provided a method and apparatus that may protect an operating system against malware and detect malware attacks by verifying the integrity of the operating system and detecting threats to the operating system.

There is provided a method and apparatus that may reduce the overhead associated with the use of virtualization technology by using a lightweight hypervisor.

There is provided a method and apparatus that may avoid performance degradation in a virtualized operating system by using a lightweight hypervisor.

There is provided a method and apparatus for detecting a method in which malware alters an operating system and detecting the characteristics of such alteration by using an operating system monitor.

There is provided a method and apparatus that may avoid degradation of the performance of a virtual machine compared to the performance of a physical machine by making full use of the performance of the physical machine in which a processor that includes multiple processing units is installed.

Although the present invention has been described above in connection with specific items, such as detailed elements, limited embodiments, and the drawings, they are provided to help the general understanding of the present invention, and the present invention is not limited to the above embodiments. Those skilled in the art can modify the present invention in various ways from the above description.

Accordingly, the scope of the present invention should not be limited to the above-described embodiments, but should be defined within the scope of the appended claims and equivalents thereof.

What is claimed is:

1. An apparatus for a virtual desktop service, comprising:
   a connection manager configured to perform an assignment task of assigning a virtual machine to a user terminal using the virtual desktop service;
   a resource pool configured to provide software resources including an operating system, applications, and user profiles to the virtual desktop service; and
   a virtual machine infrastructure configured to support hardware resources,
   wherein the virtual machine infrastructure employs an in-memory virtual desktop which is created on a main memory,
   wherein the in-memory virtual desktop on the main memory is backed up as an image when a virtual desktop server is turned off,
   wherein the in-memory virtual desktop on the main memory is restored from a backup storage when the virtual desktop server is turned on,
   wherein the image is de-duplicated and is converted to a read or write command which is transferred in blocks on an accessible main memory address,
   wherein the resource pool performs a management function,
   wherein the management function classifies a type of users,
   wherein the user profiles are generated for the type of users, and environment information of a target hardware profile is pre-configured and shared with operating systems, wherein the management function provides the virtual desktop service by comparing physical hardware information with the previously-configured environment information, wherein the connection manager identifies an allocated user, a pooled user or a VM (multi-virtual machine) user, wherein the connection manager allocates a virtual machine by adopting a pre-set method and a manual method to the allocated user, wherein the connection manager allocates a non-persistent virtual machine for only one time use to the pooled user, and wherein the connection manager allocates multiple virtual machines to the VM (multi-virtual machine) user.

2. The apparatus of claim 1, wherein the connection manager provides environment files with the user terminal, the environment files including an image of an operating system (OS) which corresponds to a requirement configured by the user terminal, and wherein the environmental files are prepared in advance when the virtual desktop service is provided.

3. The apparatus of claim 2, wherein the virtual machine infrastructure supports high availability (HA) with pre-defined configuration parameters.

4. The apparatus of claim 3, wherein the delivery protocol is used to encapsulate and deliver access to an entire information system environment or access to the user terminal over a network, and wherein a plurality of virtual machines in the servers is generated over a single hypervisor.

5. A virtual desktop service method, comprising:

checking, by a connection manager, user profiles of a user terminal for the virtual desktop service and searching for a virtual machine suitable for hardware of the user terminal;

requesting, by the connection manager, a virtual machine infrastructure to generate a corresponding virtual machine if the suitable virtual machine is not present and applying, by the connection broker, the user profiles to a corresponding virtual machine if the suitable virtual machine is present and generating a virtual desktop; and sending, by the connection manager, connection information for sending the generated virtual desktop to the user terminal and sending the virtual desktop to the user terminal using a delivery protocol of the virtual desktop, wherein the virtual machine infrastructure employs an in-memory virtual desktop which is created on a main memory, wherein the in-memory virtual desktop on the main memory is backed up as an image when a virtual desktop server is turned off, wherein the in-memory virtual desktop on the main memory is restored from a backup storage when the virtual desktop server is turned on, wherein the image is de-duplicated and is converted to a read or write command which is transferred in blocks on an accessible main memory address, wherein the resource pool performs a management function, wherein the management function classifies a type of users, wherein the user profiles are generated for the type of users, and environment information of a target hardware profile is pre-configured and shared with operating systems, wherein the management function provides the virtual desktop service by comparing physical hardware information with the previously-configured environment information, wherein the connection manager identifies an allocated user, a pooled user or a VM (multi-virtual machine) user, wherein the connection manager allocates a virtual machine by adopting a pre-set method and a manual method to the allocated user, wherein the connection manager allocates a non-persistent virtual machine for only one time use to the pooled user, and wherein the connection manager allocates multiple virtual machines to the VM (multi-virtual machine) user.

6. The method of claim 5, wherein the connection manager provides environment files with the user terminal, the environment files including an image of an operating system (OS) which corresponds to a requirement configured by the user terminal, and wherein the environmental files are prepared in advance when the virtual desktop service is provided.

7. The method of claim 6, wherein the virtual machine infrastructure supports high availability (HA) with pre-defined configuration parameters.

8. The method of claim 7, wherein the delivery protocol is used to encapsulate and deliver access to an entire information system environment or access to the user terminal over a network, and wherein a plurality of virtual machines in the servers is generated over a single hypervisor.

\* \* \* \* \*